US012764494B2

(12) United States Patent
Qiao et al.

(10) Patent No.: US 12,764,494 B2
(45) Date of Patent: Oct. 13, 2026

(54) LOCATION PROCESSING METHOD AND RELATED DEVICE

(71) Applicant: Huawei Technologies Co., Ltd., Shenzhen (CN)

(72) Inventors: Yixiang Qiao, Shenzhen (CN); Xuan Zhou, Shenzhen (CN); Qiang Xu, Toronto (CA); Jie Xu, Shanghai (CN); Jiayu Long, Shenzhen (CN); Siju Wu, Shenzhen (CN); Mingjie Dong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 608 days.

(21) Appl. No.: 18/164,269

(22) Filed: Feb. 3, 2023

(65) Prior Publication Data

US 2023/0179951 A1 Jun. 8, 2023

Related U.S. Application Data

(63) Continuation of application No. PCT/CN2021/110192, filed on Aug. 3, 2021.

(30) Foreign Application Priority Data

Aug. 5, 2020 (CN) ........................ 202010779688.3

(51) Int. Cl.
*H04W 4/02* (2018.01)
*H04W 4/024* (2018.01)

(52) U.S. Cl.
CPC .......... *H04W 4/023* (2013.01); *H04W 4/024* (2018.02)

(58) Field of Classification Search
CPC .............................. H04W 4/023; H04W 4/024
See application file for complete search history.

(56) References Cited

U.S. PATENT DOCUMENTS

| | | | | |
|---|---|---|---|---|
| 7,305,365 | B1 * | 12/2007 | Bhela | G06Q 10/00 709/200 |
| 9,191,352 | B2 * | 11/2015 | Parmar | H04L 51/58 |
| 10,713,923 | B1 * | 7/2020 | Sacks | H04M 1/72403 |
| 2005/0250446 | A1 * | 11/2005 | Ishikawa | G08B 21/24 455/517 |
| 2006/0009238 | A1 * | 1/2006 | Stanco | G08B 21/0272 455/456.2 |

(Continued)

FOREIGN PATENT DOCUMENTS

| | | | |
|---|---|---|---|
| CN | 1783921 | A | 6/2006 |
| CN | 102645666 | A | 8/2012 |

(Continued)

*Primary Examiner* — Erika A Washington
(74) *Attorney, Agent, or Firm* — Conley Rose, P.C.

(57) ABSTRACT

A location processing method implemented by a first terminal includes: obtaining a first operation for a phone number of a second terminal using a first display interface, where the first display interface is a communication interface between the first terminal and the second terminal; sending a first request to the second terminal to request to obtain a location of the second terminal; and when the second terminal authorizes the first terminal to access the location of the second terminal, obtaining the location of the second terminal and displaying the location of the second terminal.

20 Claims, 38 Drawing Sheets

(56) References Cited

U.S. PATENT DOCUMENTS

| | | | | |
|---|---|---|---|---|
| 2013/0157697 | A1* | 6/2013 | Kang | H04W 4/029<br>455/457 |
| 2014/0066105 | A1* | 3/2014 | Bridge | G06Q 10/10<br>455/457 |
| 2014/0094195 | A1* | 4/2014 | Luo | G01S 5/0284<br>455/456.3 |
| 2016/0073223 | A1* | 3/2016 | Woolsey | G01C 21/3438<br>455/457 |
| 2016/0294958 | A1* | 10/2016 | Zhang | H04W 4/02 |
| 2016/0295384 | A1* | 10/2016 | Shan | H04W 4/08 |
| 2017/0048686 | A1* | 2/2017 | Chang | H04W 4/14 |
| 2017/0085697 | A1 | 3/2017 | Zhu et al. | |
| 2020/0344572 | A1* | 10/2020 | Wakabayashi | H04W 64/00 |

FOREIGN PATENT DOCUMENTS

| | | | |
|---|---|---|---|
| CN | 103167153 | A | 6/2013 |
| CN | 103856895 | A | 6/2014 |
| CN | 105162982 | A | 12/2015 |
| CN | 105847110 | A | 8/2016 |
| CN | 106643730 | A | 5/2017 |
| CN | 106657671 | A | 5/2017 |
| CN | 107135147 | A | 9/2017 |
| CN | 108235252 | A | 6/2018 |
| CN | 109587625 | A | 4/2019 |
| CN | 112087706 | A | 12/2020 |

* cited by examiner

CONT. FROM FIG. 4A

CONT. FROM FIG. 6A

CONT. FROM FIG. 8A

CONT. FROM FIG. 9A

LOCATION PROCESSING METHOD AND RELATED DEVICE

CROSS-REFERENCE TO RELATED APPLICATIONS

This application is a continuation of International Patent Application No. PCT/CN2021/110192, filed on Aug. 3, 2021, which claims priority to Chinese Patent Application No. 202010779688.3, filed on Aug. 5, 2020. The disclosures of the aforementioned applications are hereby incorporated by reference in their entireties.

TECHNICAL FIELD

The present disclosure relates to the field of artificial intelligence, and in particular, to a location processing method and a related device.

BACKGROUND

In a current common location obtaining method, two users can send current positions to each other or share real-time positions with each other only by establishing a friend relationship in a specific application.

In the foregoing manner, a user needs to first enable the specific application, initiate a friend request to a peer party, and wait for the peer party to pass friend verification; and then initiate location sharing to the peer party. The user can obtain location information of the peer party only when the peer party agrees to the location sharing. Operation steps are complex, and the location sharing needs to be based on friend relationship establishment. This does not help protect user privacy.

SUMMARY

Embodiments of the present disclosure provide a location processing method and a related device, so that a location of a peer party can be obtained without friend adding. This avoids disclosure of personal information of a user to help protect personal information privacy of the user, and omits a step of establishing a friend relationship, so that operation steps are simple, to help improve user viscosity. In addition, the location of the peer party is accessed only when the peer party performs authorization, to ensure controllability of location privacy of the user, thereby further protecting privacy of the user.

To resolve the foregoing technical problem, embodiments of the present disclosure provide the following technical solutions:

According to a first aspect, an embodiment of the present disclosure provides a location processing method, applicable to the terminal location processing field. The method is applied to a first terminal, and the method includes the following operations: The first terminal obtains a first operation instruction corresponding to a first operation, where the first operation is a first operation that is for a phone number of a second terminal and that is obtained by using a first display interface. The first display interface is a communication interface between the first terminal and the second terminal, and the first display interface may display the phone number of the second terminal and/or a user name corresponding to the phone number of the second terminal. The first operation is used to trigger the first terminal to send a request for accessing a location of the second terminal to the second terminal, to form location communication between the first terminal and the second terminal. The first terminal sends a first request to the second terminal in response to the first operation. The first request is used to indicate that the first terminal requests to access a real-time location of the second terminal, and the first request may carry a media access control address of the second terminal. When the second terminal authorizes the first terminal to access the location of the second terminal, the first terminal obtains the location of the second terminal, to display the location of the second terminal. Both the first request and the location of the second terminal are transmitted by using a communication channel established based on phone numbers of the first terminal and the second terminal.

In this implementation, a location of a peer party can be obtained without friend adding. This avoids disclosure of personal information of a user to help protect personal information privacy of the user, and omits a step of establishing a friend relationship, so that operation steps are simple, to help improve user viscosity. In addition, the location of the peer party is accessed only when the peer party performs authorization, to ensure controllability of location privacy of the user, thereby further protecting privacy of the user.

In a possible implementation of the first aspect, that the first terminal obtains the first operation for the phone number of the second terminal by using the first display interface may include: a first icon may be set on the first display interface; and when the first terminal receives a touch operation performed by a user on the first icon, the first terminal is triggered to output selection information of a location communication mode. The location communication mode may include “authorize the peer party to access my location”, “apply for access to the location of the peer party”, “share location”, or another type of location communication mode. When the first terminal receives a selection operation performed by the user on the communication mode “apply for access to the location of the peer party”, it is considered that the first terminal obtains the first operation by using the first display interface.

In a possible implementation of the first aspect, when a location distance between the first terminal and the second terminal is greater than or equal to a first distance value, the location of the second terminal is obtained based on a long-distance wireless positioning technology. The long-distance wireless positioning technology implements positioning by using a communication technology other than short-distance wireless communication, and includes Global Positioning System (GPS) positioning and/or base station positioning. When a location distance between the first terminal and the second terminal is less than the first distance value, the location of the second terminal is obtained based on a short-distance wireless positioning technology. The short-distance wireless positioning technology includes but is not limited to ultra-wideband (UWB) positioning, millimeter-wave radar positioning, Bluetooth positioning, geomagnetic positioning, or wireless fidelity (WI-FI) positioning.

In this implementation, when the location distance between the first terminal and the second terminal is greater than or equal to the first distance value, the location of the second terminal is obtained based on the long-distance wireless positioning technology. When the location distance between the first terminal and the second terminal is less than the first distance value, the location of the second terminal is obtained based on the short-distance wireless positioning technology. The terminal may flexibly switch a positioning technology used when the location of the second terminal is generated, to help improve accuracy of the obtained location of the second terminal.

In a possible implementation of the first aspect, the first distance value may not be a preset fixed value. When a distance between the first terminal and the second terminal is less than or equal to a second distance value, the first terminal enables a short-distance wireless communication module to perform scanning to discover the second terminal, to establish short-distance wireless communication between the first terminal and the second terminal. The first distance value is a distance value that is between the first terminal and the second terminal and that is obtained when UWB communication or millimeter-wave radar communication is established between the first terminal and the second terminal.

In a possible implementation of the first aspect, the method further includes: when a location obtaining manner of the second terminal is switched from a long-distance wireless positioning technology to a short-distance wireless positioning technology, the first terminal outputs prompt information by using a sound, vibration, and/or a pop-up window.

In a possible implementation of the first aspect, the method further includes: when a first preset condition is met, ending location communication between the first terminal and the second terminal, where the first preset condition includes a first end condition and/or a second end condition. The first end condition includes any one or a combination of a plurality of the following four conditions: a relative distance between the first terminal and the second terminal is less than or equal to a preset distance threshold; a change rule of a relative location between the first terminal and the second terminal meets a first change rule, and the first change rule may be that the relative location between the first terminal and the second terminal is less than or equal to a preset distance threshold and then gradually increases; a location obtaining manner of the second terminal is changed from a short-distance wireless positioning technology to a long-distance wireless positioning technology; and an end operation for location communication between the first terminal and the second terminal is obtained. The second end condition is that duration during which the first terminal accesses the location of the second terminal reaches a duration threshold authorized by the second terminal. For all the plurality of conditions in the first end condition, it may be considered that the first terminal has completed meeting with the second terminal, that is, a purpose of location communication has been completed.

In this implementation, the foregoing provides the plurality of end conditions for ending location communication between the first terminal and the second terminal, thereby improving implementation flexibility of this solution.

In a possible implementation of the first aspect, the method further includes: when the first terminal determines that a second end condition is met and a first end condition is not met, sending a second request to the second terminal, where the second request is used to request to prolong authorized duration for accessing the location of the second terminal by the first terminal. Correspondingly, the second terminal may receive and display the second request, to determine whether to prolong the authorized duration for accessing the location of the second terminal by the first terminal. If the second terminal determines not to prolong the authorized duration for accessing the location of the second terminal by the first terminal, the second terminal ends location communication between the first terminal and the second terminal. If the second terminal determines to prolong the authorized duration for accessing the location of the second terminal by the first terminal, the second terminal may display selection information for prolonging the authorized time.

In this implementation, when the first terminal determines that the first end condition is not met, it may be proved that a target of performing location communication by the first terminal is not reached. Therefore, the first terminal sends an authorized duration prolonging request to the second terminal, to ensure that the target of location communication can be completed.

In a possible implementation of the first aspect, a manner in which the first terminal displays the location of the second terminal on a second display interface includes any one or more of the following: The location of the second terminal is displayed on a call interface between the first terminal and the second terminal. Specifically, the first terminal may display a location of the second terminal relative to the first terminal on the call interface, may display an absolute location of the second terminal on the call interface, or may display an absolute location of the first terminal and an absolute location of the second terminal on the call interface. If the second display interface is not a call interface between the first terminal and the second terminal, the first terminal displays the location of the second terminal by using a floating window. If the second display interface is not a call interface between the first terminal and the second terminal, the first terminal displays the location of the second terminal by using a card. The location of the second terminal is displayed on a display interface of a first intelligent wearable device, where the first intelligent wearable device is a device that has a connection relationship with the first terminal.

In this implementation, the plurality of display manners of the location of the second terminal are provided, thereby improving implementation flexibility of this solution.

In a possible implementation of the first aspect, a manner in which the first terminal displays the location of the second terminal on a second display interface includes: when the location of the second terminal is obtained based on a long-distance wireless positioning technology, invoking navigation-type software in the first terminal to display a map on the second display interface, and displaying absolute locations of the first terminal and the second terminal on the map, where the long-distance wireless positioning technology implements positioning by using a communication technology other than short-distance wireless communication; or when the location of the second terminal is obtained based on a short-distance wireless positioning technology, displaying a location of the second terminal relative to the first terminal. The relative location includes a direction and a distance of the second terminal relative to the first terminal. The second display interface may be a call interface between the first terminal and the second terminal, may be a home screen of the first terminal, or may be a display interface of another application of the first terminal.

In this implementation, when the location of the second terminal is obtained based on the long-distance wireless positioning technology, the first terminal and the second terminal are relatively far from each other. Therefore, an absolute location of the second terminal is displayed by using the map, to help the user relatively clearly determine the location of the second terminal. When the location of the second terminal is obtained based on the short-distance wireless positioning technology, the first terminal and the second terminal are relatively close to each other. Therefore, the location of the second terminal relative to the first terminal is displayed, to help guide the user to find the second terminal.

In a possible implementation of the first aspect, when short-distance wireless communication is used between the first terminal and the second terminal, when receiving a seventh operation that is input by the user, the first terminal enables an image collection apparatus of the first terminal in response to the seventh operation, to obtain a surrounding real environment of the first terminal in real time. The first terminal may further display the surrounding real environment of the first terminal on a call interface between the first terminal and the second terminal, and display a location of the second terminal relative to the first terminal in the surrounding real environment of the first terminal. Optionally, the seventh operation may be lifting the mobile phone to a vertical state.

In this implementation, the surrounding real environment of the first terminal is displayed, so that the user can view the surrounding real environment of the first terminal while viewing the mobile phone. This avoids repeated switching of a line of sight of the user between the real environment and a screen, and also reduces a probability that the user collides with a person or a thing in the real environment because the user neglects the real environment.

In a possible implementation of the first aspect, a location of the floating window on the second display interface corresponds to a direction of the second terminal relative to the first terminal; and the floating window may move around the second display interface as the relative direction of the second terminal changes, to indicate the change of the relative direction. Alternatively, a style of the floating window corresponds to a distance of the second terminal relative to the first terminal, and the style of the floating window includes one or more of the following: a size, a color, a shape, and transparency of the floating window. In this implementation, the floating window may change as the direction or the distance of the second terminal relative to the first terminal changes, so that the user can more intuitively perceive a location change between the second terminal and the first terminal.

In a possible implementation of the first aspect, the method further includes: after receiving a real-time location of the second terminal, the first terminal may invoke a navigation-type application in the first terminal to generate navigation information between the first terminal and the second terminal, and display the navigation information on the second display interface, where the navigation information indicates a navigation path between the first terminal and the second terminal. In this implementation, not only the location of the second terminal but also the navigation path between the first terminal and the second terminal may be displayed, so that the first terminal can more conveniently find the second terminal, thereby further improving convenience of this solution.

In a possible implementation of the first aspect, the method further includes: the first terminal obtains, by using a call end interface between the first terminal and a third terminal, a second operation instruction corresponding to a second operation, where the second operation is an operation for the phone number of the second terminal; the first terminal obtains a current location of the first terminal in response to the second operation; and the first terminal transmits the current location of the first terminal to the third terminal. Specifically, the first Terminal may send the current location of the first terminal to the second terminal by using a short message service (SMS) message. Alternatively, after the first terminal sends the current location of the first terminal to the second terminal, a fourth icon is displayed on a call record interface of the second terminal, so that a user can access the current location of the first terminal by using the fourth icon. Alternatively, the first terminal sends the current location of the first terminal to a target server, and the target server sends the current location of the first terminal to the second terminal, to display the current location of the first terminal on a target application in the second terminal. In this implementation, a function of leaving my current location is added, thereby further expanding an application scenario of this solution.

In a possible implementation of the first aspect, the first display interface is a call interface between the first terminal and the second terminal; and the call interface between the first terminal and the second terminal may be an interface displayed when the first terminal performs a call with the second terminal, an address book interface of the first terminal, or a call record interface between the first terminal and the second terminal. Alternatively, the first display interface is an SMS message interaction interface between the first terminal and the second terminal.

In this implementation, location communication between the terminals can be enabled by using a call interface, or can be enabled by using an SMS message interaction interface, thereby improving implementation flexibility of this solution.

According to a second aspect, an embodiment of the present disclosure provides a location processing method, applicable to the terminal location processing field. The method includes: a second terminal receives a first request that is for a phone number of the second terminal and that is sent by a first terminal, where the first request is obtained by using a third display interface, the third display interface is a communication interface between the first terminal and the second terminal, and the first request indicates that the first terminal requests to access a location of the second terminal; and the second terminal sends the location of the second terminal to the first terminal when the second terminal authorizes the first terminal to access the location of the second terminal.

In a possible implementation of the second aspect, the method further includes: the second terminal displays the first request by using the third display interface, and obtains a third operation instruction corresponding to a third operation, where the third operation is an operation that is for the first request and that is obtained by using the third display interface, and the third operation indicates that the first terminal is authorized to access the location of the second terminal. That the second terminal sends the location of the second terminal to the first terminal when the second terminal authorizes the first terminal to access the location of the second terminal includes: the second terminal sends the location of the second terminal to the first terminal in response to the third operation.

In a possible implementation of the second aspect, before the second terminal receives the first request that is for the phone number of the second terminal and that is sent by the first terminal, the method further includes: the second terminal obtains a fourth operation instruction corresponding to a fourth operation, where the fourth operation is an operation that is for a phone number of the first terminal and that is obtained by using the third display interface; and the second terminal sends first authorization information to the first terminal based on the fourth operation, where the first authorization information indicates that the first terminal is authorized to access the location of the second terminal.

In this implementation, the first terminal can request to access a location of another terminal, and can also authorize another terminal to access a location of the first terminal, thereby expanding an application scenario of this solution.

In a possible implementation of the second aspect, before the sending first authorization information to the first terminal, the method further includes: the second terminal displays a fourth display interface in response to the fourth operation, and obtains first authorized time by using the fourth display interface, where the first authorized time indicates authorized time for accessing the second terminal by the first terminal. The fourth display interface is a setting interface of the authorized time, and the authorized time may be authorized duration or an authorized time period. In this implementation, when authorizing a peer party to access location information of a party, the party may preset authorized time, thereby ensuring privacy of the authorization party and also ensuring flexibility of a location sharing process.

In a possible implementation of the second aspect, the fourth display interface is an interface displayed when the second terminal performs a call with the first terminal, and the method further includes: when the call between the first terminal and the second terminal ends, outputting first query information, where the first query information is used to determine whether to continue to authorize, after the call ends, the first terminal to access the location of the second terminal. If the second terminal receives a reject instruction that is input by the user for the first query information, the second terminal ends location communication between the second terminal and the first terminal. If the second terminal receives an agree instruction that is input by the user for the first query information, the second terminal keeps location communication between the second terminal and the first terminal. The first query information may be output in a form of a text box, a voice, or the like. Correspondingly, the user may input reply information by inputting a touch operation for the first query information, or input reply information in a form of a voice for a query voice.

In this implementation, after the call ends, it is still possible that the first terminal needs to access the location of the second terminal. Therefore, it is determined, by using the first query information, whether to continue to authorize, after the call ends, the second terminal to access the location of the first terminal, thereby ensuring privacy of the second terminal and also enhancing flexibility of a location sharing process.

In a possible implementation of the second aspect, the method further includes: the second terminal obtains any one or more of the following information by using a setting interface: whether the second terminal authorizes a terminal other than the second terminal to access the location of the second terminal based on the phone number of the second terminal; authorized time during which the second terminal authorizes a terminal other than the second terminal to access the location of the second terminal based on the phone number of the second terminal; a whitelist, where the whitelist corresponds to a phone number of at least one terminal, and each of the at least one terminal corresponding to the whitelist is authorized to access the location of the second terminal based on the phone number of the second terminal; and the whitelist may prestore the phone number of the at least one terminal, or may prestore a user name corresponding to the at least one terminal, where the first terminal can obtain a phone number of each terminal based on a user name of each terminal; whether to authorize, after a call between the second terminal and a terminal other than the second terminal ends if the second terminal forms location communication with the terminal other than the second terminal in a call process, the terminal other than the second terminal to continue to access the location of the second terminal; and authorized duration during which a terminal other than the second terminal is authorized, after a call between the second terminal and the terminal other than the second terminal ends if the second terminal forms location communication with the terminal other than the second terminal in a call process, to continue to access the location of the second terminal.

In this implementation, location information sharing may be preset from a plurality of dimensions by using the setting interface. This is convenient and fast.

In a possible implementation of the second aspect, the method further includes: when a change rule of an absolute location of the second terminal meets a second change rule, the second terminal outputs second query information, where the second query information is used to indicate whether to send prompt information to the first terminal, and the prompt information is used to notify the first terminal that the location of the second terminal changes. The second change rule may be determined by using an acceleration parameter of the second terminal, a motion status of the second terminal, or another type of parameter. The second change rule may be specifically that the second terminal starts to move after stationary time exceeds a first threshold. The second query information may be output in any one or more of the following manners: a pop-up box, a sound, vibration, and the like.

In this implementation, the first terminal may not display the location of the second terminal in real time every second. Therefore, when the change rule of the absolute location of the second terminal meets the second change rule, it may be queried whether the second terminal is to send the prompt information to the first terminal, to prompt the user of the first terminal to pay attention to a track change status of the second terminal in time.

In the second aspect of embodiments of the present disclosure, the second terminal may further perform the steps performed by the first terminal in the first aspect and the possible implementations of the first aspect. For concepts of the terms, specific implementation steps, and a beneficial effect brought by each possible implementation in the second aspect and some possible implementations of the second aspect of embodiments of the present disclosure, refer to the descriptions in the possible implementations of the first aspect.

According to a third aspect, an embodiment of the present disclosure provides a location processing method, applicable to the terminal location processing field. The method is applied to a first terminal, and the method includes: obtaining a fifth operation instruction corresponding to a fifth operation, where the fifth operation is an operation that is for a phone number of a second terminal and that is obtained by using a first display interface, and the first display interface is a communication interface between the first terminal and the second terminal; sending a third request to the second terminal based on the fifth operation, where the third request is used to request to share a location with the second terminal; when the second terminal is allowed to share a location with the first terminal, sending a location of the first terminal to the second terminal, and receiving a location that is of the second terminal and that is sent by the second terminal; and displaying the location of the second terminal.

In the third aspect of embodiments of the present disclosure, the third terminal may further perform the steps performed by the first terminal in the first aspect and the possible implementations of the first aspect. For concepts of the terms, specific implementation steps, and a beneficial effect brought by each possible implementation in the third aspect and some possible implementations of the third aspect of embodiments of the present disclosure, refer to the descriptions in the possible implementations of the first aspect.

According to a fourth aspect, an embodiment of the present disclosure provides a location processing method, applicable to the terminal location processing field. The method is applied to a second terminal, and the method includes: receiving a third request that is for a phone number of the second terminal and that is sent by a first terminal, and displaying the third request by using a third display interface, where the third display interface displays a phone number of the first terminal, and the third request indicates that the first terminal requests to share a location with the second terminal; obtaining a sixth operation for the third request by using the third display interface, where the sixth operation indicates that the second terminal is authorized to share a location of the second terminal with the first terminal; sending the location of the second terminal to the first terminal based on the sixth operation, and receiving a location that is of the first terminal and that is sent by the first terminal; and displaying the location of the first terminal.

In the fourth aspect of embodiments of the present disclosure, the second terminal may further perform the steps performed by the second terminal in the second aspect and the possible implementations of the second aspect. For concepts of the terms, specific implementation steps, and a beneficial effect brought by each possible implementation in the fourth aspect and some possible implementations of the fourth aspect of embodiments of the present disclosure, refer to the descriptions in the possible implementations of the second aspect.

According to a fifth aspect, an embodiment of the present disclosure provides a location processing apparatus, applicable to the terminal location processing field. The location processing apparatus is applied to a first terminal, and the apparatus includes: an obtaining module configured to obtain a first operation instruction corresponding to a first operation, where the first operation is an operation that is for a phone number of a second terminal and that is obtained by using a first display interface, and the first display interface is a communication interface between the first terminal and the second terminal; and a sending module configured to send a first request to the second terminal in response to the first operation instruction, where the first request is used to request to obtain a location of the second terminal. The obtaining module is further configured to: when the second terminal authorizes the first terminal to access the location of the second terminal, obtain the location of the second terminal, to display the location of the second terminal.

In a possible implementation of the fifth aspect, the apparatus further includes: an end module configured to: when a first preset condition is met, end location communication between the first terminal and the second terminal, where the first preset condition includes a first end condition and/or a second end condition. The first end condition includes any one or a combination of a plurality of the following four conditions: a relative distance between the first terminal and the second terminal is less than or equal to a preset distance threshold; a change rule of a relative location between the first terminal and the second terminal meets a first change rule; a location obtaining manner of the second terminal is changed from a short-distance wireless positioning technology to a long-distance wireless positioning technology, and the long-distance wireless positioning technology implements positioning by using a communication technology other than short-distance wireless communication; and an end operation for location communication between the first terminal and the second terminal is obtained. The second end condition is that duration during which the first terminal accesses the location of the second terminal reaches a duration threshold authorized by the second terminal.

In a possible implementation of the fifth aspect, the sending module is further configured to: when the first terminal determines that a second end condition is met and a first end condition is not met, send a second request to the second terminal, where the second request is used to request to prolong authorized duration for accessing the location of the second terminal by the first terminal. The first end condition includes any one or a combination of a plurality of the following four conditions: a relative distance between the first terminal and the second terminal is less than or equal to a preset distance threshold; a change rule of a relative location between the first terminal and the second terminal meets a first change rule; a location obtaining manner of the second terminal is changed from a short-distance wireless positioning technology to a long-distance wireless positioning technology, and the long-distance wireless positioning technology implements positioning by using a communication technology other than short-distance wireless communication; and an end operation for location communication between the first terminal and the second terminal is obtained. The second end condition is that duration during which the first terminal accesses the location of the second terminal reaches a duration threshold authorized by the second terminal.

In a possible implementation of the fifth aspect, a manner of displaying the location of the second terminal on a second display interface includes any one or more of the following: displaying the location of the second terminal on a call interface between the first terminal and the second terminal; displaying the location of the second terminal by using a floating window; displaying the location of the second terminal by using a card; and displaying the location of the second terminal on a display interface of a first intelligent wearable device, where the first intelligent wearable device is a device that has a connection relationship with the first terminal.

In a possible implementation of the fifth aspect, the apparatus further includes: a display module configured to: when the location of the second terminal is obtained based on a long-distance wireless positioning technology, display absolute locations of the first terminal and the second terminal on a map, where the long-distance wireless positioning technology implements positioning by using a communication technology other than short-distance wireless communication; or when the location of the second terminal is obtained based on a short-distance wireless positioning technology, display a location of the second terminal relative to the first terminal.

In a possible implementation of the fifth aspect, the display module is further configured to display a surrounding real environment of the first terminal on a call interface between the first terminal and the second terminal, and display the location of the second terminal relative to the first terminal in the surrounding real environment of the first terminal.

In a possible implementation of the fifth aspect, a location of the floating window on the second display interface corresponds to a direction of the second terminal relative to the first terminal; or a style of the floating window corresponds to a distance of the second terminal relative to the first terminal, and the style of the floating window includes one or more of the following: a size, a color, a shape, and transparency of the floating window.

In a possible implementation of the fifth aspect, the display module is further configured to display navigation information on the second display interface, where the navigation information indicates a navigation path between the first terminal and the second terminal.

In a possible implementation of the fifth aspect, the obtaining module is further configured to: obtain, by using a call end interface between the first terminal and the second terminal, a second operation instruction corresponding to a second operation, where the second operation is an operation for the phone number of the second terminal; and obtain a current location of the first terminal in response to the second operation; and the sending module is further configured to transmit the current location of the first terminal to the second terminal.

In a possible implementation of the fifth aspect, the first display interface is a call interface between the first terminal and the second terminal, or the first display interface is an SMS message interaction interface between the first terminal and the second terminal.

For concepts of the terms, specific implementation steps, and a beneficial effect brought by each possible implementation in the fifth aspect and some possible implementations of the fifth aspect, refer to the descriptions in the possible implementations of the first aspect.

According to a sixth aspect, an embodiment of the present disclosure provides a location processing apparatus, applicable to the terminal location processing field. The location processing apparatus is applied to a second terminal, and the apparatus includes: a receiving module configured to receive a first request that is for a phone number of the second terminal and that is sent by a first terminal, where the first request is obtained by using a third display interface, the third display interface is a communication interface between the first terminal and the second terminal, and the first request indicates that the first terminal requests to access a location of the second terminal; and a sending module configured to send the location of the second terminal to the first terminal when the second terminal authorizes the first terminal to access the location of the second terminal.

In a possible implementation of the sixth aspect, the apparatus further includes: a display module configured to display the first request by using the third display interface; and an obtaining module configured to obtain a third operation instruction corresponding to a third operation, where the third operation is an operation that is for the first request and that is obtained by using the third display interface, and the third operation indicates that the first terminal is authorized to access the location of the second terminal. The sending module is further configured to send the location of the second terminal to the first terminal in response to the third operation.

In a possible implementation of the sixth aspect, the apparatus further includes: an obtaining module configured to obtain a fourth operation instruction corresponding to a fourth operation, where the fourth operation is an operation that is for a phone number of the first terminal and that is obtained by using the third display interface. The sending module is further configured to send first authorization information to the first terminal based on the fourth operation, where the first authorization information indicates that the first terminal is authorized to access the location of the second terminal.

In a possible implementation of the sixth aspect, the apparatus further includes: a display module configured to: display a fourth display interface in response to the fourth operation, and obtain first authorized time by using the fourth display interface, where the first authorized time indicates authorized time for accessing the first terminal by the first terminal.

In a possible implementation of the sixth aspect, the third display interface is an interface displayed when the first terminal performs a call with the second terminal, and the apparatus further includes: an output module configured to: when the call between the first terminal and the second terminal ends, output first query information, where the first query information is used to determine whether to continue to authorize, after the call ends, the first terminal to access the location of the second terminal.

In a possible implementation of the sixth aspect, the apparatus further includes: an obtaining module configured to obtain any one or more of the following information by using a setting interface: whether the second terminal authorizes a terminal other than the second terminal to access the location of the second terminal based on the phone number of the second terminal; authorized time during which the second terminal authorizes a terminal other than the second terminal to access the location of the second terminal based on the phone number of the second terminal; a whitelist, where the whitelist corresponds to a phone number of at least one terminal, and each of the at least one terminal corresponding to the whitelist is authorized to access the location of the second terminal based on the phone number of the second terminal; whether to authorize, after a call between the second terminal and a terminal other than the second terminal ends if the second terminal forms location communication with the terminal other than the second terminal in a call process, the terminal other than the second terminal to continue to access the location of the second terminal; and authorized duration during which a terminal other than the second terminal is authorized, after a call between the second terminal and the terminal other than the second terminal ends if the second terminal forms location communication with the terminal other than the second terminal in a call process, to continue to access the location of the second terminal.

In a possible implementation of the sixth aspect, the apparatus further includes: an output module configured to: when a change rule of an absolute location of the second terminal meets a second change rule, output second query information, where the second query information is used to indicate whether to send prompt information to the first terminal, and the prompt information is used to notify the first terminal that the location of the second terminal changes.

In a possible implementation of the sixth aspect, the apparatus further includes: an obtaining module configured to: obtain, by using a call end interface between the first terminal and the second terminal, a second operation instruction corresponding to a second operation, where the second operation is an operation for a phone number of the first terminal; and obtain a current location of the second terminal in response to the second operation. The sending module is further configured to transmit the current location of the second terminal to the first terminal.

For concepts of the terms, specific implementation steps, and a beneficial effect brought by each possible implementation in the sixth aspect and some possible implementations of the sixth aspect, refer to the descriptions in the possible implementations of the first aspect.

According to a seventh aspect, an embodiment of the present disclosure provides a location processing apparatus, applicable to the terminal location processing field. The apparatus is applied to a first terminal, and the apparatus includes: an obtaining module configured to obtain a fifth operation instruction corresponding to a fifth operation, where the fifth operation is an operation that is for a phone number of a second terminal and that is obtained by using a first display interface, and the first display interface is a communication interface between the first terminal and the second terminal; a sending module configured to send a third request to the second terminal based on the fifth operation, where the third request is used to request to share a location with the second terminal, where the sending module is configured to: when the second terminal is allowed to share a location with the first terminal, send a location of the first terminal to the second terminal, and receive a location that is of the second terminal and that is sent by the second terminal; and a display module configured to display the location of the second terminal.

In the seventh aspect of embodiments of the present disclosure, the location processing apparatus may further perform the steps performed by the first terminal in the third aspect and the possible implementations of the third aspect. For concepts of the terms, specific implementation steps, and a beneficial effect brought by each possible implementation in the seventh aspect and some possible implementations of the seventh aspect, refer to the descriptions in the possible implementations of the third aspect.

According to an eighth aspect, an embodiment of the present disclosure provides a location processing apparatus, applicable to the terminal location processing field. The location processing apparatus is applied to a second terminal, and the apparatus includes: a receiving module configured to: receive a third request that is for a phone number of the second terminal and that is sent by a first terminal, and display the third request by using a third display interface, where the third display interface displays a phone number of the first terminal, and the third request indicates that the first terminal requests to share a location with the second terminal; an obtaining module configured to obtain a sixth operation for the third request by using the third display interface, where the sixth operation indicates that the second terminal is authorized to share a location of the second terminal with the first terminal; a sending module configured to: send the location of the second terminal to the first terminal based on the sixth operation, and receive a location that is of the first terminal and that is sent by the first terminal; and a display module configured to display the location of the first terminal.

In the eighth aspect of embodiments of the present disclosure, the location processing apparatus may further perform the steps performed by the second terminal in the possible implementations of the fourth aspect. For concepts of the terms, specific implementation steps, and a beneficial effect brought by each possible implementation in the eighth aspect and some possible implementations of the eighth aspect of embodiments of the present disclosure, refer to the descriptions in the possible implementations of the fourth aspect.

According to a ninth aspect, an embodiment of the present disclosure provides a computer program. When the computer program runs on a computer, the computer is enabled to perform the location processing methods in the foregoing aspects.

According to a tenth aspect, an embodiment of the present disclosure provides an execution device, including: a processor, where the processor is coupled to a memory; and the memory configured to store a program. The processor is configured to execute the program in the memory, to enable the execution device to perform the location processing methods in the foregoing aspects.

According to an eleventh aspect, an embodiment of the present disclosure provides a computer readable storage medium. The computer readable storage medium stores a computer program. When the computer program runs on a computer, the computer is enabled to perform the location processing methods in the foregoing aspects.

According to a twelfth aspect, an embodiment of the present disclosure provides a circuit system. The circuit system includes a processing circuit. The processing circuit is configured to perform the location processing methods in the foregoing aspects.

According to a thirteenth aspect, an embodiment of the present disclosure provides a chip system. The chip system includes a processor configured to support implementation of the functions in the foregoing aspects, for example, sending or processing of the data and/or information in the foregoing methods. In a possible design, the chip system further includes a memory. The memory is configured to store program instructions and data of a server or a communication device. The chip system may include a chip, or may include a chip and another discrete device.

DESCRIPTION OF EMBODIMENTS

Embodiments of the present disclosure provide a location processing method and a related device, so that a location of a peer party can be obtained without friend adding. This avoids disclosure of personal information of a user to help protect personal information privacy of the user, and omits a step of establishing a friend relationship, so that operation steps are simple, to help improve user viscosity. In addition, the location of the peer party is accessed only when the peer party performs authorization, to ensure controllability of location privacy of the user, thereby further protecting privacy of the user.

In the specification, claims, and accompanying drawings of the present disclosure, the terms "first", "second", and so on are intended to distinguish between similar objects but do not necessarily indicate a specific order or sequence. It should be understood that the terms used in such a way are interchangeable in proper circumstances, and this is merely a discrimination manner for describing objects having a same attribute in embodiments of the present disclosure. In addition, the terms "include", "contain" and any other variants mean to cover the non-exclusive inclusion, so that a process, method, system, product, or device that includes a series of units is not necessarily limited to those units, but may include other units not expressly listed or inherent to such a process, method, system, product, or device.

The following describes embodiments of the present disclosure with reference to the accompanying drawings. It may be learned by a person of ordinary skill in the art that, with development of technologies and emergence of a new scenario, the technical solutions provided in embodiments of the present disclosure are also applicable to a similar technical problem.

Embodiments of the present disclosure are applicable to an application scenario in which a user needs to obtain a location of another user. As an example, when a user collects a package at a gate of a community, there are a plurality of couriers at the gate of the community. If the user can obtain a location of a courier, the user can quickly find the courier from the plurality of couriers. As another example, when a user meets a person in a strange place, it is difficult to clearly describe a location through phone communication. If a location of the peer party can be obtained more accurately, the meeting is more easily completed. Application scenarios of embodiments of the present disclosure are not exhaustively described herein.

Figure 1:
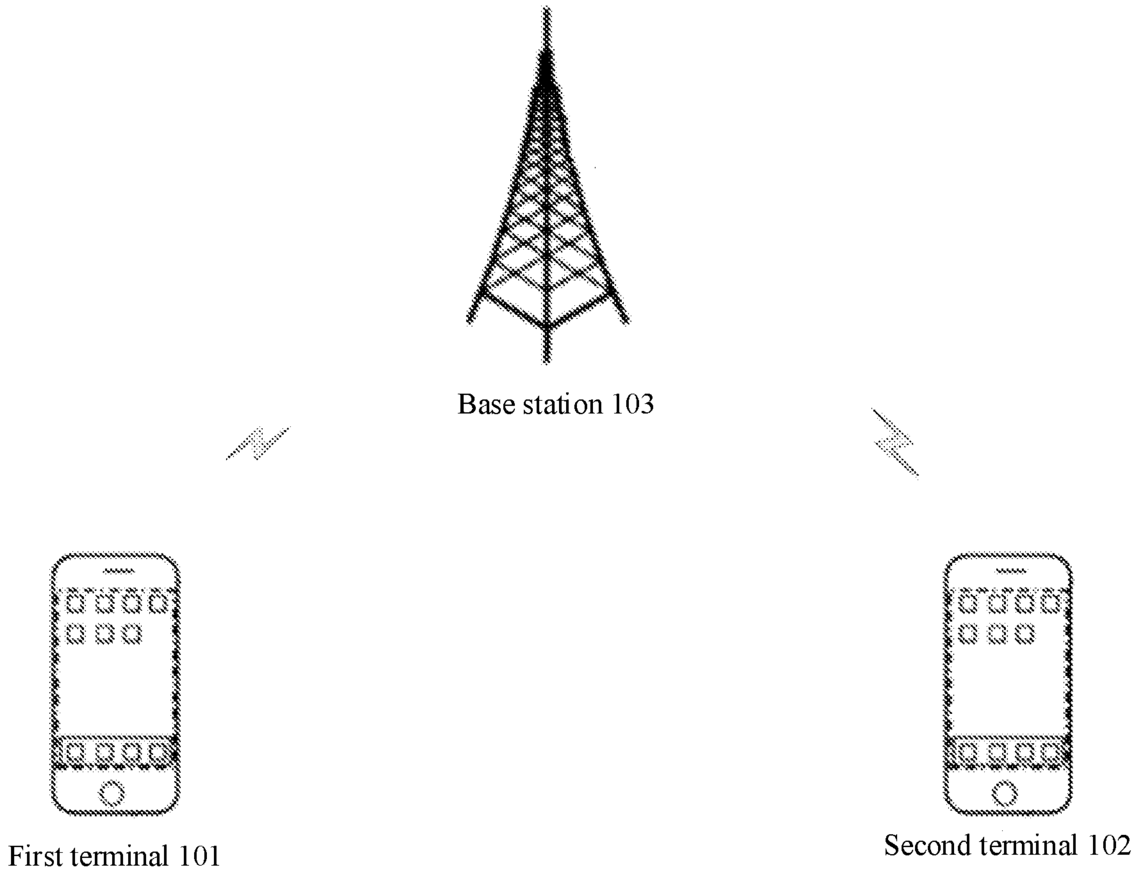
FIG. 1 is a diagram of a system architecture of a location processing system according to an embodiment of the present disclosure.

To resolve the foregoing problem, embodiments of the present disclosure provide a location processing method. First, a system architecture of a location processing system is described. FIG. 1 is a diagram of a system architecture of a location processing system according to an embodiment of the present disclosure. The location processing system includes a first terminal 101, a second terminal 102, and a base station 103. The first terminal 101 and the second terminal 102 each are specifically represented as any mobile terminal that has a communication function, including but not limited to a mobile phone, a tablet computer, a notebook computer, an intelligent wearable device, an intelligent vehicle, a mobile robot, or the like.

Specifically, the first terminal 101 communicates with the second terminal 102 by using the base station 103. The first terminal 101 obtains a first operation for a phone number of the second terminal by using a first display interface, where the first display interface is a communication interface between the first terminal and the second terminal; in response to the first operation, sends a first request to the second terminal by using the base station 103, where the first request is used to request to obtain a location of the second terminal; and when the second terminal authorizes the first terminal to access the location of the second terminal, receives, by using the base station 103, the location that is of the second terminal and that is sent by the second terminal. Both the first request and the location of the second terminal are transmitted by using a communication channel established based on phone numbers of the first terminal and the second terminal.

It should be noted that, although only one first terminal 101 and one second terminal 102 are shown in FIG. 1, in an actual case, one first terminal 101 may simultaneously exchange information with a plurality of second terminals 102. The example in FIG. 1 is merely intended to facilitate understanding of a network architecture of this solution, and is not intended to limit this solution.

Figure 2:
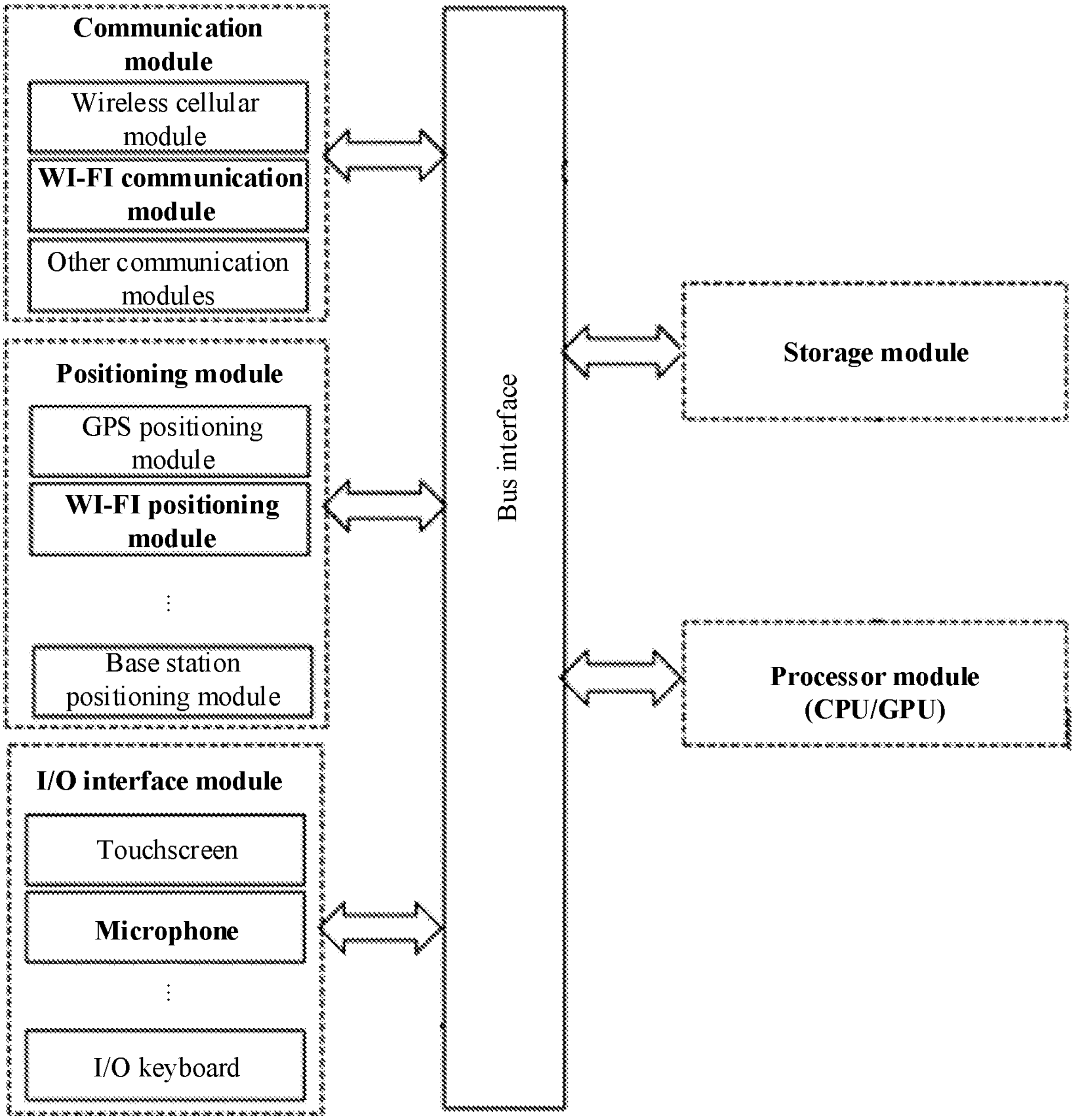
FIG. 2 is a schematic diagram of a structure of a terminal device in a location processing method according to an embodiment of the present disclosure.
Figure 3A:
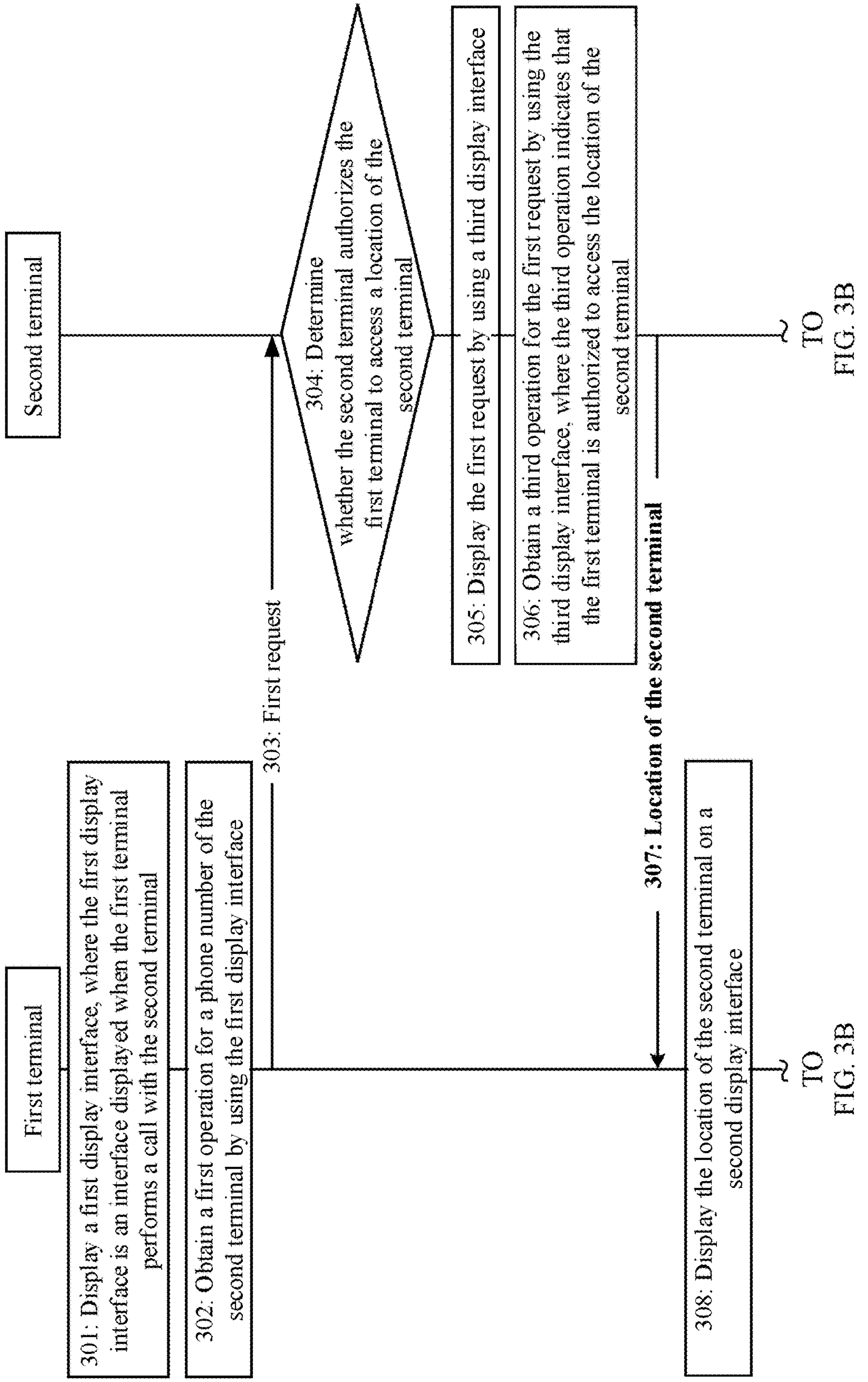
FIG. 3A, FIG. 3B, FIG. 3C, and FIG. 3D are a schematic flowchart of a location processing method according to an embodiment of the present disclosure.
Figure 3B:
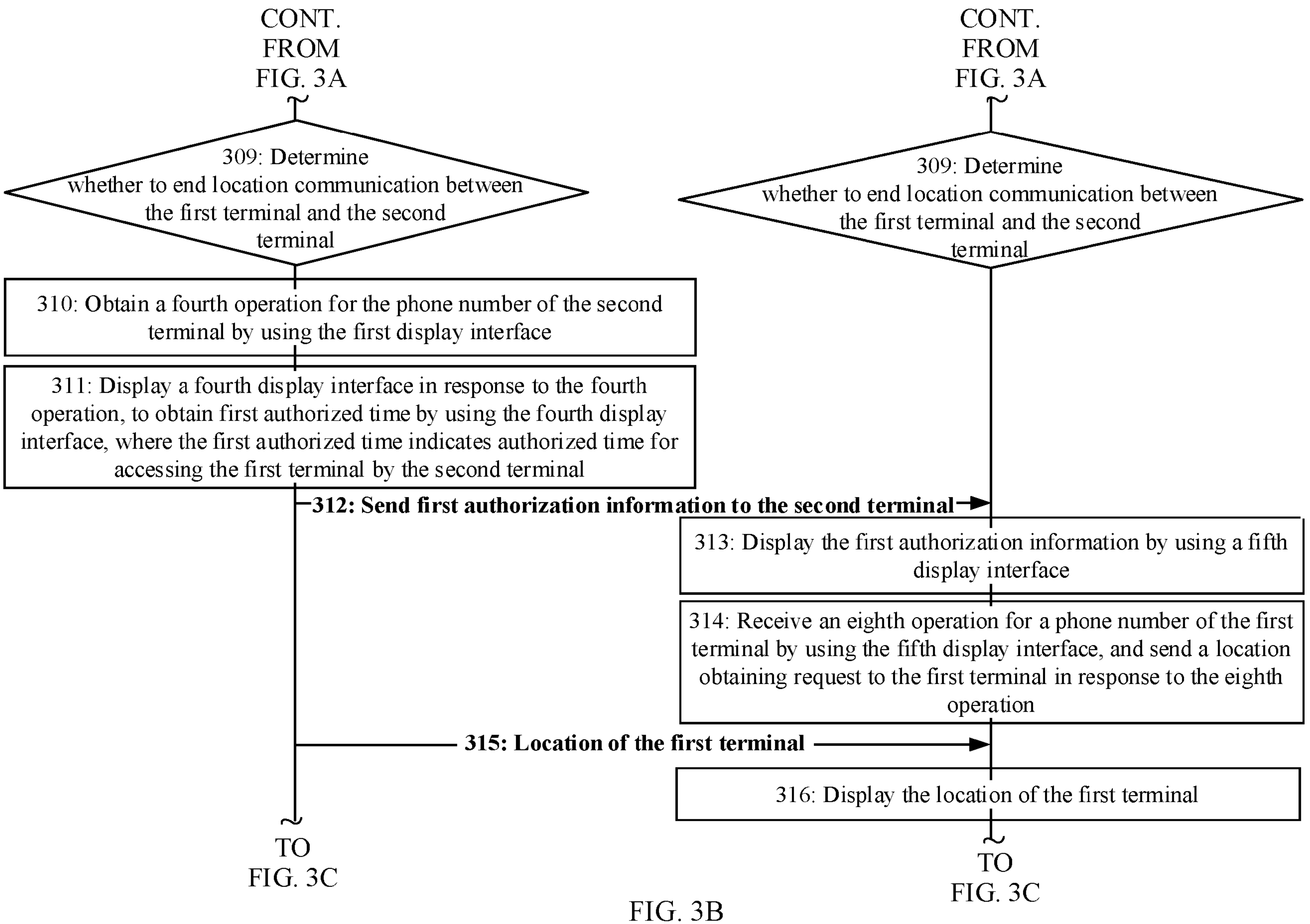
Figure 3C:
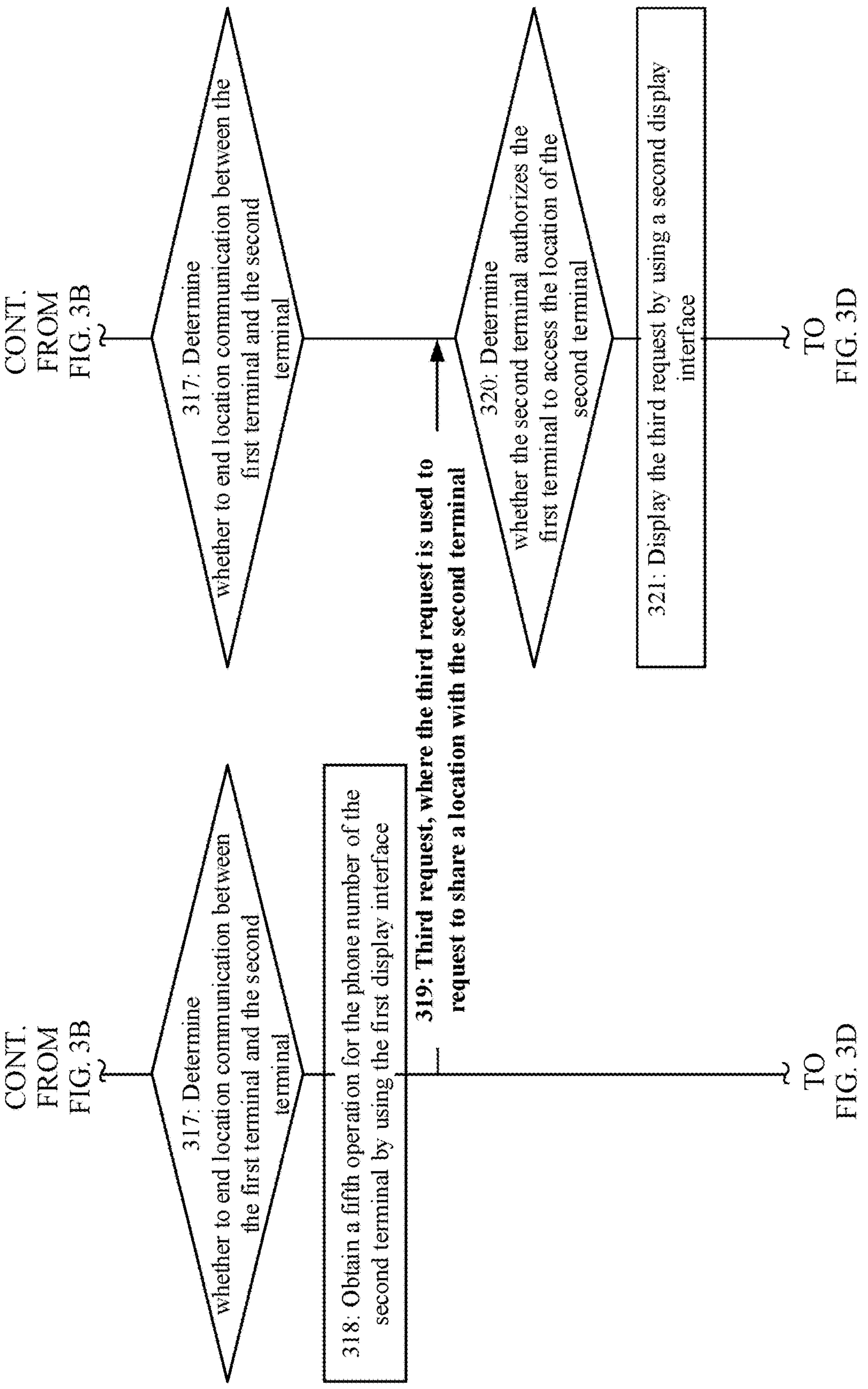
Figure 3D:
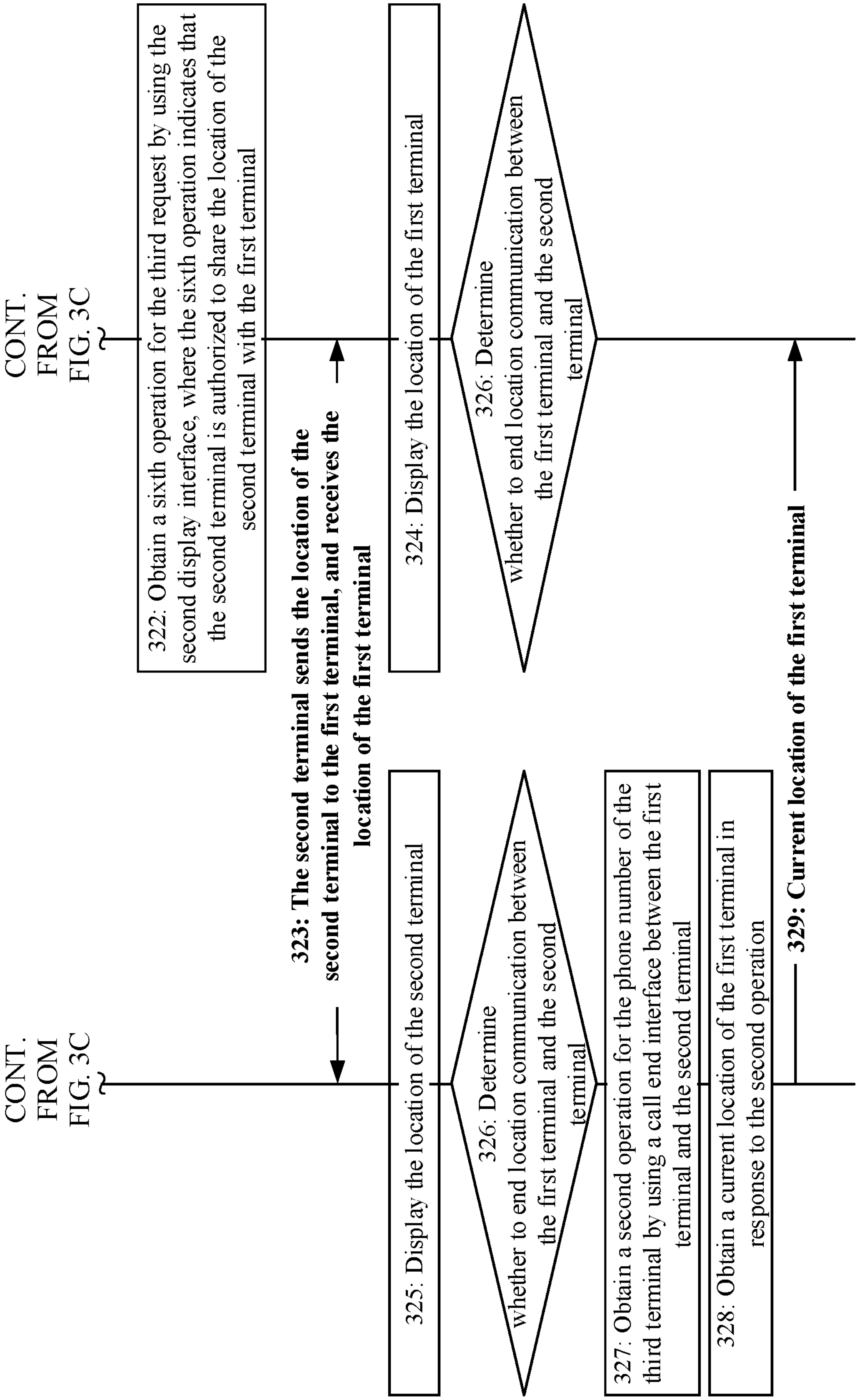

Next, because the location processing method provided in embodiments of the present disclosure is applicable to a terminal device, before a specific implementation procedure of the location processing method provided in embodiments of the present disclosure is described, refer to FIG. 2. FIG. 2 is a schematic diagram of a structure of a terminal device in a location processing method according to an embodiment of the present disclosure. The terminal device includes a processor module, a storage module, an input/output (I/O) interface module, a communication module, and a positioning module. The modules may be connected by using a bus.

The processor module is configured to parse, process, and calculate all data in the mobile phone. The storage module may store a contact list of a user. The I/O interface module may implement interaction with the user by using an input/output device such as a touchscreen, a keyboard, or a microphone.

The communication module may include a wireless cellular module, a WI-FI module, or another communication module. The positioning module includes but is not limited to a GPS positioning module, a base station positioning module, an UWB positioning module, a millimeter-wave radar positioning module, a Bluetooth positioning module, a geomagnetic positioning module, a WI-FI positioning module, or the like.

It should be understood that an actual terminal device may include more or fewer modules. The foregoing examples are merely intended to facilitate understanding of this solution, and are not intended to limit this solution.

Specifically, a processing module obtains a first operation for a phone number of a second terminal by using a first display interface in an I/O interface module, where the first display interface is a communication interface between a first terminal and the second terminal. In response to the first operation, the processing module sends a first request to the second terminal by using a communication module, where the first request is used to request to obtain a location of the second terminal. When the second terminal authorizes the first terminal to access the location of the second terminal, the processing module receives, by using the communication module, the location sent by the second terminal, to display the location of the second terminal by using the I/O interface module. A location of a peer party can be obtained without friend adding. This avoids disclosure of personal information of a user to help protect personal information privacy of the user, and omits a step of establishing a friend relationship, so that operation steps are simple, to help improve user viscosity. In addition, the location of the peer party is accessed only when the peer party performs authorization, to ensure controllability of location privacy of the user, thereby further protecting privacy of the user.

The first display interface may be specifically a call interface between the first terminal and the second terminal, or the first display interface is an SMS message interaction interface between the first terminal and the second terminal. Because specific procedures in the foregoing two cases are different, the following separately describes the foregoing two cases in detail.

1. The first display interface is an interface displayed when a call is performed.

In this embodiment of the present disclosure, FIG. 3A, FIG. 3B, FIG. 3C, and FIG. 3D are a schematic flowchart of a location processing method according to an embodiment of the present disclosure. The location processing method provided in this embodiment of the present disclosure may include the following steps.

301: A first terminal displays a first display interface, where the first display interface is an interface displayed when the first terminal performs a call with a second terminal.

In this embodiment of the present disclosure, in a process in which the first terminal performs a call with the second terminal, the first terminal may display the first display interface. The call is a call function included in an operating system, a Huawei MeeTime call, or another function of performing a call based on a phone number. The first display interface may display a phone number of the second terminal and/or a user name corresponding to the phone number of the second terminal. It should be noted that all steps performed by the first terminal in this embodiment of the present disclosure may be considered as being performed by a processing module of the first terminal.

302: The first terminal obtains a first operation for the phone number of the second terminal by using the first display interface.

In this embodiment of the present disclosure, the first terminal may obtain the first operation for the phone number of the second terminal by using the first display interface. The first operation is used to trigger the first terminal to send a request for accessing a location of the second terminal to the second terminal, to form location communication between the first terminal and the second terminal.

The first display interface may display the phone number of the second terminal and/or the user name of the phone number of the second terminal. If the first display interface displays the phone number of the second terminal, all operations obtained by the first terminal by using the first display interface may be considered as operations for the phone number of the second terminal. If the first display interface displays only the user name of the phone number of the second terminal, because the first terminal stores the phone number that is of the second terminal and that corresponds to the user name, all operations obtained by the first terminal by using the first display interface may be considered as operations for the phone number of the second terminal.

Specifically, in a case, a first icon may be set on the first display interface. When receiving a touch operation performed by a user on the first icon, the first terminal may determine that the first terminal obtains the first operation for the phone number of the second terminal by using the first display interface, that is, the first icon may be set to a trigger icon of the first operation. The touch operation may be a tap operation, a double-tap operation, a triple-tap operation, a touch and hold operation, a slide operation, a drag operation, or another type of touch operation. The drag operation is dragging the first icon to a preset location. This is not limited herein.

In another case, the first icon is an enable icon for performing location communication between the first terminal and the second terminal. When the first terminal receives a touch operation by using the first icon on the first display interface, the first terminal is triggered to output selection information of a location communication mode. The selection information may be output in a form of a text box, in a form of an icon, or another non-voice form. The location communication mode may include "authorize the peer party to access my location", "apply for access to the location of the peer party", "share location", or another type of location communication mode. When the first terminal receives a selection operation performed by the user on the communication mode "apply for access to the location of the peer party", it is considered that the first operation is obtained by using the first display interface. The selection operation may be any type of touch operation. For an explanation of the touch operation, refer to the foregoing description. Specifically, the selection operation may be flexibly set with reference to an actual application scenario.

Figure 4A:
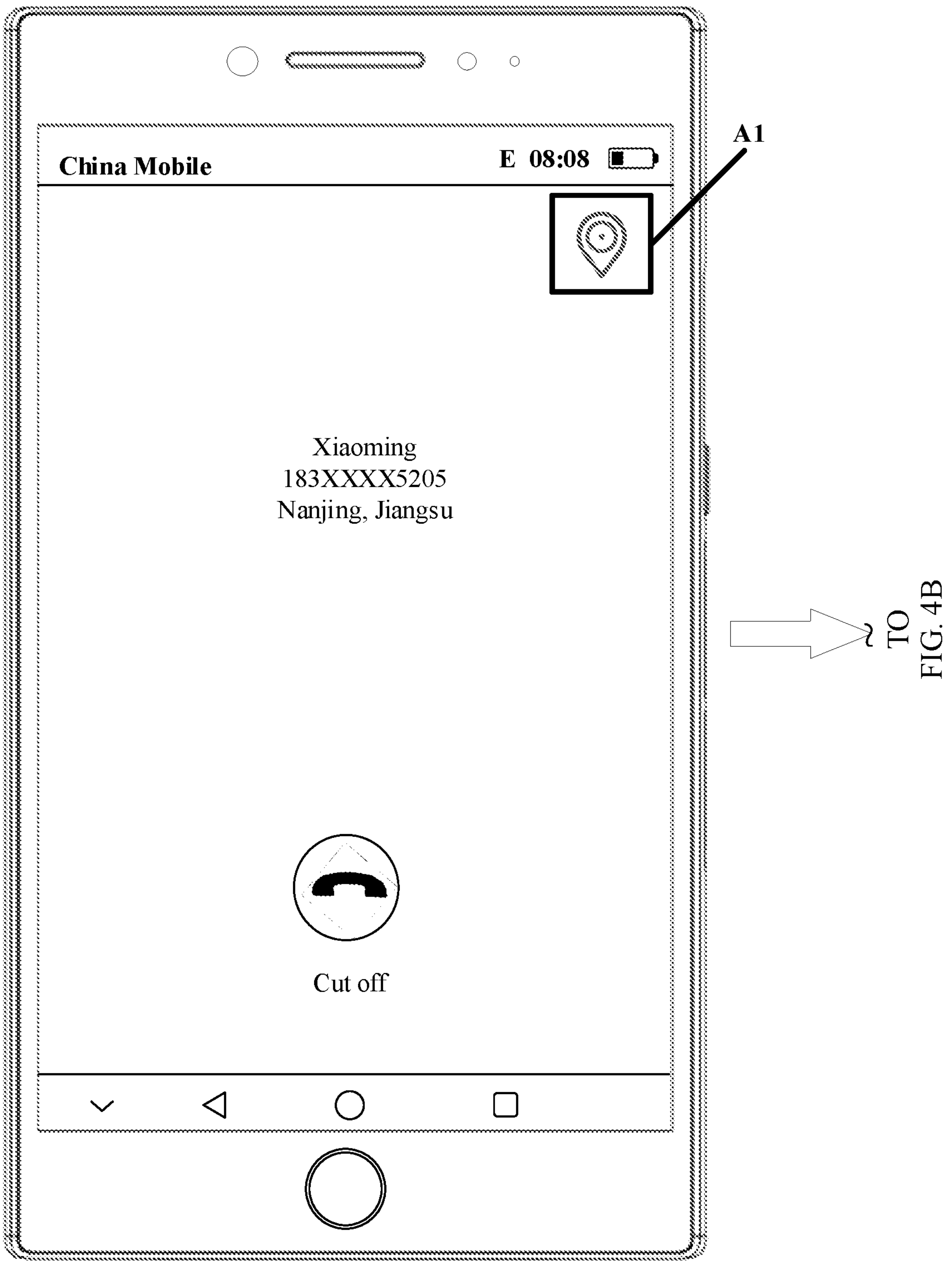
FIG. 4A and FIG. 4B are a schematic flowchart of obtaining a first operation in a location processing method according to an embodiment of the present disclosure.
Figure 4B:
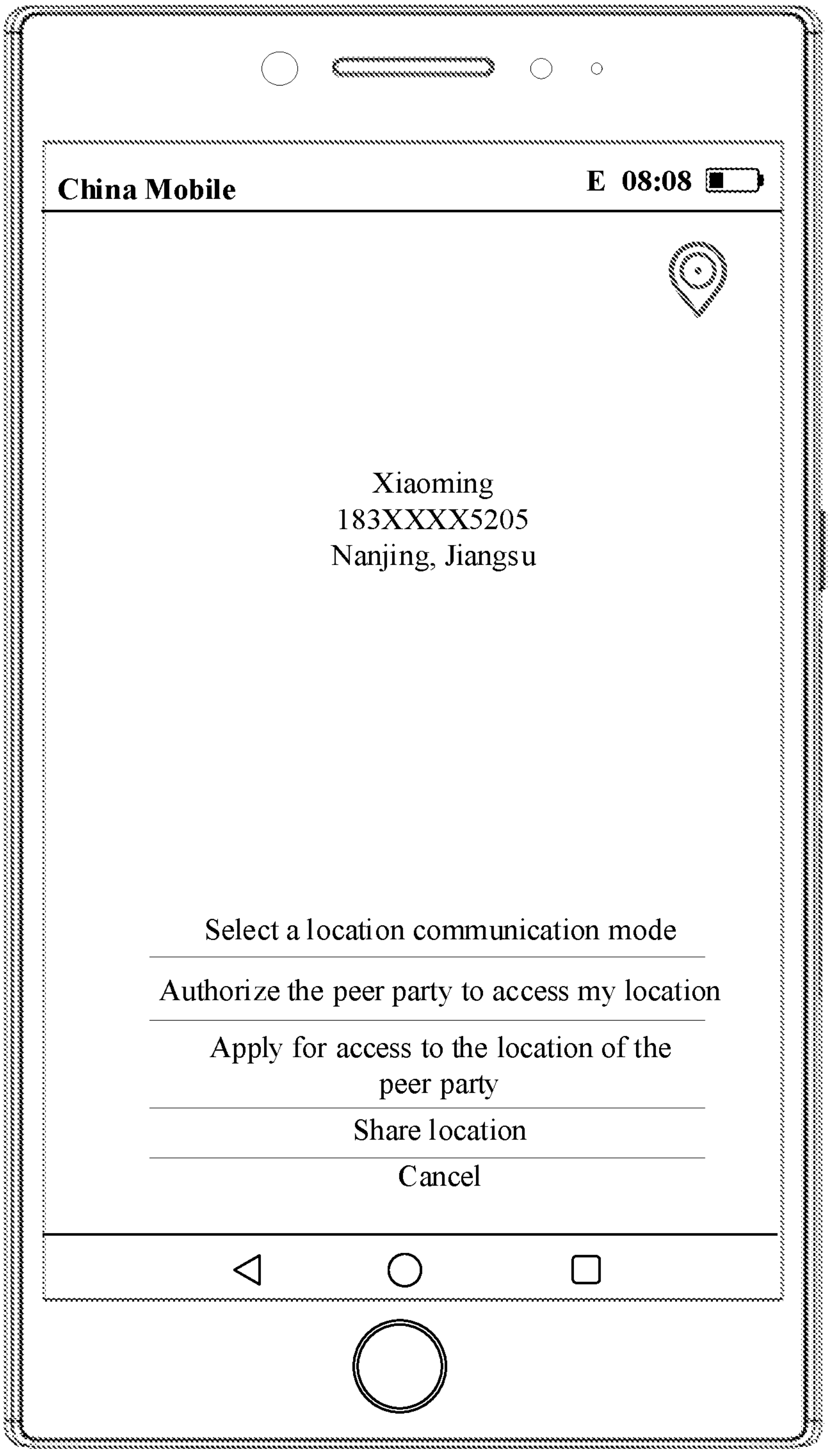

To further understand this solution, refer to FIG. 4A and FIG. 4B. FIG. 4A and FIG. 4B are a schematic flowchart of obtaining a first operation in a location processing method according to an embodiment of the present disclosure. In FIG. 4A and FIG. 4B, for example, the first icon is an enable icon for performing location communication between the first terminal and the second terminal. FIG. 4A and FIG. 4B include two schematic sub-diagrams FIG. 4A and FIG. 4B. Both the schematic sub-diagram FIG. 4A and the schematic sub-diagram FIG. 4B display the phone number of the second terminal. In the schematic sub-diagram FIG. 4A, A1 represents the first icon. When the user taps A1, the first terminal is triggered to enter the schematic sub-diagram FIG. 4B. The first terminal outputs the selection information of the location communication mode. In FIG. 4A and FIG. 4B, for example, the selection information is shown by using a text box. When the user taps the communication mode "apply for access to the location of the peer party", the first terminal obtains the first operation for the phone number of the second terminal. It should be understood that the example in FIG. 4A and FIG. 4B is merely intended to facilitate understanding of this solution, and is not intended to limit this solution.

In another case, no first icon may be set on the first display interface. When the user inputs a first touch operation by using the first interface, it is considered that the first operation for the phone number of the second terminal is input by using the first display interface. The first touch operation may be specifically a touch operation of a preset type, a slide operation of a preset shape, or the like. As an example, when the user inputs a "1"-shaped slide operation by using the first display interface, it is considered that the first operation is input. As another example, when the user inputs a touch and hold operation by using the first display interface, it is considered that the first operation is input. This is not exhaustively described herein.

In another case, no first icon may be set on the first display interface. When the user inputs the first touch operation by using the first interface, it is considered that an enable operation for performing location communication between the first terminal and the second terminal is input by using the first display interface, to trigger the first terminal to output the selection information of the location communication mode, and the like.

The foregoing examples of various specific implementations in which the first terminal obtains the first operation for the phone number of the second terminal by using the first display interface are merely intended to facilitate understanding of this solution. A specific implementation may be determined with reference to an actual product form. This is not limited herein.

303: The first terminal sends a first request to the second terminal in response to the first operation.

In this embodiment of the present disclosure, after obtaining the first operation for the phone number of the second terminal by using the first display interface, the first terminal sends the first request to the second terminal in response to the first operation. Specifically, because an information transfer channel of call content has been established between the first terminal and the second terminal in call connection, the channel may be reused for the first request.

The first request is used to indicate that the first terminal requests to access a real-time location of the second terminal. Optionally, the first request carries a media access control address (MAC) of the second terminal, used to establish short-distance communication between the first terminal and the second terminal.

304: The second terminal determines whether the second terminal authorizes the first terminal to access the location of the second terminal; and if the second terminal does not authorize the first terminal to access the location of the second terminal, enters step 305; or if the second terminal authorizes the first terminal to access the location of the second terminal, enters step 307.

In this embodiment of the present disclosure, after receiving the first request sent by the first terminal, the second terminal learns that the first terminal requests to access the location of the second terminal, and then determines whether the second terminal authorizes the first terminal to access the location of the second terminal. It should be noted that all steps performed by the second terminal in this embodiment of the present disclosure may be considered as being performed by a processing module of the second terminal.

The second terminal may receive a related setting of a user for a location communication function in advance by using a setting interface of the second terminal. The second terminal may obtain any one or more of the following information by using the setting interface: whether the second terminal authorizes a terminal other than the second terminal to access the location of the second terminal based on the phone number of the second terminal, that is, whether the second terminal allows, by default through setting, a peer party that performs a call with the second terminal to access the location of the second terminal; authorized time during which the second terminal authorizes a terminal other than the second terminal to access the location of the second terminal based on the phone number of the second terminal, where the preset authorized time is a preset time period, that is, only within the preset authorized time period, a peer party that performs a call with the second terminal is allowed, by default, to obtain the location of the second terminal; a whitelist, where the whitelist corresponds to a phone number of at least one terminal, and each of the at least one terminal corresponding to the whitelist is authorized to access the location of the second terminal based on the phone number of the second terminal, that is, only when a phone number for performing a call with the second terminal is the phone number of the at least one terminal corresponding to the whitelist, a peer party can access the location of the second terminal by default; and the whitelist may prestore the phone number of the at least one terminal, or may prestore a user name corresponding to the at least one terminal, where the second terminal can obtain a phone number of each terminal based on a user name of each terminal; whether to authorize, after a call between the second terminal and a terminal other than the second terminal ends if the second terminal forms location communication with the terminal other than the second terminal in a call process, the terminal other than the second terminal to continue to access the location of the second terminal, that is, whether to continue to authorize, after the first terminal ends the call if the first terminal forms location communication with the terminal other than the second terminal in the call process, the terminal other than the second terminal to access the location of the second terminal; and authorized duration during which a terminal other than the second terminal is authorized, after a call between the second terminal and the terminal other than the second terminal ends if the second terminal forms location communication with the terminal other than the second terminal in a call process, to continue to access the location of the second terminal, where the information is used to further ensure privacy security of the user. As an example, a courier may perform a setting that a terminal can be positioned within one hour after a call ends, and a delivery man/an express driver may perform a setting that a terminal can be positioned within 10 minutes after a call ends.

In this embodiment of the present disclosure, location information sharing may be preset from a plurality of dimensions by using the setting interface. This is convenient and fast.

Figure 5:
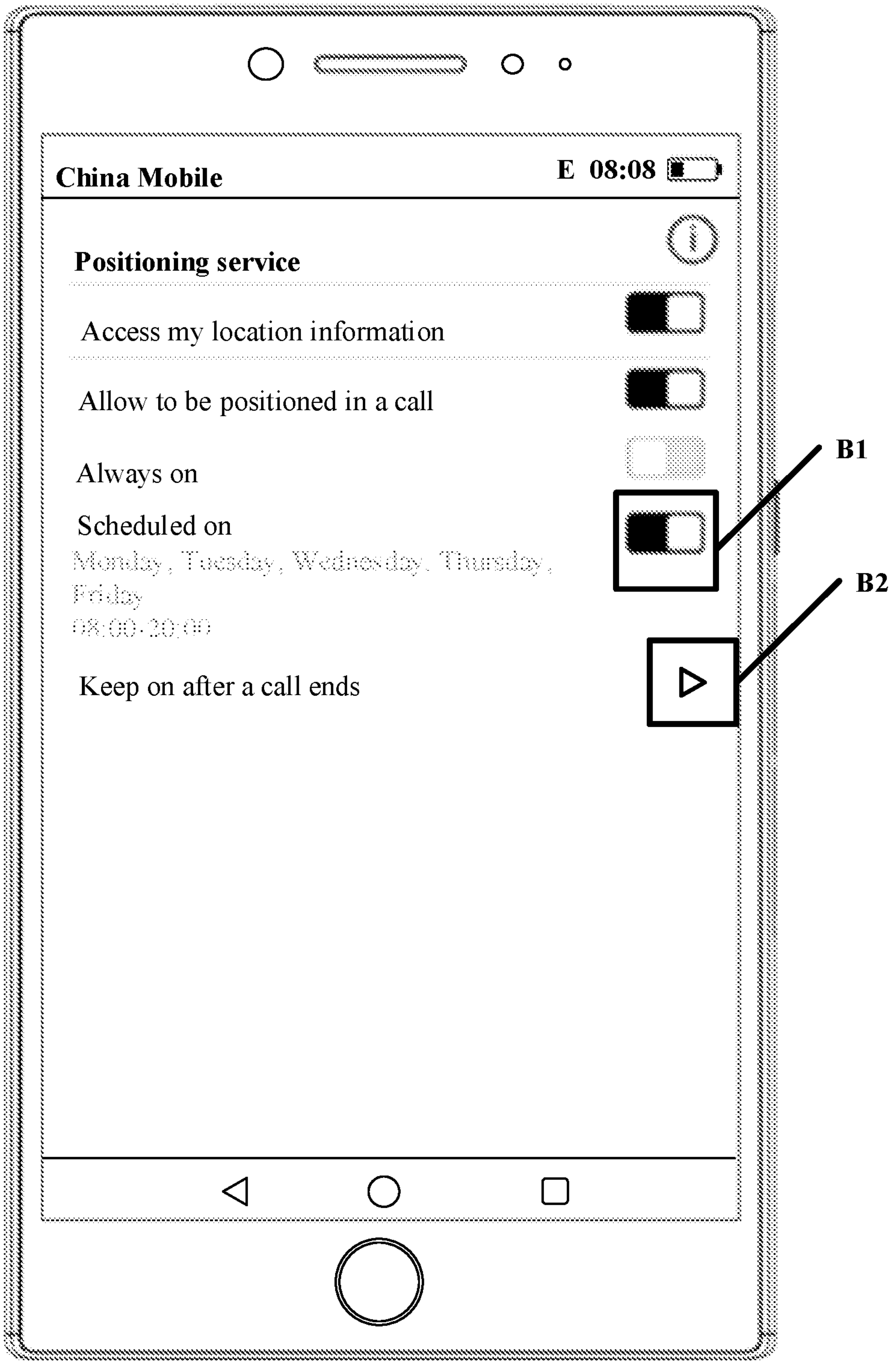
FIG. 5 is a schematic interface diagram of a setting interface in a location processing method according to an embodiment of the present disclosure.

To more intuitively understand this solution, refer to FIG. 5. FIG. 5 is a schematic interface diagram of a setting interface in a location processing method according to an embodiment of the present disclosure. As shown in FIG. 5, information that can be obtained by using the setting interface is as follows: whether the location of the second terminal is allowed to be obtained; whether to authorize, when the second terminal performs a call with another terminal, the another terminal to access the location of the second terminal; authorized time during which the second terminal authorizes a terminal other than the second terminal to access the location of the second terminal based on the phone number of the second terminal, where when the user taps B1, the second terminal may be triggered to enter a setting interface of the authorized time; authorized duration during which a terminal other than the second terminal is authorized, after a call between the second terminal and the terminal other than the second terminal ends, to continue to access the location of the second terminal, where when the user taps B2, the second terminal may be triggered to enter a setting interface of the authorized duration; and the like. It should be understood that in an actual case, more or fewer types of information may be obtained by using a setting interface. The example in FIG. 5 is merely intended to facilitate understanding of this solution, and is not intended to limit this solution.

It should be noted that the foregoing setting interface may also exist in the first terminal, and the first terminal may also set the foregoing information by using the setting interface.

Specifically, the second terminal may store any one or more of the foregoing setting information. In this case, step 303 may include: determining whether the second terminal authorizes a terminal other than the second terminal to access the location of the second terminal based on the phone number of the second terminal; and if yes, considering that the second terminal authorizes the first terminal to access the location of the second terminal; or if no, directly considering that the second terminal does not authorize the first terminal to access the location of the second terminal.

Alternatively, step 303 may include: determining whether current access time of the first terminal falls within authorized time preset by the second terminal; and if yes, considering that the second terminal authorizes the first terminal to access the location of the second terminal; or if no, directly considering that the second terminal does not authorize the first terminal to access the location of the second terminal.

Alternatively, step 303 may include: determining whether a phone number of the first terminal can be obtained based on the whitelist of the second terminal; and if yes, considering that the second terminal authorizes the first terminal to access the location of the second terminal; or if no, directly considering that the second terminal does not authorize the first terminal to access the location of the second terminal.

The foregoing three determining manners may be alternatively used in combination. For example, if the second terminal does not authorize the terminal other than the second terminal to access the location of the second terminal based on the phone number of the second terminal, it may be further determined whether the phone number of the first terminal can be obtained based on the whitelist of the second terminal. This is not limited herein.

Optionally, the foregoing setting information of the second terminal may be synchronized to a server, so that the foregoing setting information can be transferred with transfer of a subscriber identification module (SIM). The call in this embodiment of the present disclosure may be a call function included in an operating system, or may be a Huawei MeeTime call or another type of call. Correspondingly, the foregoing setting information may be transferred with transfer of application accounts in various types of call applications, for example, an account in a MeeTime call application.

305: The second terminal displays the first request by using a third display interface.

In this embodiment of the present disclosure, the second terminal receives the first request for the phone number of the second terminal by using the third display interface, to query whether the user of the second terminal allows the first terminal to access the location of the second terminal. Specifically, the phone number of the first terminal is displayed on a fourth interface; and the third display interface may be a call interface between the first terminal and the second terminal, may be a home screen of the second terminal, or may be a display interface of another application in the second terminal, or the like. The second terminal may display the first request in a form of a text, a pop-up box, an icon, a floating window, or the like. A specific display form is not limited herein. Further, when the third display interface is a different interface, a display form of the first request may be different. For example, if the third display interface is a call interface between the first terminal and the second terminal, the first request may be output in a form of a pop-up box and vibration. For another example, if the third display interface is a home screen of the first terminal, the first request may be output in a form of a card, and the phone number of the first terminal is displayed in the first request in the form of the card. This is not exhaustively described herein.

It should be noted that step 304 is an optional step. If the foregoing setting interface does not exist in the second terminal, step 304 does not need to be performed, and step 305 may be directly entered after step 303 is performed.

306: The second terminal obtains a third operation for the first request by using the third display interface, where the third operation indicates that the first terminal is authorized to access the location of the second terminal.

In this embodiment of the present disclosure, after the second terminal displays the first request, the user may see query information that the first terminal requests to access the location of the second terminal, and then input a response operation for the first request by using the third display interface. The third operation and a reject operation each may be various types of touch operations. For a description of the touch operation, refer to the description in step 301. Specifically, a type of the third operation may be flexibly set with reference to a display form of the first request and an actual application product.

Specifically, in a case, the second terminal can obtain the third operation for the first request by using the third display interface, where the third operation indicates that the first terminal is authorized to access the location of the second terminal. In this case, the second terminal continues to enter step 307. In another case, the second terminal can obtain the reject operation for the first request by using the third display interface, where the reject operation indicates that accessing the location of the second terminal by the first terminal is rejected.

Optionally, after the second terminal obtains the third operation for the first request by using the third display interface, that is, after the second terminal determines that the first terminal is authorized to access the location of the second terminal, the second terminal may be triggered to display the setting interface of the authorized time. The authorized time may be authorized duration or an authorized time period, and the authorized duration starts from an authorization moment.

Figure 6A:
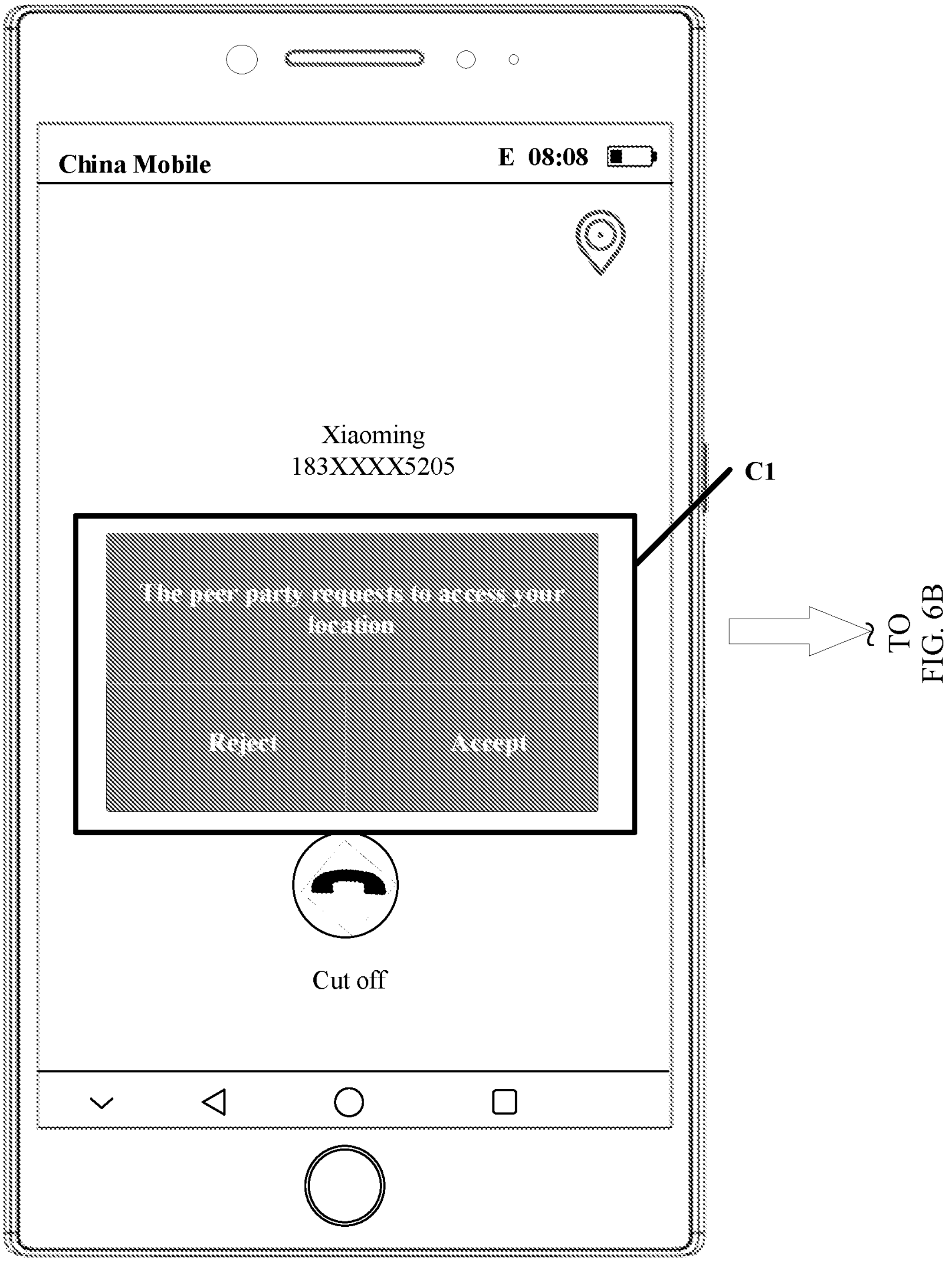
FIG. 6A and FIG. 6B are a schematic flowchart of obtaining a third operation in a location processing method according to an embodiment of the present disclosure.
Figure 6B:
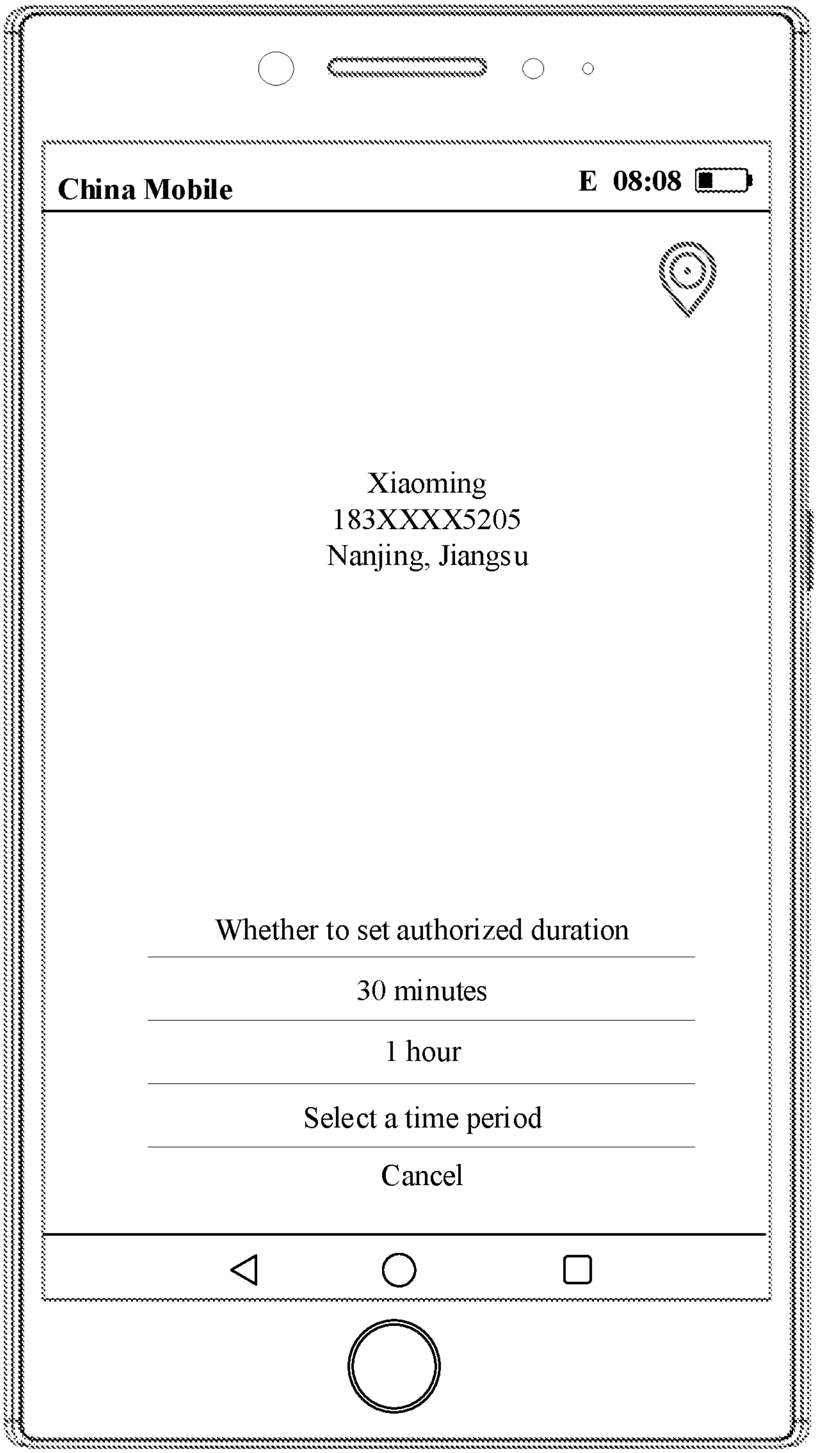

To further understand this solution, refer to FIG. 6A and FIG. 6B. FIG. 6A and FIG. 6B are a schematic flowchart of obtaining a third operation in a location processing method according to an embodiment of the present disclosure. In FIG. 6A and FIG. 6B, for example, the first icon is an enable icon for performing location communication between the first terminal and the second terminal. FIG. 6A and FIG. 6B include two schematic sub-diagrams FIG. 6A and FIG. 6B. Both the schematic sub-diagram FIG. 6A (an example of the third display interface) and the schematic sub-diagram FIG. 6B display the phone number of the first terminal. In the schematic sub-diagram FIG. 6A, C1 represents the first request displayed by the second terminal by using the third display interface, and the first request is sent by the first terminal to the second terminal for the phone number of the second terminal. When the user taps an "accept" button, it is considered that the third operation for the first request is obtained by using the third display interface, and the second terminal is triggered to enter the schematic sub-diagram FIG. 6B. The schematic sub-diagram FIG. 6B represents the setting interface of the authorized time. In FIG. 6A and FIG. 6B, for example, setting information of the authorized time is output by using a text box. It should be understood that the example in FIG. 6A and FIG. 6B is merely intended to facilitate understanding of this solution, and is not intended to limit this solution.

307: The first terminal receives the location that is of the second terminal and that is sent by the second terminal.

In this embodiment of the present disclosure, if step 307 is entered by using step 306, step 307 may include: the second terminal sends the location of the second terminal to the first terminal in response to the third operation. If step 307 is entered by using step 304, step 307 may include: the second terminal sends the location of the second terminal to the first terminal based on the received first request. Correspondingly, the first terminal receives the location sent by the second terminal, that is, location communication is formed between the first terminal and the second terminal. Further, when the second terminal sends location information to the first terminal for the first time, the location information may further carry the MAC address or other identification information of the second terminal, to establish a short-distance wireless communication connection in a subsequent process.

It should be noted that the first terminal may alternatively receive the location of the second terminal from a base station, that is, the location of the second terminal may not be sent by the second terminal to the first terminal.

Optionally, if the second terminal sets the authorized duration in step 306, when the second terminal sends location information to the first terminal for the first time, the location information may further carry the authorized duration.

A distance between the first terminal and the second terminal may be changed, and the second terminal sends a real-time location to the first terminal. Therefore, when a location distance between the first terminal and the second terminal is greater than or equal to a first distance value, the second terminal generates a real-time location of the second terminal by using a long-distance wireless positioning technology. The long-distance wireless positioning technology is a technology that implements positioning by using a communication technology other than short-distance wireless communication, and includes but is not limited to GPS positioning, base station positioning, or another type of positioning technology.

Specifically, a GPS module, a base station positioning module, or another type of long-distance positioning module of the second terminal obtains the location of the second terminal, and sends the location of the second terminal to the first terminal. Because the information transfer channel of the call content has been established between the first terminal and the second terminal in the call connection, the channel may also be reused for transmission of the location of the second terminal.

When a location distance between the first terminal and the second terminal is less than the first distance value, the first terminal interacts with the second terminal by using a short-distance wireless positioning technology, to generate a real-time location of the second terminal. The short-distance wireless positioning technology includes but is not limited to UWB positioning, millimeter-wave radar positioning, Bluetooth positioning, geomagnetic positioning, WI-FI positioning, or another type of short-distance wireless communication technology.

Specifically, the second terminal may scan the first terminal by using a UWB module, a millimeter-wave radar module, a Bluetooth module, a WI-FI module, or a geomagnetic module. After the first terminal successfully establishes short-distance wireless communication with the second terminal, the second terminal may send the location of the second terminal to the first terminal through short-distance wireless communication.

In this embodiment of the present disclosure, when the location distance between the first terminal and the second terminal is greater than or equal to the first distance value, the location of the second terminal is obtained based on the long-distance wireless positioning technology. When the location distance between the first terminal and the second terminal is less than the first distance value, the location of the second terminal is obtained based on the short-distance wireless positioning technology. The terminal may flexibly switch a positioning technology used when the location of the second terminal is generated, to help improve accuracy of the obtained location of the second terminal.

Further, the foregoing first distance value may not be a preset fixed value, but may be determined based on a plurality of factors. The first distance value may be different in different scenarios or different terminals. That is, when a distance between the first terminal and the second terminal is relatively long, a long-distance wireless communication technology is used to obtain the location of the second terminal. When a distance between the first terminal and the second terminal is relatively short, a short-distance wireless communication technology is used to obtain the location of the second terminal.

Theoretically, a maximum range that can be detected by using the UWB positioning technology is about 200 meters. Therefore, a second distance value may be preset in the first terminal, and the second distance value may be set to a value greater than 200 meters, for example, 260 meters, 280 meters, 300 meters, or another value. When a distance between the first terminal and the second terminal is less than or equal to the second distance value, the first terminal enables a short-distance wireless communication module, that is, enables a UWB module, a Bluetooth module, a WI-FI module, a geomagnetic module, or the like, to perform scanning to discover the second terminal, and then establishes short-distance wireless communication between the first terminal and the second terminal. The first distance value is a distance value that is between the first terminal and the second terminal and that is obtained when UWB communication or millimeter-wave radar communication is established between the first terminal and the second terminal. The first distance value is less than the second distance value. As an example, the first distance value may be 200 meters, 120 meters, 80 meters, 50 meters, or another value. A specific value needs to be determined with reference to an actual case.

Further, compared with Bluetooth positioning, geomagnetic positioning, and WI-FI positioning, UWB positioning and millimeter-wave radar positioning have higher accuracy in the short-distance wireless positioning technology. Therefore, in this embodiment, a location obtained through UWB positioning and/or millimeter-wave radar positioning measurement may be used as a reference, and a location obtained through Bluetooth positioning, geomagnetic positioning, and/or WI-FI positioning measurement is used as assistance, to improve positioning accuracy.

Optionally, a location obtained through Bluetooth positioning, geomagnetic positioning, or WI-FI positioning measurement may also assist in improving accuracy of a location obtained through GPS positioning or base station positioning measurement. Further, optionally, a sensor module such as a gyroscope sensor may be used to assist in improving accuracy of long-distance wireless positioning and short-distance wireless positioning.

It should be noted that in an actual case, more types or fewer types of long-distance wireless positioning technologies and short-distance wireless positioning technologies may be used. The foregoing examples are merely intended to facilitate understanding of this solution, and are not intended to limit this solution.

Optionally, when a change rule of an absolute location of the second terminal meets a second change rule, the second terminal outputs second query information, where the second query information is used to indicate whether to send prompt information to the first terminal. In this embodiment of the present disclosure, the first terminal may not display the location of the second terminal in real time every second. Therefore, when the change rule of the absolute location of the second terminal meets the second change rule, it may be queried whether the second terminal is to send the prompt information to the first terminal, to prompt the user of the first terminal to pay attention to a track change status of the second terminal in time.

The second change rule may be determined by using an acceleration parameter of the second terminal, a motion status of the second terminal, or another type of parameter. The second change rule may be specifically that the second terminal starts to move after stationary time exceeds a first threshold. The second query information may be output in any one or more of the following manners: a pop-up box, a sound, vibration, and the like.

Specifically, in an implementation, after starting to send the real-time location to the first terminal, the second terminal may start to monitor the change rule of the absolute location of the second terminal, and then determine, based on the change rule of the absolute location of the second terminal, whether the second change rule is met. If the second change rule is met, the second terminal outputs the second query information. If a result obtained by the second terminal for the second query information is sending acknowledgment, the second terminal sends the prompt information to the first terminal. If a result obtained by the second terminal for the second query information is sending rejection, the second terminal does not send the prompt information to the first terminal.

In another implementation, after the second terminal starts to send the real-time location to the first terminal, the first terminal may start to monitor the change rule of the absolute location of the second terminal, and determine, based on the change rule of the absolute location of the second terminal, whether the second change rule is met. If the second change rule is met, the second terminal sends a prompt instruction to the first terminal. The second terminal outputs the second query information in response to the received prompt instruction.

Optionally, when the change rule of the absolute location of the second terminal meets the second change rule, the first terminal may output prompt information, to indicate that a change track of the second terminal is relatively large, to remind the user to pay attention to a change status of the location of the second terminal in time.

308: The first terminal displays the location of the second terminal on a second display interface.

In this embodiment of the present disclosure, after receiving the real-time location of the second terminal, the first terminal may display the real-time location of the second terminal on the second display interface. It should be noted that because total duration during which the first terminal needs to obtain the location of the second terminal may be relatively long, the first terminal does not necessarily display the location of the second terminal in real time every second. For example, when the first terminal is screen-off in a process of performing a call with the second terminal, the first terminal only receives the location of the second terminal, and does not display the location of the second terminal. As another example, in a process of performing a call and location communication with the second terminal, the first terminal may enable another application such as Email or Messaging, and the first terminal only receives the location of the second terminal, and does not display the location of the second terminal. This is not exhaustively described herein.

Optionally, after receiving a real-time location of the second terminal, the first terminal may invoke a navigation-type application in the first terminal to generate navigation information, and display the navigation information on the second display interface, where the navigation information indicates a navigation path between the first terminal and the second terminal. Further, because a location of the first terminal and the location of the second terminal may be continuously changed, the first terminal may continuously update navigation information between the first terminal and the second terminal by using the navigation-type application. Correspondingly, the first terminal may continuously update a navigation path that is between the first terminal and the second terminal and that is displayed on the second display interface. In this embodiment of the present disclosure, not only the location of the second terminal but also the navigation path between the first terminal and the second terminal may be displayed, so that the first terminal can more conveniently find the second terminal, thereby further improving convenience of this solution.

Specifically, in a case, step 308 includes: displaying the location of the second terminal on a call interface between the first terminal and the second terminal. The first terminal may display a location of the second terminal relative to the first terminal on the call interface, may display an absolute location of the second terminal on the call interface, or may display an absolute location of the first terminal and an absolute location of the second terminal on the call interface.

In another case, step 308 includes: if the first terminal exits a call interface between the first terminal and the second terminal in a process of performing a call with the second terminal, that is, the second display interface is not the call interface between the first terminal and the second terminal, for example, the first terminal exits to a home screen of the first terminal, or exits to a display interface of another application in the first terminal, for example, a display interface of Messaging, or a display interface of an instant messaging application, which is not exhaustively described herein, the first terminal may display the location of the second terminal by using a floating window.

Further, the floating window directly displays a direction and a distance of the second terminal relative to the first terminal. The floating window may be a floating window with an arrow, to indicate the direction of the second terminal relative to the first terminal based on the arrow.

Optionally, a location of the floating window on the second display interface corresponds to a direction of the second terminal relative to the first terminal; and the floating window may move around the second display interface as the relative direction of the second terminal changes, to indicate the change of the relative direction. For example, if the second terminal is located on a left front side of the first terminal, the floating window is located at an upper left corner of the second display interface; or if the second terminal is located on a right rear side of the first terminal, the floating window is located at a lower right corner of the second display interface. This is not exhaustively described herein.

Alternatively, a style of the floating window corresponds to a distance of the second terminal relative to the first terminal, and the style of the floating window includes one or more of the following: a size, a color, a shape, and transparency of the floating window. For example, as a distance between the second terminal and the first terminal becomes shorter, the floating window becomes larger, a color becomes darker, or transparency decreases; and as a distance between the second terminal and the first terminal becomes longer, the floating window becomes smaller, a color becomes lighter, or transparency increases. The foregoing examples are merely intended to facilitate understanding of this solution, and the floating window needs to be specifically designed with reference to an actual application scenario.

In this embodiment of the present disclosure, the floating window may change as the direction or the distance of the second terminal relative to the first terminal, so that the user can more intuitively perceive a location change between the second terminal and the first terminal.

Figure 7:
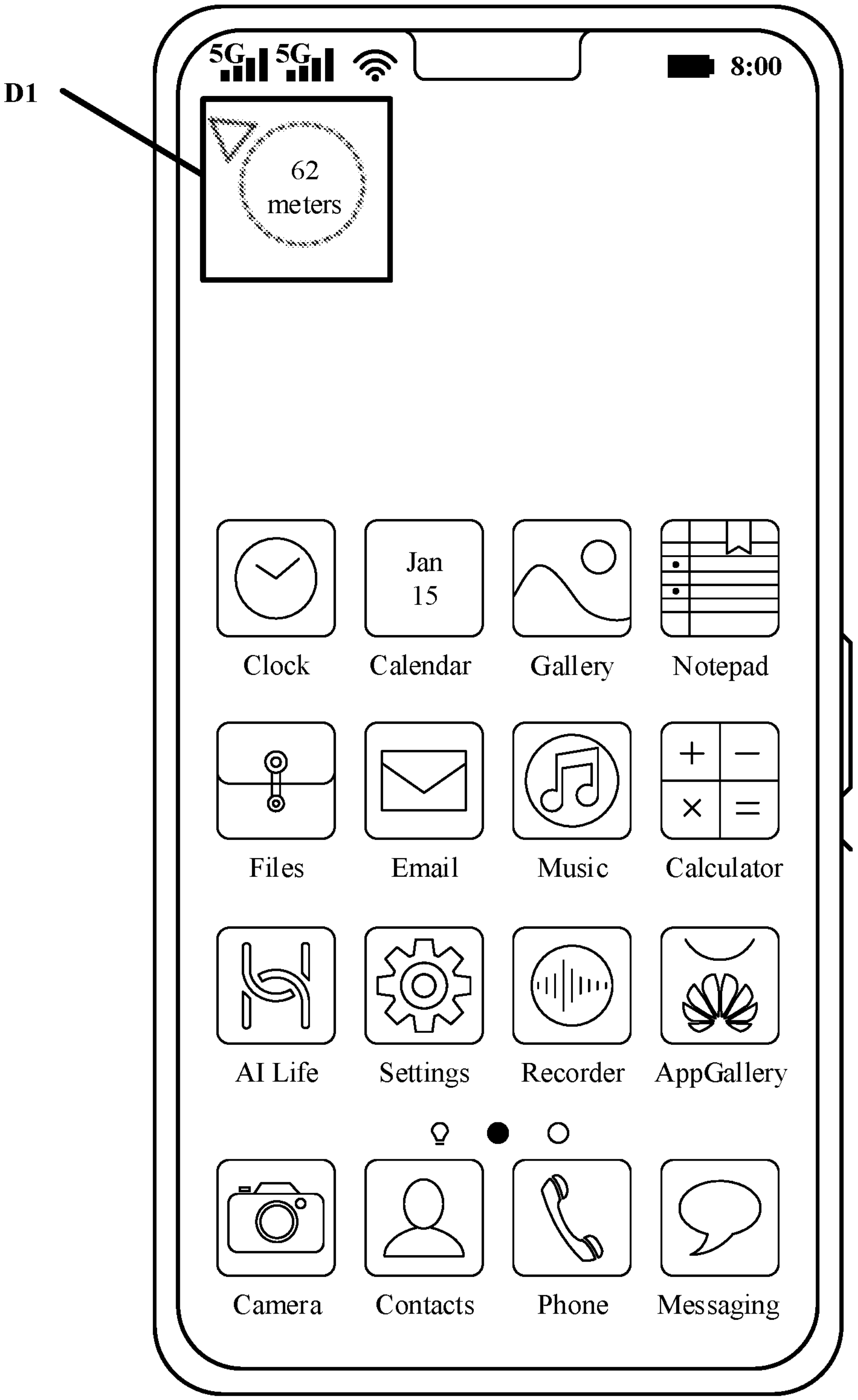
FIG. 7 is a schematic interface diagram of a second display interface in a location processing method according to an embodiment of the present disclosure.

To more intuitively understand this solution, refer to FIG. 7. FIG. 7 is a schematic interface diagram of a second display interface in a location processing method according to an embodiment of the present disclosure. In FIG. 7, for example, the floating window is displayed on a home screen (for example, the second display interface is the home screen). D1 represents the floating window, an arrow at an upper left corner of D1 is used to indicate that the second terminal is located on a left front side of the first terminal, a distance value shown in D1 represents a distance of the second terminal relative to the first terminal, and D1 is located at an upper left corner of the home screen, corresponding to a direction of the second terminal relative to the first terminal. It should be understood that the example in FIG. 7 is merely intended to facilitate understanding of this solution, and is not intended to limit this solution.

In another case, step 308 includes: if the first terminal exits a call interface between the first terminal and the second terminal in a process of performing a call with the second terminal, that is, the second display interface is not the call interface between the first terminal and the second terminal, a trigger icon of the location of the second terminal may be displayed on the second display interface. For example, the trigger icon may be set in a status bar, or may be set on the second display interface by using a floating window.

When the user performs a touch operation on the trigger icon, the location of the second terminal is triggered to be displayed. The first terminal may display the location of the second terminal by using a card. In actual application, a type of the touch operation may be selected based on an actual case. The card may display a location of the second terminal relative to the first terminal, may display an absolute location of the second terminal, or may display an absolute location of the first terminal and an absolute location of the second terminal.

Figure 8A:
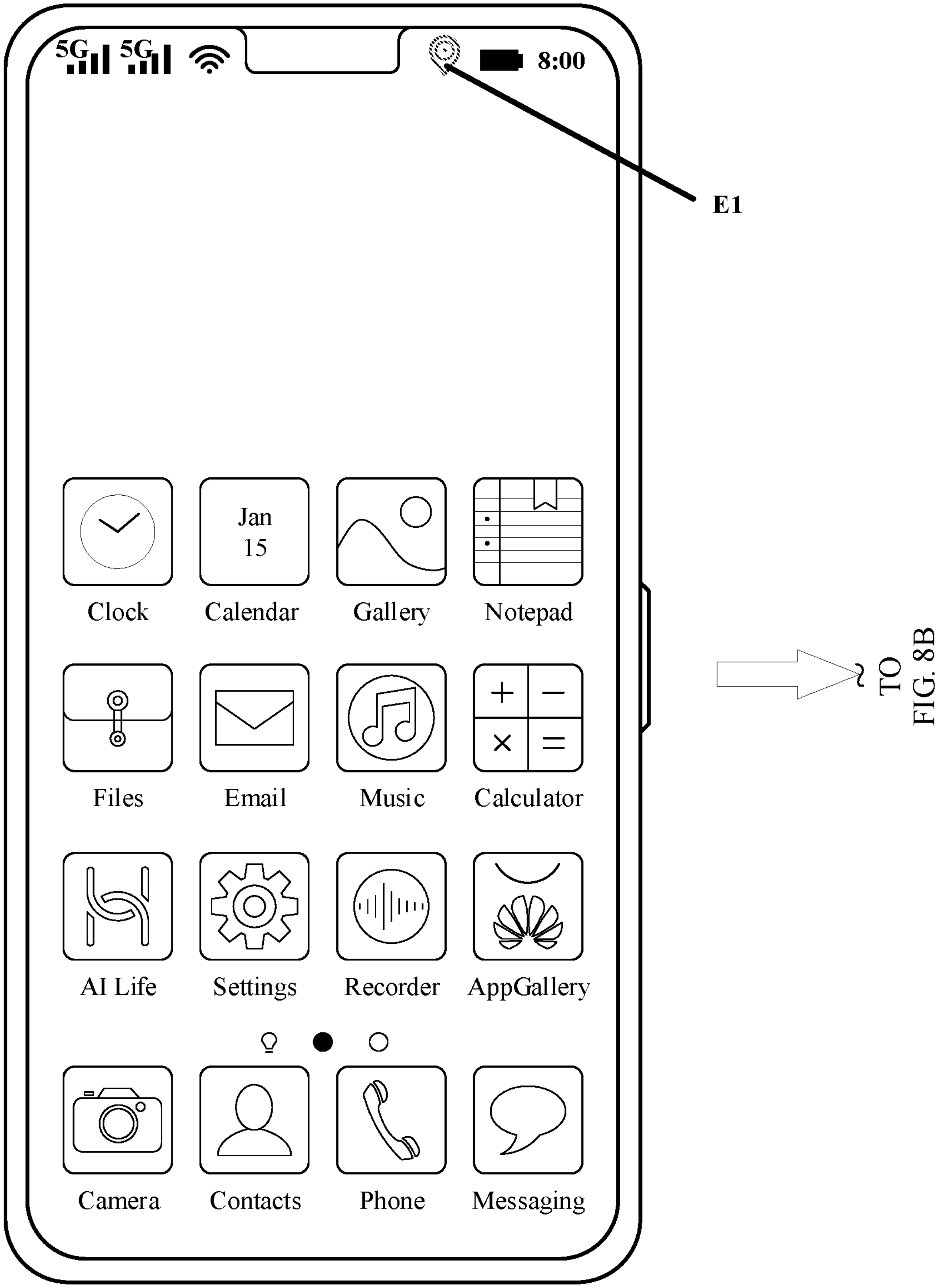
FIG. 8A and FIG. 8B are another schematic interface diagram of a second display interface in a location processing method according to an embodiment of the present disclosure.
Figure 8B:
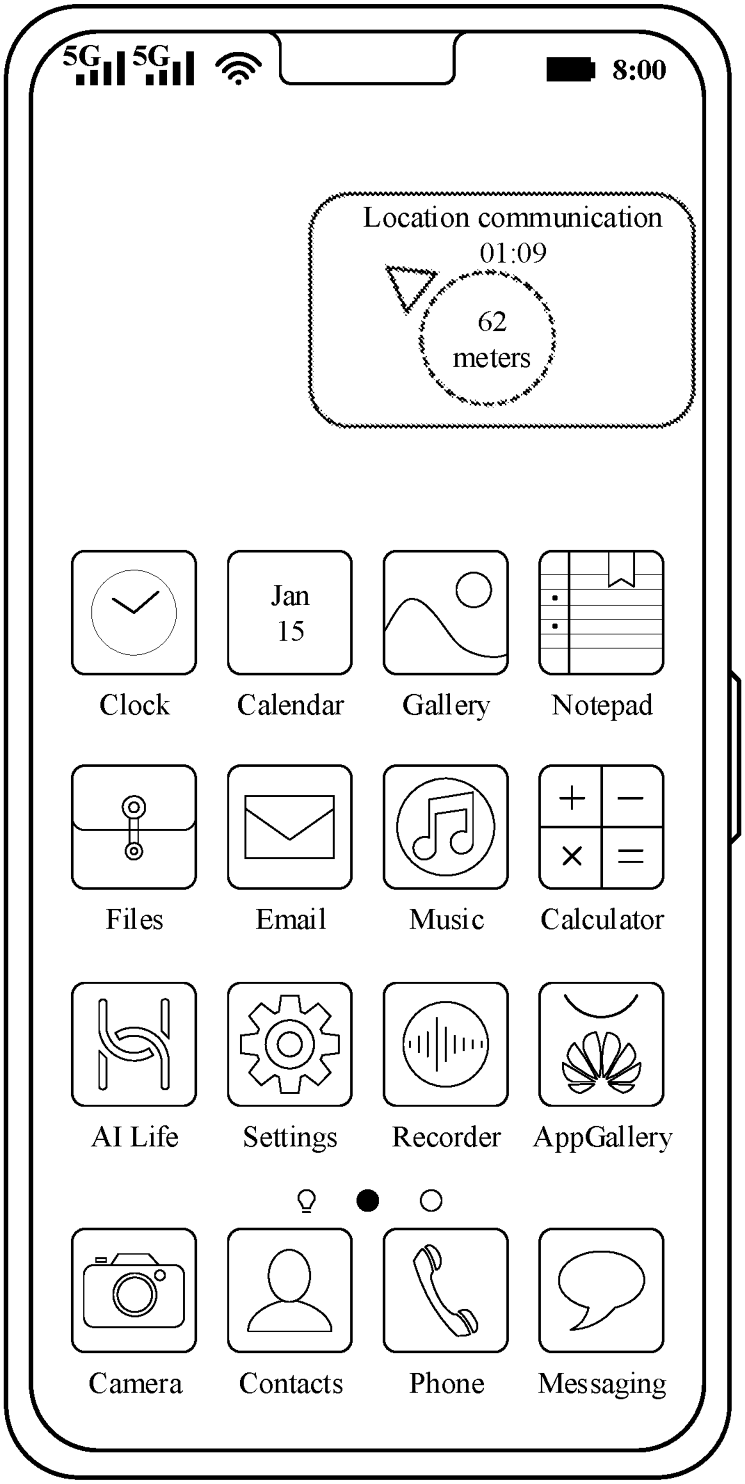

To more intuitively understand this solution, refer to FIG. 8A and FIG. 8B and FIG. 9A and FIG. 9B. FIG. 8A and FIG. 8B and FIG. 9A and FIG. 9B are two schematic interface diagrams of a second display interface in a location processing method according to embodiments of the present disclosure. In FIG. 8A and FIG. 8B and FIG. 9A and FIG. 9B, for example, a location of the second terminal relative to the first terminal is displayed. First, refer to FIG. 8A and FIG. 8B. FIG. 8A and FIG. 8B include two schematic sub-diagrams FIG. 8A and FIG. 8B. Both the schematic sub-diagram FIG. 8A and the schematic sub-diagram FIG. 8B are second display interfaces. In the schematic sub-diagram FIG. 8A, E1 represents a trigger icon located in a status bar. When the user taps E1, the first terminal is triggered to enter the schematic sub-diagram FIG. 8B. The schematic sub-diagram FIG. 8B displays the location of the second terminal in a form of a card. It should be understood that the example in FIG. 8A and FIG. 8B is merely intended to facilitate understanding of this solution, and is not intended to limit this solution.

Figure 9A:
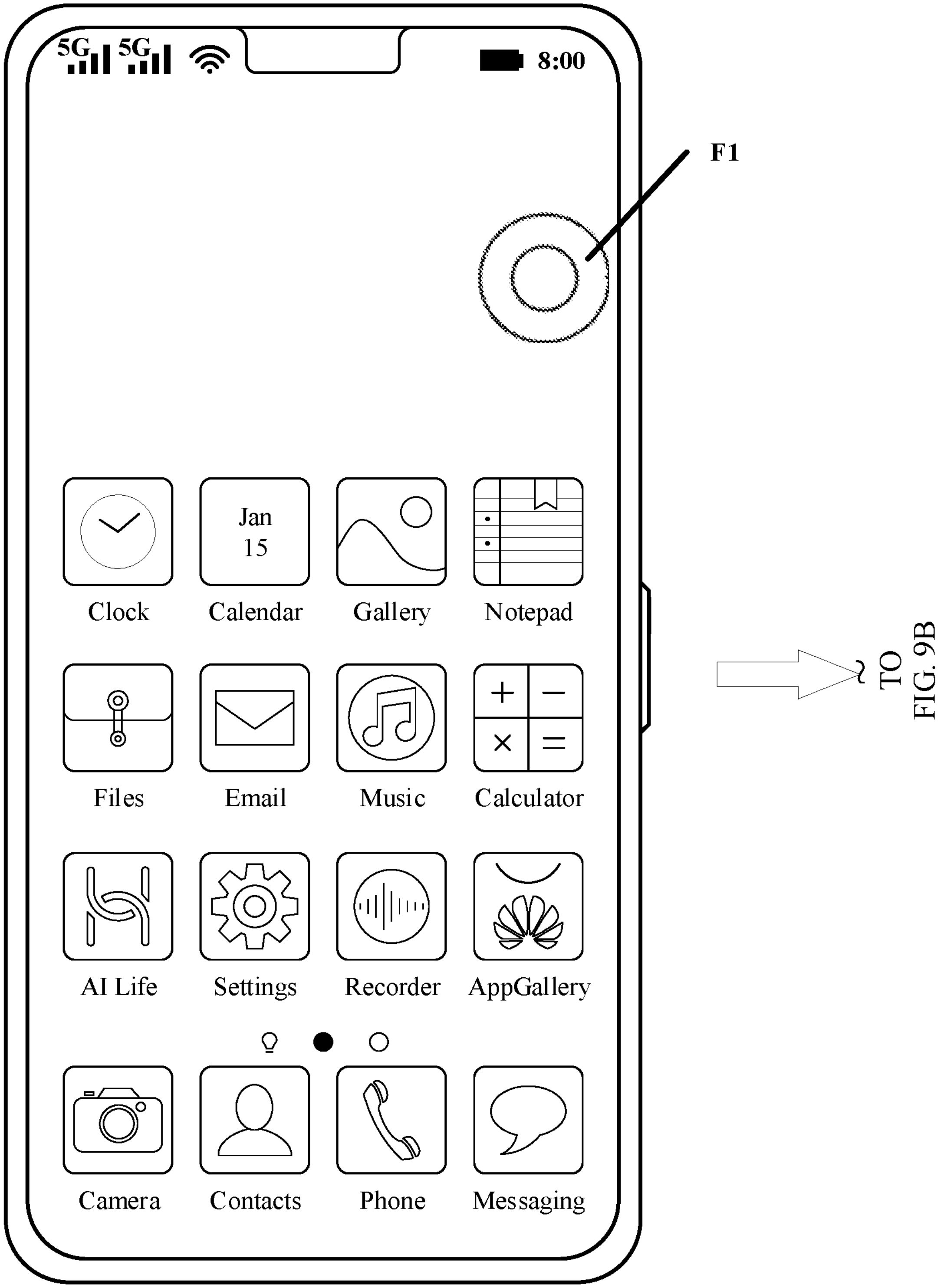
FIG. 9A and FIG. 9B are still another schematic interface diagram of a second display interface in a location processing method according to an embodiment of the present disclosure.
Figure 9B:
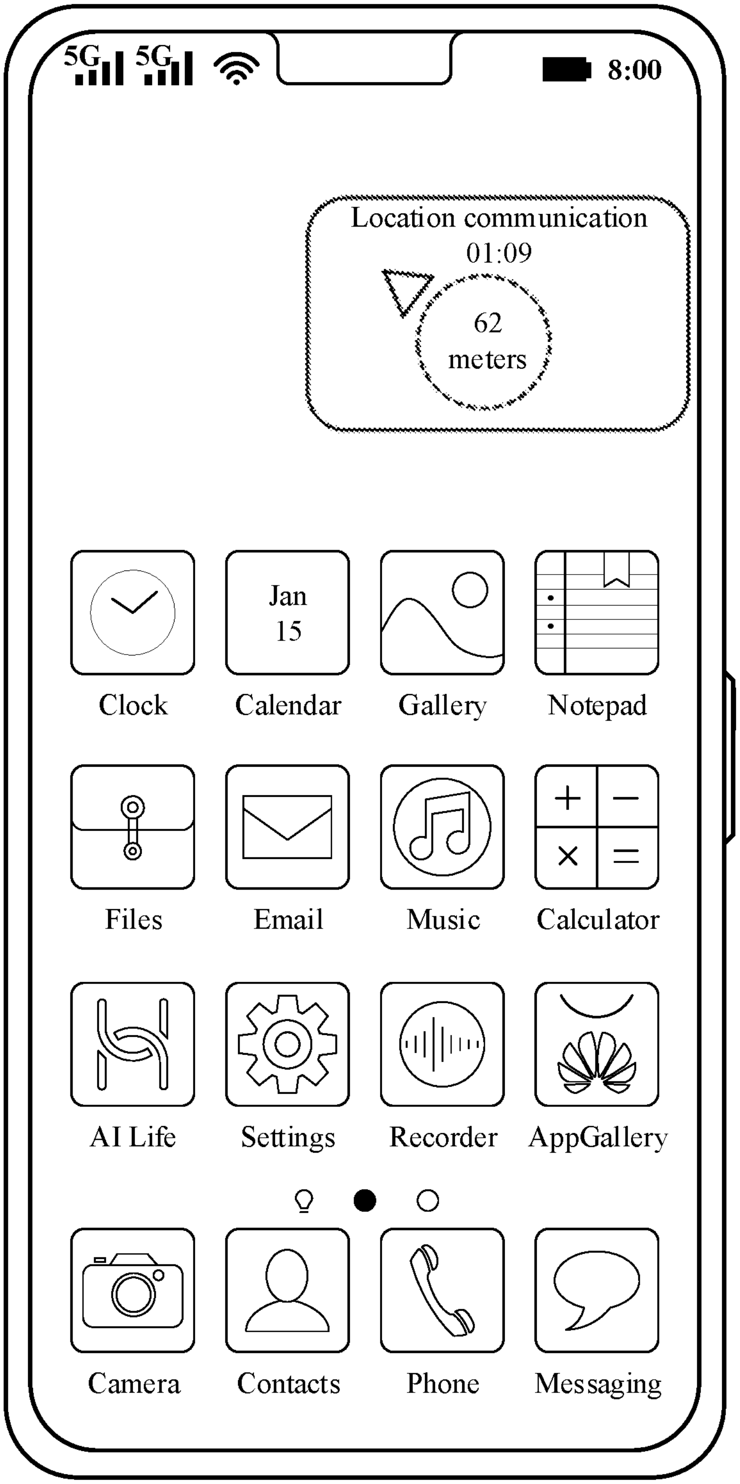

Then, refer to FIG. 9A and FIG. 9B. FIG. 9A and FIG. 9B include two schematic sub-diagrams FIG. 9A and FIG. 9B. Both the schematic sub-diagram FIG. 9A and the schematic sub-diagram FIG. 9B are second display interfaces. In the schematic sub-diagram FIG. 9A, F1 represents a trigger icon in a form of a floating window. When the user taps F1, the first terminal is triggered to enter the schematic sub-diagram FIG. 9B. The schematic sub-diagram FIG. 9B displays the location of the second terminal. It should be understood that the example in FIG. 9A and FIG. 9B is merely intended to facilitate understanding of this solution, and is not intended to limit this solution.

In another case, the first terminal may display the location of the second terminal on a display interface (an example of the second display interface) of a first intelligent wearable device, where the first intelligent wearable device is a device that has a connection relationship with the first terminal. Specifically, when detecting that the first intelligent wearable device connected to the first terminal exists, the first terminal sends location information of the second terminal to the first intelligent wearable device, to display the location of the second terminal by using the display interface of the first intelligent wearable device. The first intelligent wearable device includes but is not limited to a band, glasses, or the like.

Figure 10:
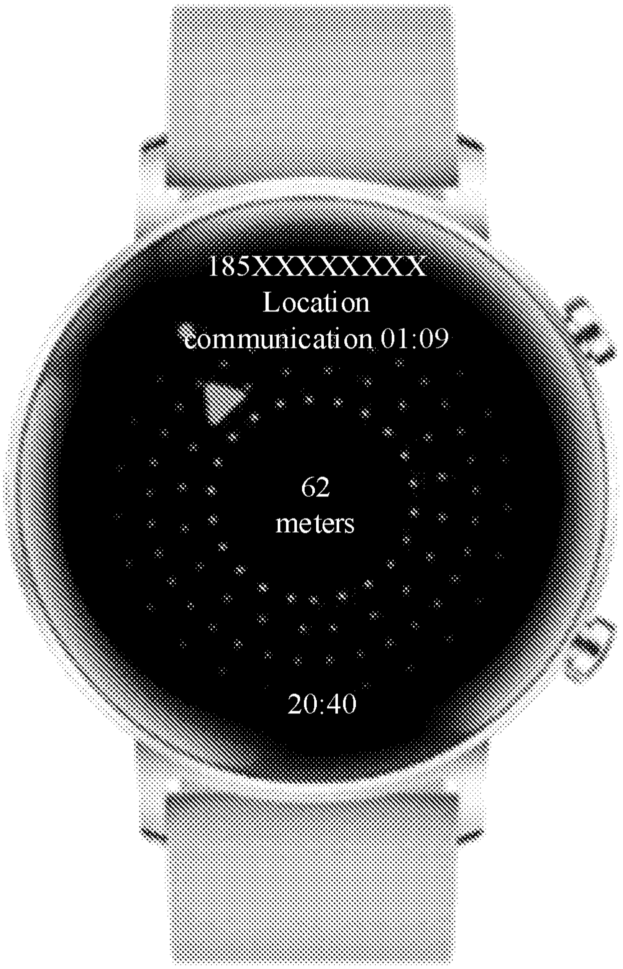
FIG. 10 is yet another schematic interface diagram of a second display interface in a location processing method according to an embodiment of the present disclosure.

To more intuitively understand this solution, refer to FIG. 10. FIG. 10 is a schematic interface diagram of a second display interface in a location processing method according to an embodiment of the present disclosure. In FIG. 10, for example, the first intelligent wearable device is a band. An arrow in FIG. 10 indicates a direction of the second terminal relative to the first terminal, and a number in FIG. 10 indicates a distance of the second terminal relative to the first terminal. The example in FIG. 10 is merely intended to facilitate understanding of this solution, and is not intended to limit this solution.

In this embodiment of the present disclosure, the plurality of display manners of the location of the second terminal are provided, thereby improving implementation flexibility of this solution.

Optionally, step 308 may include: when the location of the second terminal is obtained based on a long-distance wireless positioning technology, invoking navigation-type software in the first terminal to display a map on the second display interface, and displaying absolute locations of the first terminal and the second terminal on the map, where the long-distance wireless positioning technology implements positioning by using a communication technology other than short-distance wireless communication; or when the location of the second terminal is obtained based on a short-distance wireless positioning technology, a location of the second terminal relative to the first terminal is displayed on the second display interface, where the relative location includes a direction and a distance of the second terminal relative to the first terminal. When the short-distance wireless communication technology is used to perform positioning, accuracy between the first terminal and the second terminal is relatively high. The second display interface may be a call interface between the first terminal and the second terminal, may be a home screen of the first terminal, or may be a display interface of another application of the first terminal, or the like.

In this embodiment of the present disclosure, when the location of the second terminal is obtained based on the long-distance wireless positioning technology, the first terminal and the second terminal are relatively far from each other. Therefore, an absolute location of the second terminal is displayed by using the map, to help the user relatively clearly determine the location of the second terminal. When the location of the second terminal is obtained based on the short-distance wireless positioning technology, the first terminal and the second terminal are relatively close to each other. Therefore, the location of the second terminal relative to the first terminal is displayed, to help guide the user to find the second terminal.

Further, optionally, when a location obtaining manner of the second terminal is switched from a long-distance wireless positioning technology to a short-distance wireless positioning technology, prompt information may be output by using a sound, vibration, a pop-up window, or another manner, to remind the user of the switching.

Figure 11A:
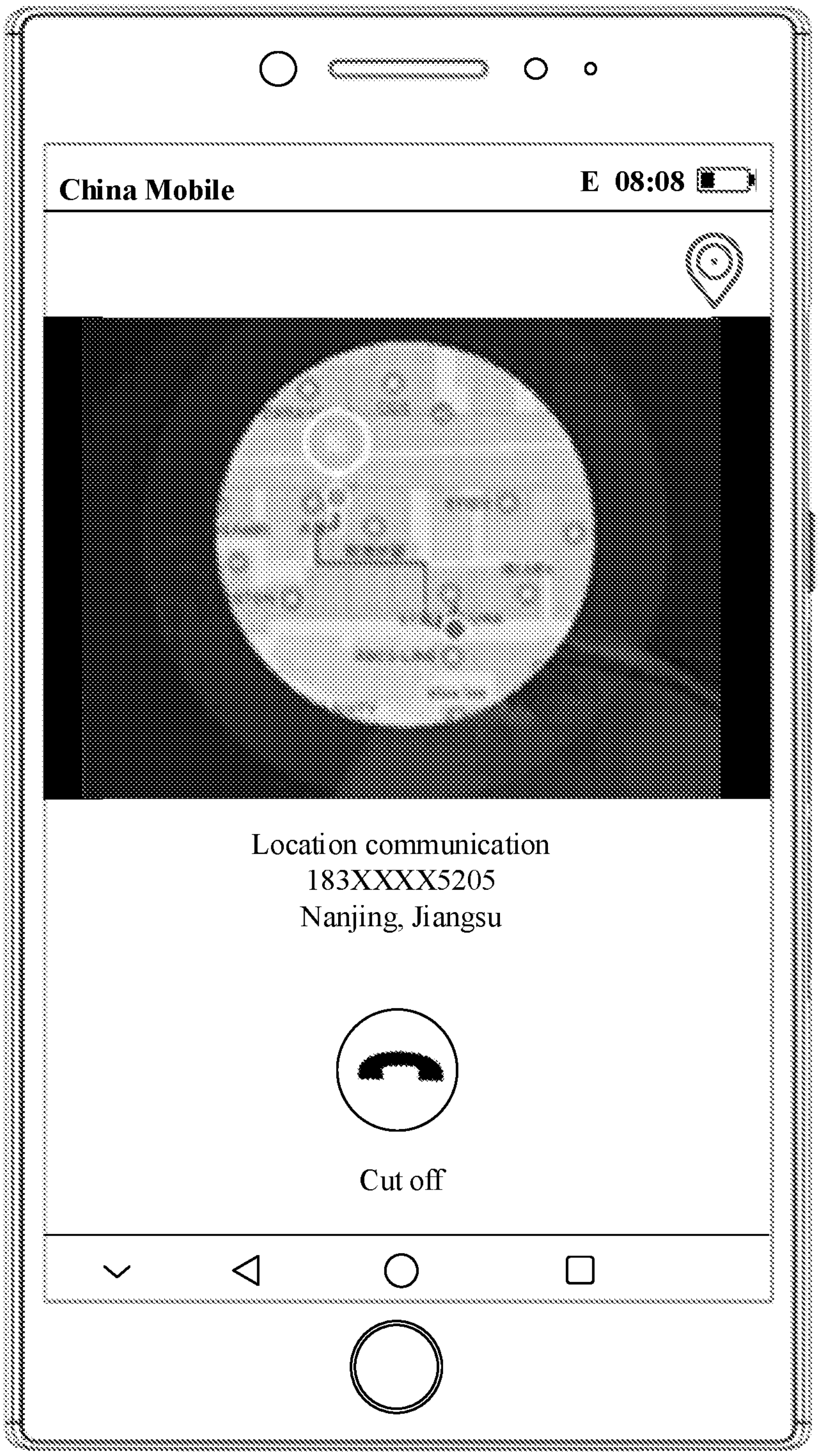
FIG. 11A and FIG. 11B are still yet another schematic interface diagram of a second display interface in a location processing method according to an embodiment of the present disclosure.
Figure 11B:
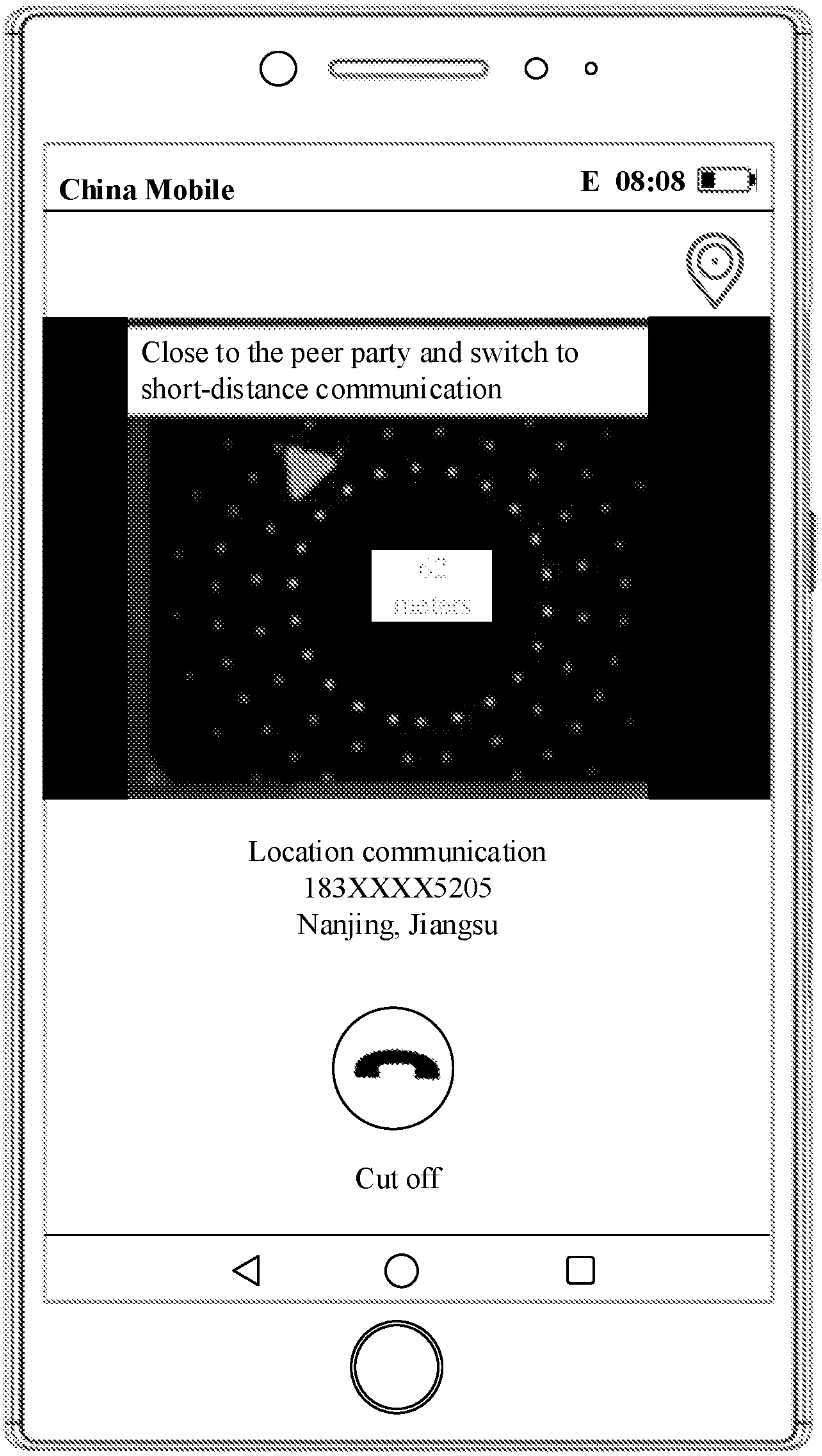
Figure 12:
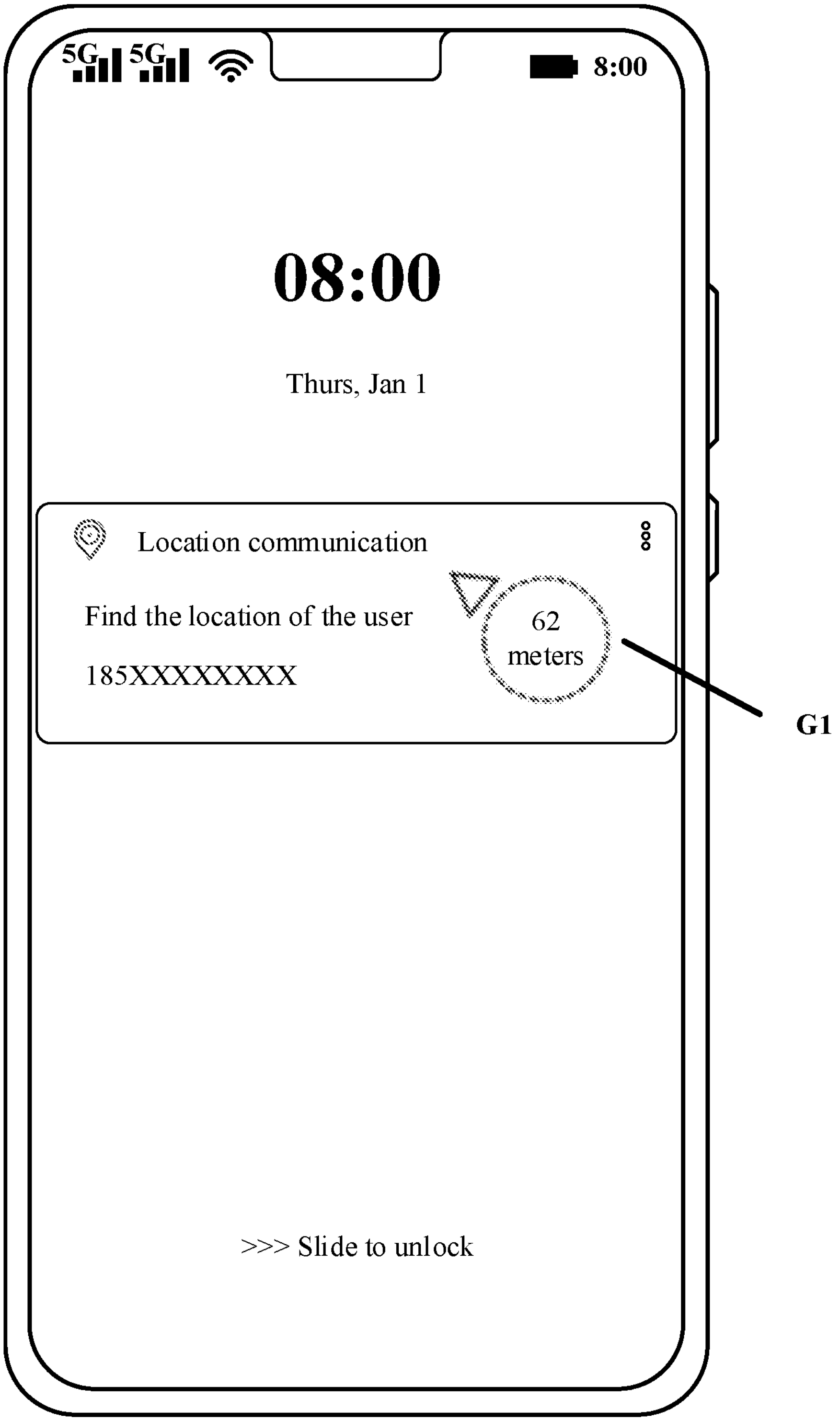
FIG. 12 is a schematic diagram of an interface displayed when a long-distance wireless positioning technology is switched to a short-distance wireless positioning technology in a location processing method according to an embodiment of the present disclosure.

To more intuitively understand this solution, refer to FIG. 11A and FIG. 11B and FIG. 12. FIG. 11A and FIG. 11B are a schematic interface diagram of a second display interface in a location processing method according to an embodiment of the present disclosure. FIG. 12 is a schematic diagram of an interface displayed when a long-distance wireless positioning technology is switched to a short-distance wireless positioning technology in a location processing method according to an embodiment of the present disclosure. First, refer to FIG. 11A and FIG. 11B. In FIG. 11A and FIG. 11B, for example, the location of the second terminal is displayed on a call interface between the first terminal and the second terminal. FIG. 11A and FIG. 11B include two schematic sub-diagrams FIG. 11A and FIG. 11B, and both the schematic sub-diagram FIG. 11A and the schematic sub-diagram FIG. 11B are call interfaces of the first terminal and the second terminal. In the schematic sub-diagram FIG. 11A, the first terminal displays the absolute locations of the first terminal and the second terminal on a map. In the schematic sub-diagram FIG. 11A, for example, a navigation path between the first terminal and the second terminal is displayed. In the schematic sub-diagram FIG. 11B, the first terminal displays the location of the second terminal relative to the first terminal. It should be understood that the example in FIG. 11A and FIG. 11B is merely intended to facilitate understanding of this solution, and is not intended to limit this solution.

Then, refer to FIG. 12. In FIG. 12, for example, switching prompt information is shown on a lock screen. G1 represents the switching prompt information, used to give a prompt that the location obtaining manner of the second terminal is switched from the long-distance wireless positioning technology to the short-distance wireless positioning technology. It should be understood that the example in FIG. 12 is merely intended to facilitate understanding of this solution, and is not intended to limit this solution.

Further, optionally, when short-distance wireless communication is used between the first terminal and the second terminal, when receiving a seventh operation that is input by the user, the first terminal enables an image collection apparatus of the first terminal in response to the seventh operation, to obtain a surrounding real environment of the first terminal in real time. The first terminal may further display the surrounding real environment of the first terminal on a call interface between the first terminal and the second terminal, and display a location of the second terminal relative to the first terminal in the surrounding real environment of the first terminal. In this embodiment of the present disclosure, the surrounding real environment of the first terminal is displayed, so that the user can view the surrounding real environment of the first terminal while viewing the mobile phone. This avoids repeated switching of a line of sight of the user between the real environment and a screen, and also reduces a probability that the user collides with a person or a thing in the real environment because the user neglects the real environment.

The seventh operation may be lifting the mobile phone to a vertical state, or the seventh operation is any type of touch operation. Alternatively, for example, a switch icon is set on the second display interface, and when the user taps the switch icon, it is considered that the seventh operation is input. For an explanation of the touch operation, refer to the explanation in the foregoing step. A specific implementation of the seventh operation may be set with reference to an actual application scenario, and is not limited herein.

Figure 13:
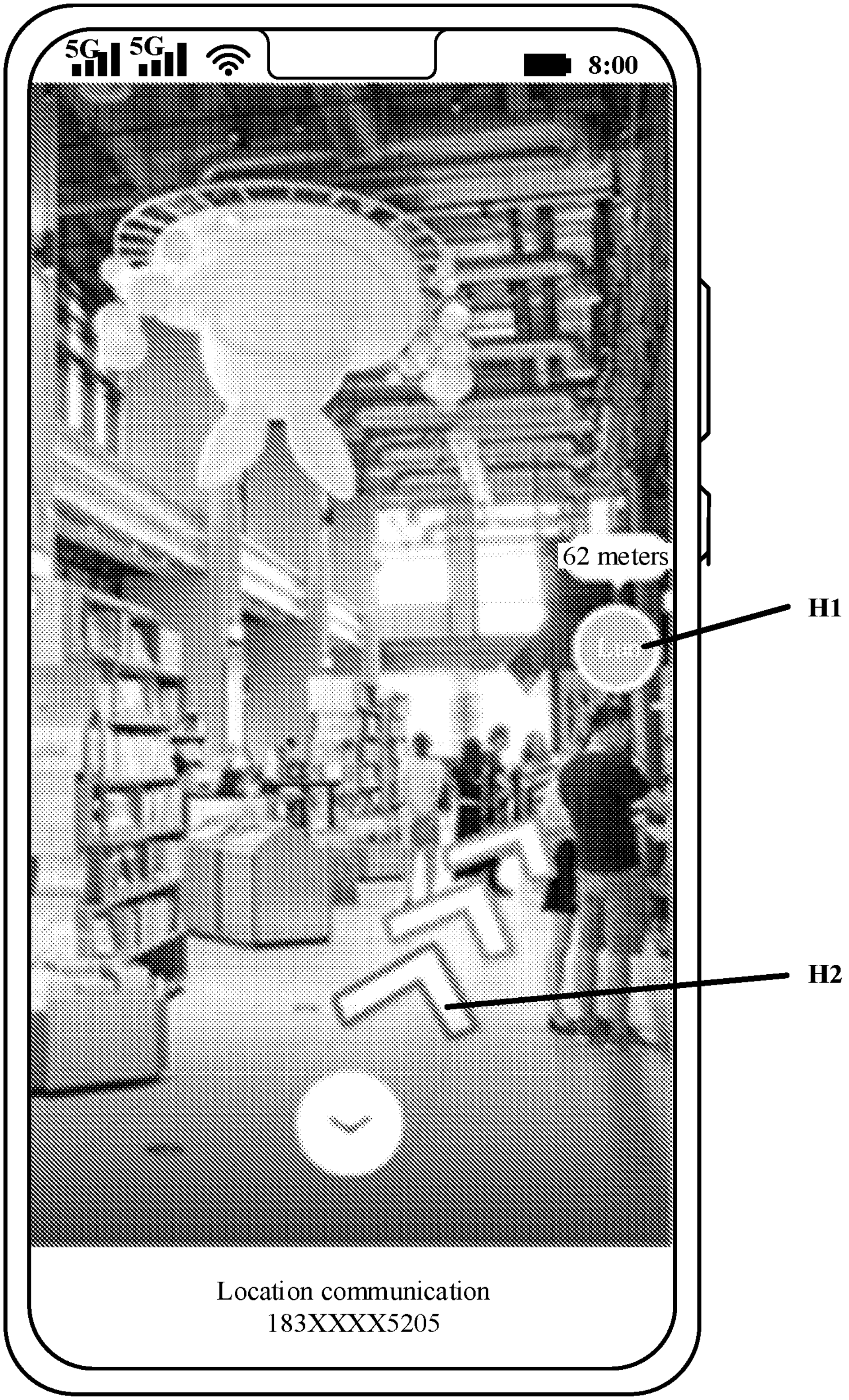
FIG. 13 is a further schematic interface diagram of a second display interface in a location processing method according to an embodiment of the present disclosure.

To more intuitively understand this solution, refer to FIG. 13. FIG. 13 is a schematic interface diagram of a second display interface in a location processing method according to an embodiment of the present disclosure. H1 represents a relative location of the second terminal, and H2 represents a navigation path between the first terminal and the second terminal. It should be understood that, in an actual case, a navigation path between the first terminal and the second terminal may not be displayed. The example in FIG. 13 is merely intended to facilitate understanding of this solution, and is not intended to limit this solution.

309: The first terminal or the second terminal determines whether to end location communication between the first terminal and the second terminal; and if a determining result is no, continues to perform step 308; or if a determining result is yes, ends location communication between the first terminal and the second terminal.

In this embodiment of the present disclosure, in a process in which the second terminal sends the location information to the first terminal, that is, in a process in which the first terminal receives the location of the second terminal, both the first terminal and the second terminal can determine whether location communication between the first terminal and the second terminal needs to be ended.

When the first terminal determines whether to end location communication between the first terminal and the second terminal, specifically, the first terminal determines whether a first preset condition is met. If the first preset condition is met, it is considered that location communication between the first terminal and the second terminal needs to be ended. The first preset condition includes a first end condition and/or a second end condition. The first end condition includes any one or a combination of a plurality of the following conditions: a relative distance between the first terminal and the second terminal is less than or equal to a preset distance threshold; a change rule of a relative location between the first terminal and the second terminal meets a first change rule; a location obtaining manner of the second terminal is changed from a short-distance wireless positioning technology to a long-distance wireless positioning technology; and an end operation for location communication between the first terminal and the second terminal is obtained. The second end condition is that duration during which the first terminal accesses the location of the second terminal reaches a duration threshold authorized by the second terminal.

In this embodiment of the present disclosure, the foregoing provides the plurality of end conditions for ending location communication between the first terminal and the second terminal, thereby improving implementation flexibility of this solution.

Further, a value of the preset distance threshold may be 1 meter, 2 meters, 3 meters, 5 meters, or the like. When the relative distance between the first terminal and the second terminal is less than or equal to the preset distance threshold, it may be considered that the first terminal has completed meeting with the second terminal, that is, a purpose of location communication is implemented. Therefore, location communication between the first terminal and the second terminal can be ended.

The first change rule may be that the relative location between the first terminal and the second terminal is less than or equal to a preset distance threshold and then gradually increases. When the change rule of the relative location between the first terminal and the second terminal meets the first change rule, it may be considered that the first terminal has completed meeting with the second terminal and left the peer party.

When a distance between the first terminal and the second terminal is less than a first threshold, a short-distance wireless positioning technology is used. When a distance between the first terminal and the second terminal is greater than or equal to the first threshold, a long-distance wireless positioning technology is used. Therefore, a location obtaining manner of the second terminal is changed from the short-distance wireless positioning technology to the long-distance wireless positioning technology, and it may be considered that the first terminal has completed meeting with the second terminal and left the peer party.

Alternatively, the user may input an end operation for location communication between the first terminal and the second terminal by using the display interface of the location of the second terminal. Specifically, the display interface of the location of the second terminal may display an icon corresponding to location communication, so that the user can input the end operation by using the icon corresponding to location communication. The end operation may be any type of touch operation. For a description of the touch operation, refer to the description in the foregoing step.

Figure 14:
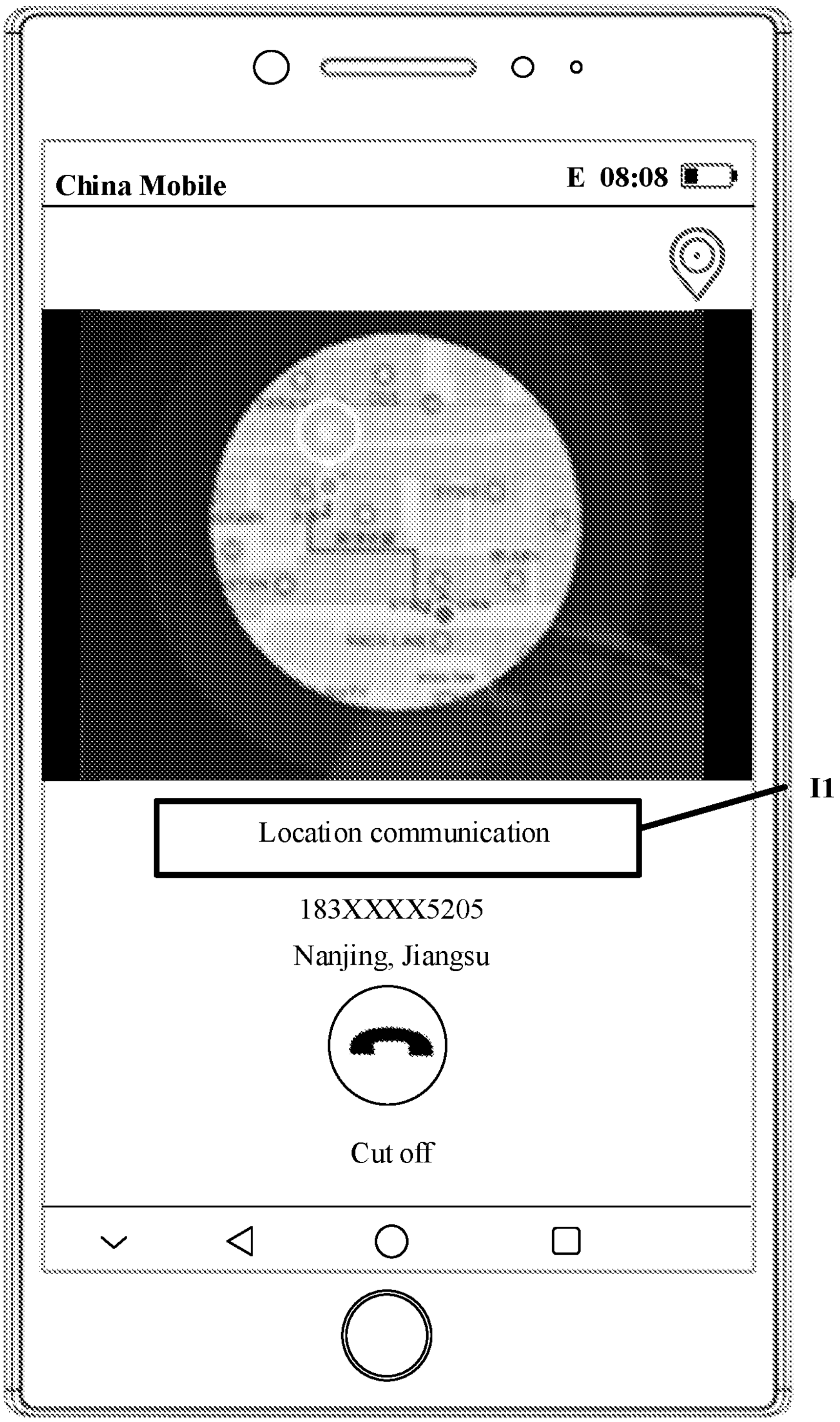
FIG. 14 is a schematic interface diagram of obtaining an end operation in a location processing method according to an embodiment of the present disclosure.

To more intuitively understand this solution, refer to FIG. 14. FIG. 14 is a schematic interface diagram of obtaining an end operation in a location processing method according to an embodiment of the present disclosure. I1 represents the icon corresponding to location communication. When the user performs a touch and hold operation on I1, it is considered that the end operation for location communication between the first terminal and the second terminal is input. The example in FIG. 14 is merely intended to facilitate understanding of this solution, and is not intended to limit this solution.

If the second terminal further sets the authorized duration by using step 306, the first terminal may further determine that duration during which the first terminal accesses the location of the second terminal reaches the duration threshold authorized by the second terminal.

It should be noted that the foregoing content discloses the plurality of methods for ending location communication between the first terminal and the second terminal. In an actual case, the method may be flexibly set with reference to an actual application product. This is not limited herein.

Optionally, when the first terminal determines that the second end condition is met and the first end condition is not met, the first terminal may send a second request to the second terminal, where the second request is used to request to prolong authorized duration for accessing the location of the second terminal by the first terminal. Correspondingly, the second terminal may receive and display the second request, to determine whether to prolong the authorized duration for accessing the location of the second terminal by the first terminal. If the second terminal determines not to prolong the authorized duration for accessing the location of the second terminal by the first terminal, the second terminal ends location communication between the first terminal and the second terminal. If the second terminal determines to prolong the authorized duration for accessing the location of the second terminal by the first terminal, the second terminal may display selection information for prolonging the authorized time, to receive a setting of the user for prolonging the authorized time, and send prolonged authorized duration to the first terminal. For specific interface display, refer to the description in the foregoing step 306.

In this embodiment of the present disclosure, when the first terminal determines that the first end condition is not met, it may be proved that a target of performing location communication by the first terminal is not reached. Therefore, the first terminal sends an authorized duration prolonging request to the second terminal, to ensure that the target of location communication can be completed.

When the second terminal determines whether to end location communication between the first terminal and the second terminal, when the first terminal and the second terminal use a short-distance wireless positioning technology, the second terminal may also obtain the location of the first terminal. Therefore, the first preset condition may also be set in the second terminal, so that the second terminal determines whether to end location communication between the first terminal and the second terminal.

Optionally, different from the determining, by the first terminal, whether location communication needs to be ended, when determining that the second end condition is met and the first end condition is not met, the first terminal may directly output query information about whether to prolong the authorized duration for accessing the location of the second terminal by the first terminal, to determine whether the user is to prolong the authorized duration for accessing the location of the second terminal by the first terminal. For subsequent steps, refer to the foregoing descriptions.

Optionally, different from the determining, by the first terminal, whether location communication needs to be ended, when a call between the first terminal and the second terminal ends, the second terminal needs to determine whether to continue to authorize, after the call ends, the first terminal to access the location of the second terminal. If the second terminal performs, in advance by using a setting interface, setting on whether to continue to authorize, after a call ends, another terminal to access the location of the second terminal, the second terminal may determine, based on preset information, whether to continue to authorize the first terminal to access the location of the second terminal; and if the second terminal does not continue to authorize the first terminal to access the location of the second terminal, may end location communication between the first terminal and the second terminal; or if the second terminal continues to authorize the first terminal to access the location of the second terminal, may keep location communication between the first terminal and the second terminal.

If the second terminal does not perform, in advance by using a setting interface, setting on whether to continue to authorize, after a call ends, another terminal to access the location of the second terminal, that is, when a call between the first terminal and the second terminal ends, the second terminal cannot determine whether to continue to authorize the first terminal to access the location of the second terminal, the second terminal may further output first query information, where the first query information is used to determine whether to continue to authorize, after the call ends, the first terminal to access the location of the second terminal. If the second terminal receives a reject instruction that is input by the user for the first query information, the second terminal ends location communication between the first terminal and the second terminal. If the second terminal receives an agree instruction that is input by the user for the first query information, the second terminal keeps location communication between the first terminal and the second terminal. The first query information may be output in a form of a text box, a voice, or the like. Correspondingly, the user may input reply information by inputting a touch operation for the first query information, or input reply information in a form of a voice for a query voice. This is not limited herein.

In this embodiment of the present disclosure, after the call ends, it is still possible that the second terminal needs to access the location of the first terminal. Therefore, it is determined, by using the first query information, whether to continue to authorize, after the call ends, the first terminal to access the location of the second terminal, thereby ensuring privacy of the first terminal and also enhancing flexibility of a location sharing process.

Figure 15:
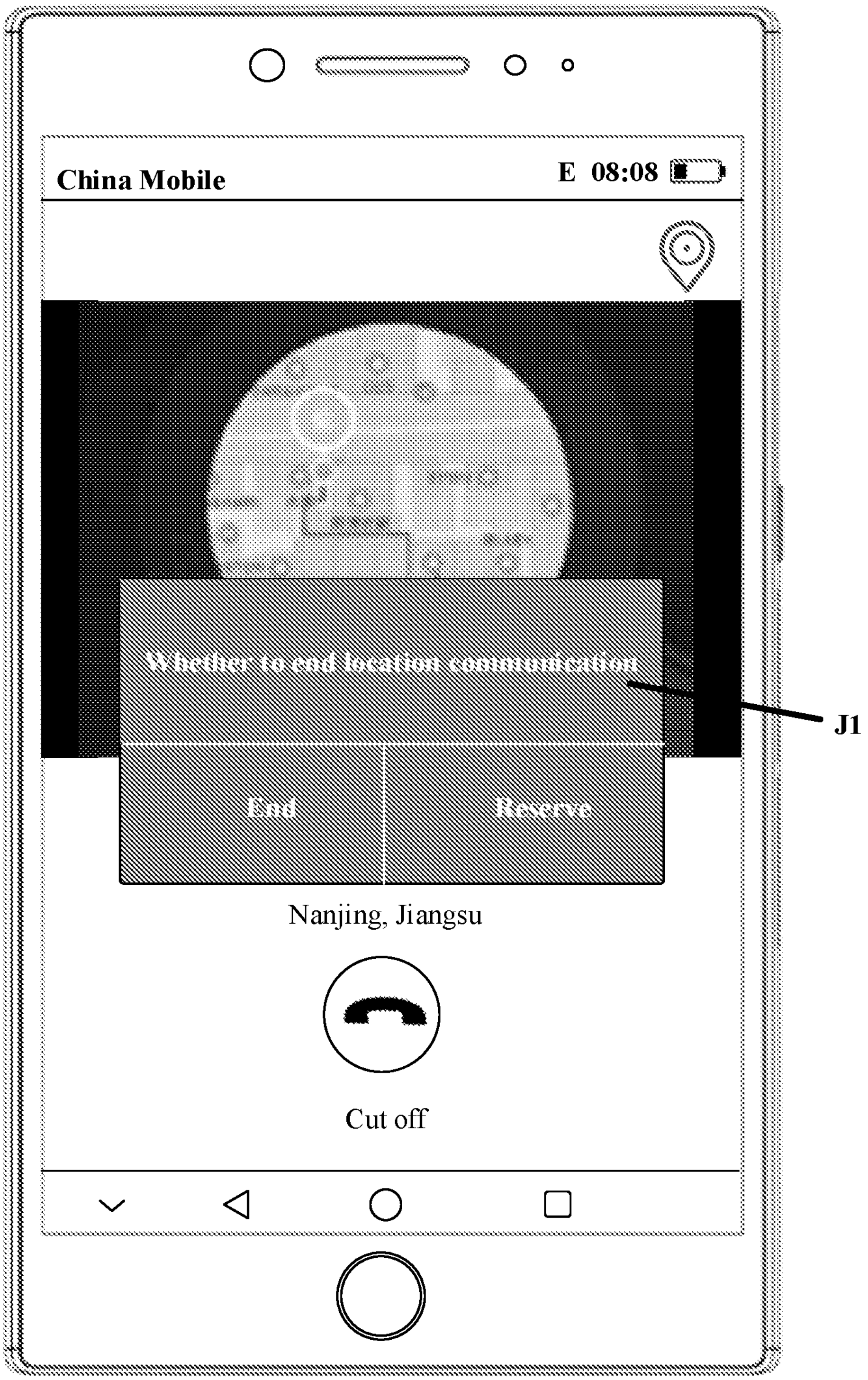
FIG. 15 is a schematic interface diagram of outputting first query information in a location processing method according to an embodiment of the present disclosure.

To more intuitively understand this solution, refer to FIG. 15. FIG. 15 is a schematic interface diagram of outputting first query information in a location processing method according to an embodiment of the present disclosure. In FIG. 15, for example, the first query information is output in a form of a text box. J1 represents the first query information. If the user taps "reserve", it is considered that the user determines to continue to authorize, after the call ends, the first terminal to access the location of the second terminal. If the user taps "end", it is considered that the user determines not to continue to authorize, after the call ends, the first terminal to access the location of the second terminal. It should be understood that, in an actual case, a navigation path between the first terminal and the second terminal may not be displayed. The example in FIG. 15 is merely intended to facilitate understanding of this solution, and is not intended to limit this solution.

In this embodiment of the present disclosure, a location of a peer party can be obtained without friend adding, to help protect privacy of a user, and a step of establishing a friend relationship is omitted, so that operation steps are simple, to help improve user viscosity. The location of the peer party is accessed only when the peer party performs authorization, to further protect privacy of the user. In addition, in a call process, a location of a peer party of a call may be obtained, and the location may be displayed, that is, the location of the peer party of the call may be displayed both in two manners: language description and interface display, to more intuitively and accurately reflect the location of the peer party of the call, thereby further improving convenience of a positioning process.

310: The first terminal obtains a fourth operation for the phone number of the second terminal by using the first display interface.

In this embodiment of the present disclosure, a specific implementation of step 310 is similar to the specific implementation of step 302. Specifically, in a case, a second icon may be set on the first display interface. When receiving a touch operation performed by the user on the second icon, the first terminal may determine that the first terminal obtains the fourth operation for the phone number of the second terminal by using the first display interface, that is, the second icon may be set to a trigger icon of the fourth operation.

In another case, the second icon is an enable icon for performing location communication between the first terminal and the second terminal. When the first terminal receives a touch operation by using the second icon on the first display interface, the first terminal is triggered to output selection information of a location communication mode. When the first terminal receives a selection operation performed by the user on the communication mode "authorize the peer party to access my location", it is considered that the first operation is obtained by using the first display interface.

In another case, no second icon may be set on the first display interface. When the user inputs a second touch operation by using the first interface, it is considered that the first operation for the phone number of the second terminal is input by using the first display interface. The second touch operation may be specifically a touch operation of a preset type, a slide operation of a preset shape, or the like. Different types of touch operations may be selected as the first touch operation and the second touch operation. This is not limited herein.

In another case, no second icon may be set on the first display interface. When the user inputs the second touch operation by using the first interface, it is considered that an enable operation for performing location communication between the first terminal and the second terminal is input by using the first display interface, to trigger the first terminal to output the selection information of the location communication mode, and the like.

The foregoing examples of various specific implementations in which the first terminal obtains the fourth operation for the phone number of the second terminal by using the first display interface are merely intended to facilitate understanding of this solution. A specific implementation may be determined with reference to an actual product form. This is not limited herein.

311: The first terminal displays a fourth display interface in response to the fourth operation, to obtain first authorized time by using the fourth display interface, where the first authorized time indicates authorized time for accessing the first terminal by the second terminal.

In this embodiment of the present disclosure, for a specific implementation of step 311, refer to the description of setting the authorized time in step 306. When authorizing a peer party to access location information of a party, the party may preset authorized time, thereby ensuring privacy of the authorization party and also ensuring flexibility of a location sharing process.

312: The first terminal sends first authorization information to the second terminal.

In this embodiment of the present disclosure, after determining that the second terminal is authorized to access the location of the first terminal, the first terminal sends the first authorization information to the second terminal. The first authorization information indicates that a third terminal is authorized to access the location of the first terminal, and the first authorization information may further carry a MAC address of the first terminal. For a sending manner of the first authorization information, refer to the foregoing description in step 303.

It should be noted that step 311 is optional. If step 311 is performed, the first authorization information may further include information about authorized duration that is set by the first terminal. If step 311 is not performed, step 312 may be directly performed after step 310 is performed.

313: The second terminal displays the first authorization information by using a fifth display interface.

In this embodiment of the present disclosure, the fifth display interface may be a call interface between the first terminal and the second terminal, may be a home screen of the second terminal, or may be a display interface of another application in the second terminal, or the like. The second terminal may display the first authorization information in a form of a text, a pop-up box, an icon, a floating window, or the like. A specific display form is not limited herein. Further, when the fifth display interface is a different interface, a display form of the first authorization information may be different. For example, if the fifth display interface is a call interface between the first terminal and the second terminal, the first authorization information may be output in a form of a text. For another example, if the fifth display interface is a home screen of the first terminal, the first authorization information may be output in a form of a floating window, or the like. This is not exhaustively described herein.

314: The second terminal receives an eighth operation for the phone number of the first terminal by using the fifth display interface, and sends a location obtaining request to the first terminal in response to the eighth operation.

In this embodiment of the present disclosure, the second terminal receives the eighth operation for the phone number of the first terminal by using the fifth display interface. The eighth operation indicates that the user wants to access location information of the first terminal. The eighth operation may be any type of touch operation, for example, tapping the first authorization information, touching and holding the first authorization information, or dragging the first authorization information to a preset location. A specific implementation of the eighth operation may be determined with reference to an actual application environment. This is not limited herein.

Figure 16:
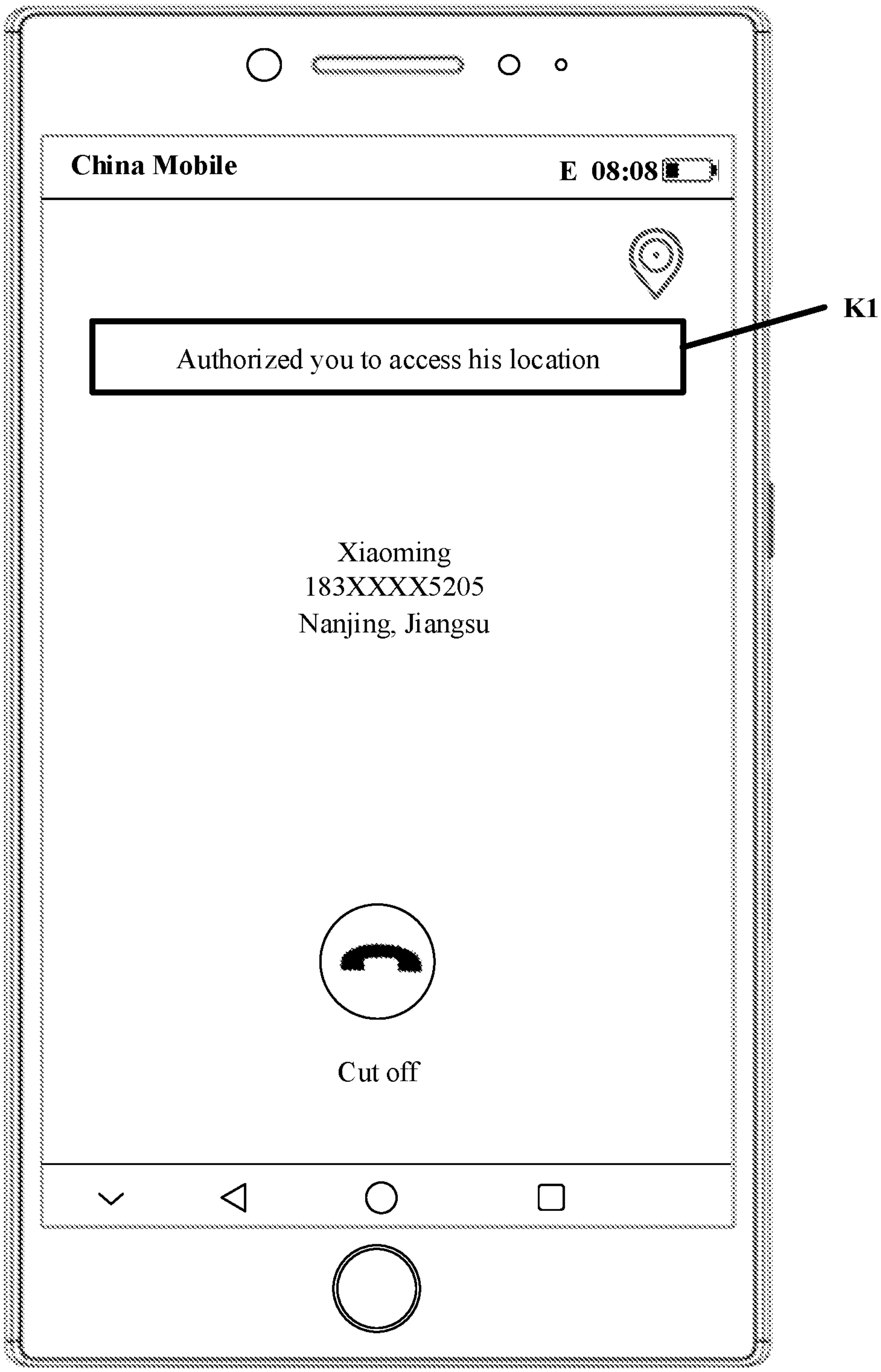
FIG. 16 is a schematic interface diagram of a fourth display interface in a location processing method according to an embodiment of the present disclosure.

To more intuitively understand this solution, refer to FIG. 16. FIG. 16 is a schematic interface diagram of a fifth display interface in a location processing method according to an embodiment of the present disclosure. In FIG. 16, for example, the fifth display interface is a call interface between the first terminal and the second terminal. K1 represents the first authorization information. When the user taps K1, the second terminal can receive the eighth operation for the phone number of the first terminal by using the fifth display interface. It should be understood that the example in FIG. 16 is merely intended to facilitate understanding of this solution, and is not intended to limit this solution.

315: The second terminal receives the location sent by the first terminal.

316: The second terminal displays the location of the first terminal.

317: The first terminal or the second terminal determines whether to end location communication between the first terminal and the second terminal; and if a determining result is no, continues to perform step 315; or if a determining result is yes, ends location communication between the first terminal and the second terminal.

In this embodiment of the present disclosure, for a specific implementation of steps 315 to 317, refer to the descriptions in steps 307 to 309. A difference lies in that the steps performed by the first terminal in steps 307 to 309 are performed by the second terminal in steps 315 to 317, and steps performed by the second terminal in steps 307 to 309 are performed by the first terminal in steps 315 to 317.

In this embodiment of the present disclosure, the first terminal can request to access a location of another terminal, and can also authorize another terminal to access the location of the first terminal, thereby expanding an application scenario of this solution.

318: The first terminal obtains a fifth operation for the phone number of the second terminal by using the first display interface.

In this embodiment of the present disclosure, a specific implementation of step 318 is similar to the specific implementation of step 302, and the fifth operation indicates to request to share a location with the second terminal. Specifically, in a case, a third icon may be set on the first display interface. When receiving a touch operation performed by the user on the third icon, the first terminal may determine that the first terminal obtains the fifth operation for the phone number of the third terminal by using the first display interface, that is, the third icon may be set to a trigger icon of the fifth operation.

In another case, the third icon is an enable icon for performing location communication between the first terminal and the third terminal. When the first terminal receives a touch operation by using the third icon on the first display interface, the first terminal is triggered to output selection information of a location communication mode. When the first terminal receives a selection operation performed by the user on the communication mode "share location", it is considered that the first operation is obtained by using the first display interface.

In another case, no third icon may be set on the first display interface. When the user inputs a third touch operation by using the first interface, it is considered that the first operation for the phone number of the third terminal is input by using the first display interface. The third touch operation may be specifically a touch operation of a preset type, a slide operation of a preset shape, or the like. Different types of touch operations may be selected as the first touch operation and the third touch operation. This is not limited herein.

In another case, no third icon may be set on the first display interface. When the user inputs the third touch operation by using the first interface, it is considered that an enable operation for performing location communication between the first terminal and the third terminal is input by using the first display interface, to trigger the first terminal to output the selection information of the location communication mode, and the like.

The foregoing examples of various specific implementations in which the first terminal obtains the fifth operation for the phone number of the third terminal by using the first display interface are merely intended to facilitate understanding of this solution. A specific implementation may be determined with reference to an actual product form. This is not limited herein.

319: The first terminal sends a third request to the second terminal based on the fifth operation, where the third request is used to request to share a location with the second terminal.

320: The second terminal determines whether the second terminal authorizes the first terminal to access the location of the second terminal; and if the second terminal does not authorize the first terminal to access the location of the second terminal, enters step 321; or if the second terminal authorizes the first terminal to access the location of the second terminal, enters step 323.

321: The second terminal displays the third request by using a second display interface.

322: The second terminal obtains a sixth operation for the third request by using the second display interface, where the sixth operation indicates that the second terminal is authorized to share the location of the second terminal with the first terminal.

In this embodiment of the present disclosure, specific implementations of steps 319 to 322 are similar to the specific implementations of steps 303 to 306. Reference may be made to the foregoing descriptions, and details are not described herein. A difference lies in that the first request is used to request to access the location of the second terminal, and the third request is used to request to share a location with the second terminal. For the sixth operation, refer to the foregoing third operation for understanding. Details are not described herein.

Optionally, in step 319, after obtaining the fifth operation, the first terminal may further display a selection interface of sharing time, to limit sharing duration or a sharing time period. For a specific representation, refer to the description of the setting interface of the authorized time in step 306. Details are not described herein.

323: The second terminal sends the location of the second terminal to the first terminal, and receives the location that is of the first terminal and that is sent by the first terminal.

In this embodiment of the present disclosure, a specific implementation of step 323 is similar to the specific implementation of step 307. Reference may be made to the foregoing descriptions. A difference lies in that in step 323, the first terminal further sends a real-time location of the first terminal to the second terminal. For a manner in which the first terminal obtains the real-time location, refer to the foregoing manner in which the second terminal obtains the real-time location. Details are not described herein.

324: The second terminal displays the location of the first terminal.

325: The first terminal displays the location of the second terminal.

In this embodiment of the present disclosure, for both a manner in which the second terminal displays the location of the first terminal in step 324 and a manner in which the first terminal displays the location of the second terminal in step 325, refer to the description in step 308. Details are not described herein.

326: The first terminal or the second terminal determines whether to end location communication between the first terminal and the second terminal; and if a determining result is no, continues to perform step 323; or if a determining result is yes, ends location communication between the first terminal and the second terminal.

In this embodiment of the present disclosure, for a specific implementation of step 326, refer to the description in step 309. Details are not described herein.

In this embodiment of the present disclosure, the first terminal can request to access a location of another terminal, and can also share a location with another terminal, thereby expanding an application scenario of this solution.

It should be noted that steps 302 to 309, steps 310 to 317, and steps 318 to 326 respectively correspond to three different location communication modes. In a process in which one first terminal performs a call with one second terminal, only any one group of steps 302 to 309, steps 310 to 317, and steps 318 to 326 may be performed.

In addition, an execution sequence of steps 302 to 309, steps 310 to 317, and steps 318 to 326 is not limited in this embodiment of the present disclosure. For example, steps 302 to 309 may be first performed, then steps 310 to 317 may be performed, and then steps 318 to 326 may be performed; or steps 310 to 317 may be first performed, then steps 302 to 309 may be performed, and then steps 318 to 326 may be performed. Steps 302 to 309, steps 310 to 317, and steps 318 to 326 may be randomly arranged in terms of execution sequence. This is not limited herein.

327: The first terminal obtains a second operation for the phone number of the third terminal by using a call end interface between the first terminal and the second terminal.

In some embodiments of the present disclosure, the first terminal may further obtain the second operation by using the call end interface between the first terminal and the second terminal. The call end interface between the first terminal and the second terminal displays the phone number of the second terminal, or displays the user name corresponding to the second terminal. The second operation is used to indicate to transmit a current location of the first terminal to the second terminal.

Specifically, in an implementation, the call end interface between the first terminal and the second terminal may display a target component used to receive the second operation that is input by the user. When the user performs a fourth touch operation on a fourth icon, it is considered that the first terminal obtains the second operation by using the call end interface between the first terminal and the second terminal. The target component may be represented as an icon, a query text box, or another type of component. The fourth touch operation may be any type of touch operation, and is specifically set with reference to an actual product form.

In another implementation, the first terminal outputs query information in a form of a voice by using the call end interface between the first terminal and the second terminal, and when receiving replied acknowledgement information, the first terminal considers that the second operation is obtained by using the call end interface between the first terminal and the second terminal. As an example, the first terminal outputs "Do you want to leave my location?" in a form of a voice. When the user replies with "OK", it may be considered that the second operation is obtained by using the call end interface between the first terminal and the second terminal. This is not limited herein.

In another implementation, the foregoing target component may not be displayed on the call end interface between the first terminal and the second terminal, and the user inputs the second operation by inputting a preset slide gesture. As an example, the preset slide gesture may be a "circle" slide gesture, a "check mark" slide gesture, or a slide gesture of another shape.

Figure 17:
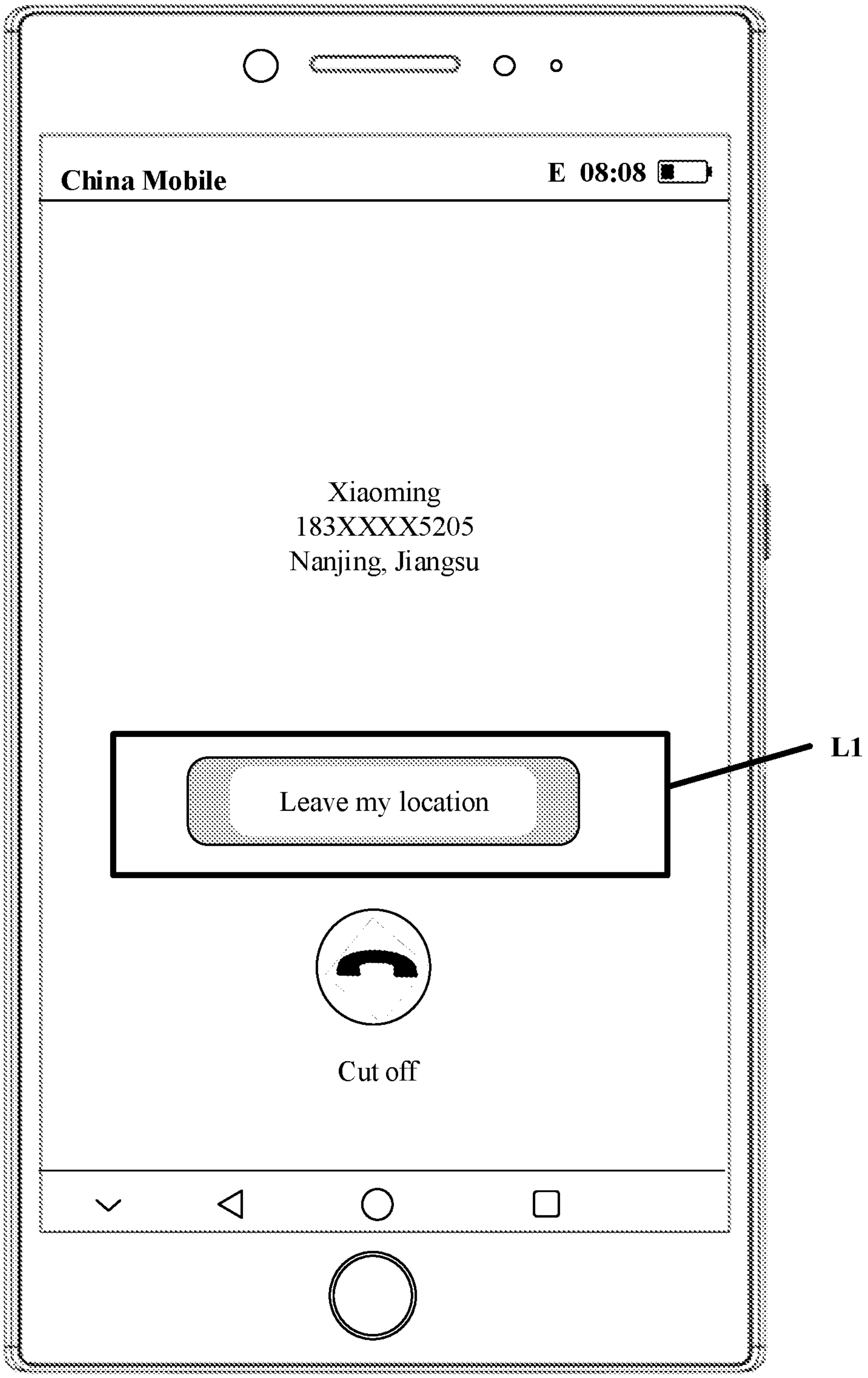
FIG. 17 is a schematic interface diagram of a call end interface in a location processing method according to an embodiment of the present disclosure.

To more intuitively understand this solution, refer to FIG. 17. FIG. 17 is a schematic interface diagram of a call end interface in a location processing method according to an embodiment of the present disclosure. In FIG. 17, for example, an icon used to receive the second operation is displayed on the call end interface between the first terminal and the second terminal.

When the user taps L1, it is considered that the first terminal obtains the second operation. It should be understood that the example in FIG. 17 is merely intended to facilitate understanding of this solution, and is not intended to limit this solution.

328: The first terminal obtains the current location of the first terminal in response to the second operation.

In some embodiments of the present disclosure, after obtaining the second operation, the first terminal obtains, in response to the second operation, the current location of the first terminal by using a positioning module of the first terminal.

329: The first terminal transmits the current location of the first terminal to the second terminal.

In some embodiments of the present disclosure, the first terminal transmits the current location of the first terminal to the second terminal. Specifically, the first terminal may send the current location of the first terminal to the second terminal by using an SMS message. Alternatively, after the first terminal sends the current location of the first terminal to the second terminal, a fourth icon is displayed on a call record interface of the second terminal, so that the user can access the current location of the first terminal by using the fourth icon. Alternatively, the first terminal sends the current location of the first terminal to a target server, and the target server sends the current location of the first terminal to the second terminal, to display the current location of the first terminal on a target application in the second terminal. The target server may be a server of a shopping application, a server of a logistics application, or a server of another application related to location information.

In this embodiment of the present disclosure, a function of leaving my current location is added, thereby further expanding an application scenario of this solution.

Figure 18A:
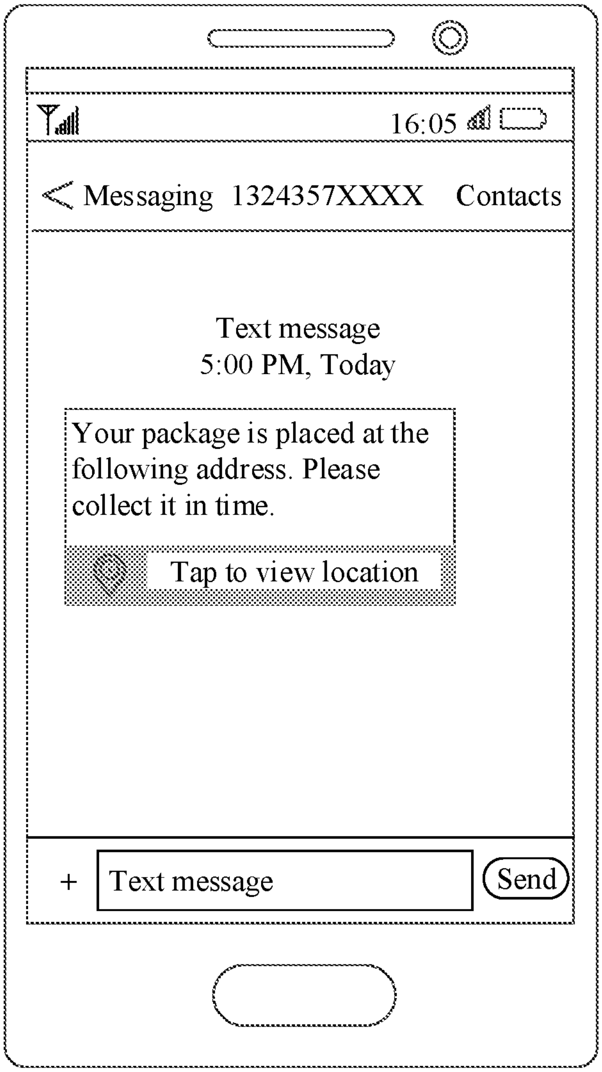
FIG. 18A, FIG. 18B, and FIG. 18C are three schematic interface diagrams of an access interface of a second terminal in a location processing method according to an embodiment of the present disclosure.
Figure 18B:
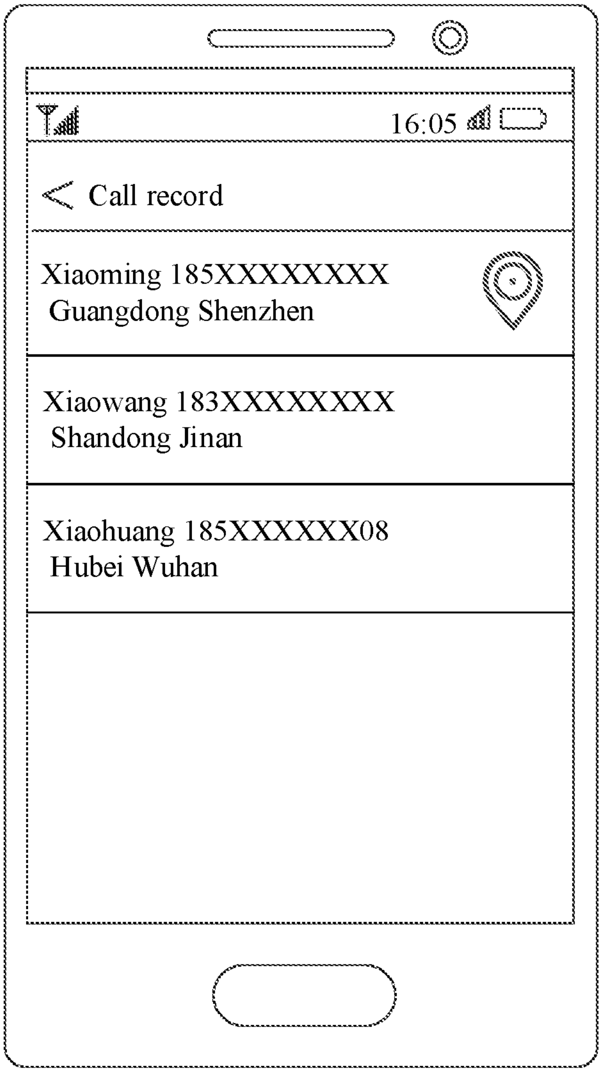
Figure 18C:
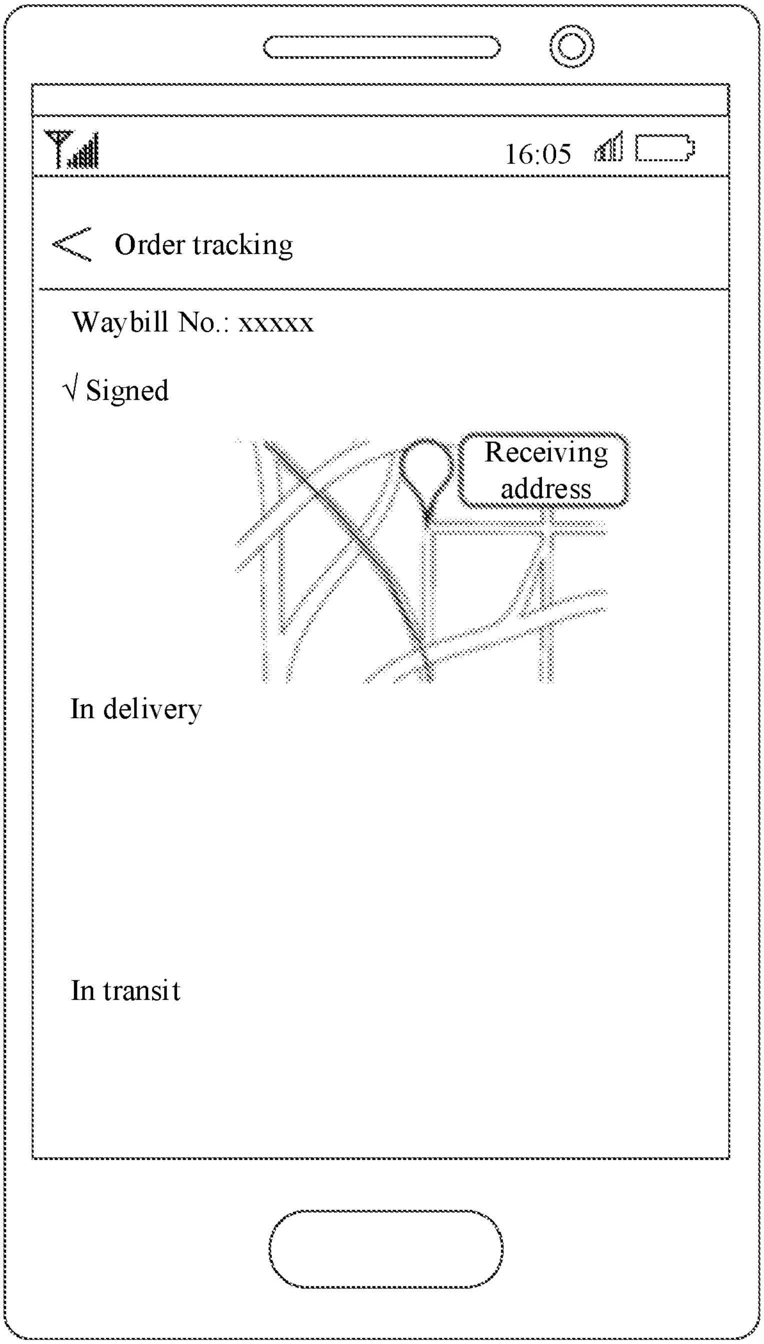

To more intuitively understand this solution, refer to FIG. 18A, FIG. 18B, and FIG. 18C. FIG. 18A, FIG. 18B, and FIG. 18C are three schematic interface diagrams of an access interface of a second terminal in a location processing method according to an embodiment of the present disclosure. FIG. 18A, FIG. 18B, and FIG. 18C include three schematic sub-diagrams FIG. 18A, FIG. 18B, and FIG. 18C. The schematic sub-diagram FIG. 18A indicates that the current location of the first terminal is sent to the second terminal by using an SMS message and the second terminal displays the SMS message by using an SMS message interface. The schematic sub-diagram FIG. 18B indicates that a fourth icon is displayed on a call record interface of the second terminal. When the user taps an icon in a row in which "Xiaoming" is located, access to a location that is of Xiaoming and that is obtained when a call ends may be triggered. The schematic sub-diagram FIG. 18C indicates that an access icon of the current location that is of the first terminal and that is obtained when the call ends is displayed on the target application. When the user taps an icon corresponding to a receiving address in the schematic sub-diagram FIG. 18C, access to a location that is of Xiaoming and that is obtained when a call ends may be triggered. It should be understood that the example in FIG. 18A, FIG. 18B, and FIG. 18C is merely intended to facilitate understanding of this solution, and is not intended to limit this solution.

It should be noted that alternatively, steps 327 to 329 may be performed on a second terminal side, or may be performed on both a first terminal side and the second terminal side. In FIG. 3A, FIG. 3B, FIG. 3C, and FIG. 3D, for example, steps 327 to 329 are performed only in the first terminal. In addition, an execution sequence of steps 327 to 329 and steps 302 to 326 is not limited in this embodiment of the present disclosure, and steps 327 to 329 may be performed whenever a picture indicating an end of a call between the first terminal and the second terminal appears.

In addition, although FIG. 3A, FIG. 3B, FIG. 3C, and FIG. 3D show only one second terminal, the first terminal may simultaneously perform location communication with one or more second terminals, that is, the first terminal may simultaneously obtain location information of one or more second terminals. Further, the first terminal may use different location communication modes for different second terminals, for example, request to access a location of one of a plurality of second terminals, authorize one of a plurality of second terminals to access the location of the first terminal, or share a location with one of a plurality of second terminals. This is not limited herein.

Figure 19:
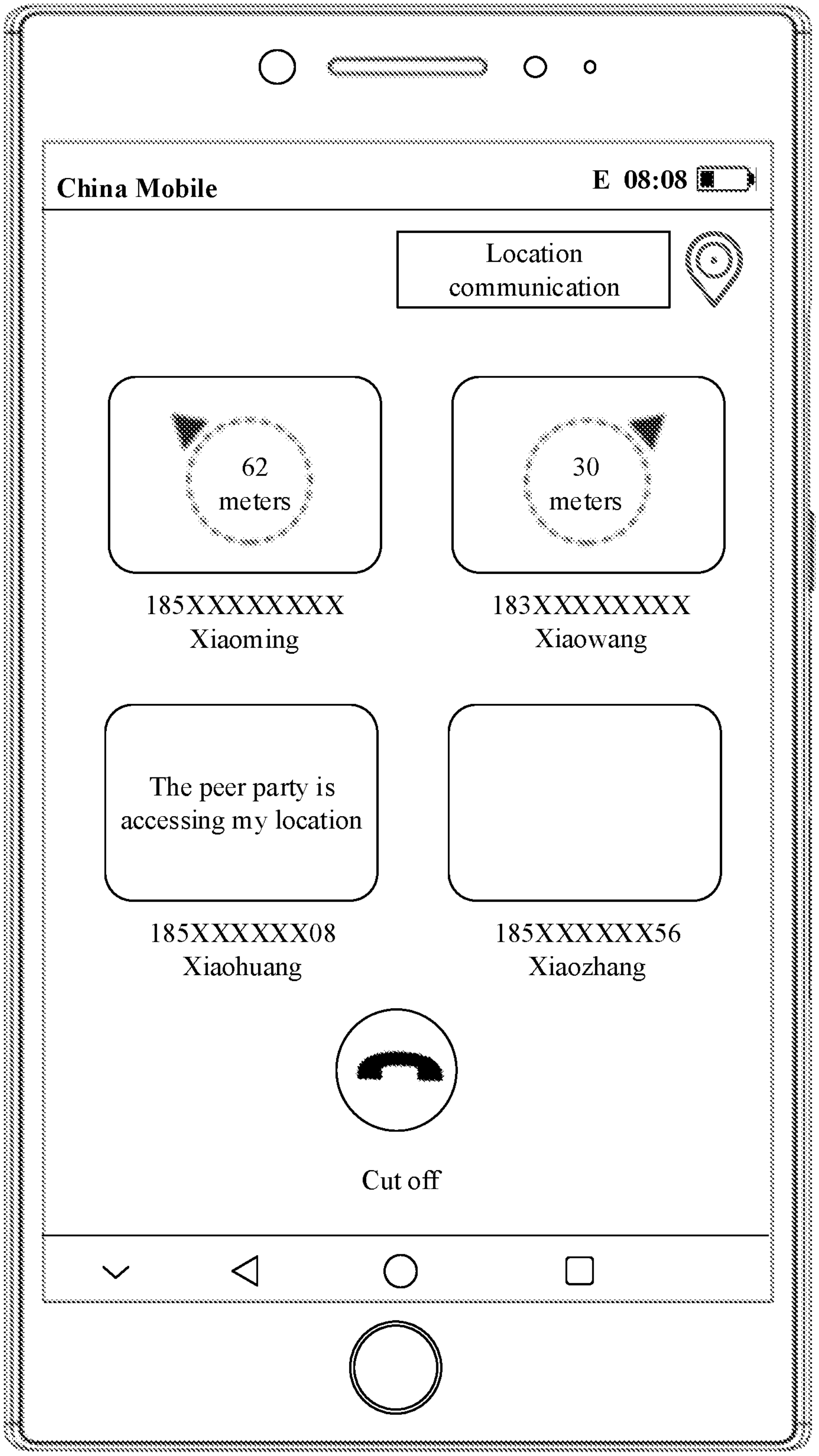
FIG. 19 is a schematic interface diagram of displaying a location of a terminal in a location processing method according to an embodiment of the present disclosure.
Figure 20A:
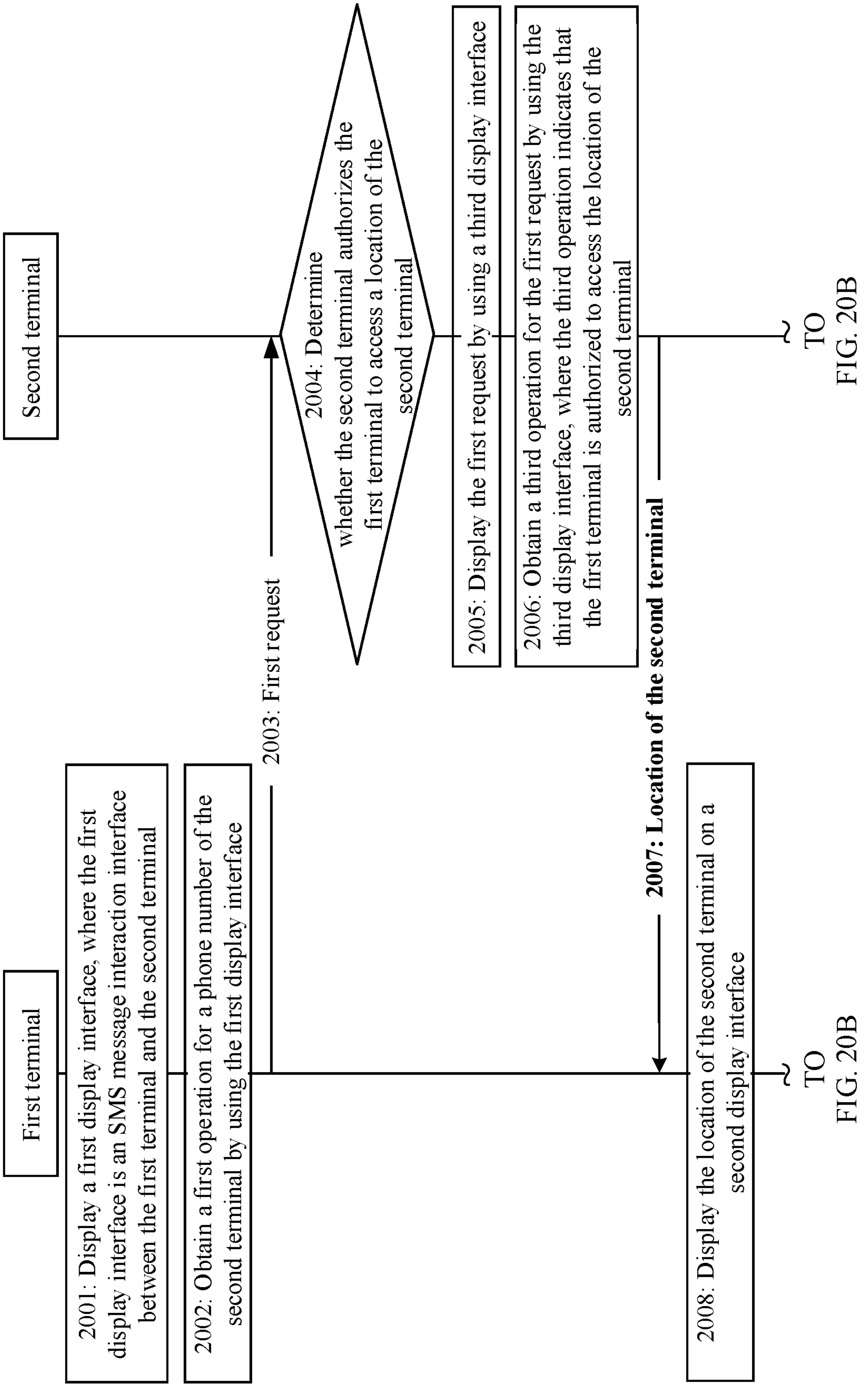
FIG. 20A, FIG. 20B, FIG. 20C, and FIG. 20D are another schematic flowchart of a location processing method according to an embodiment of the present disclosure.
Figure 20B:
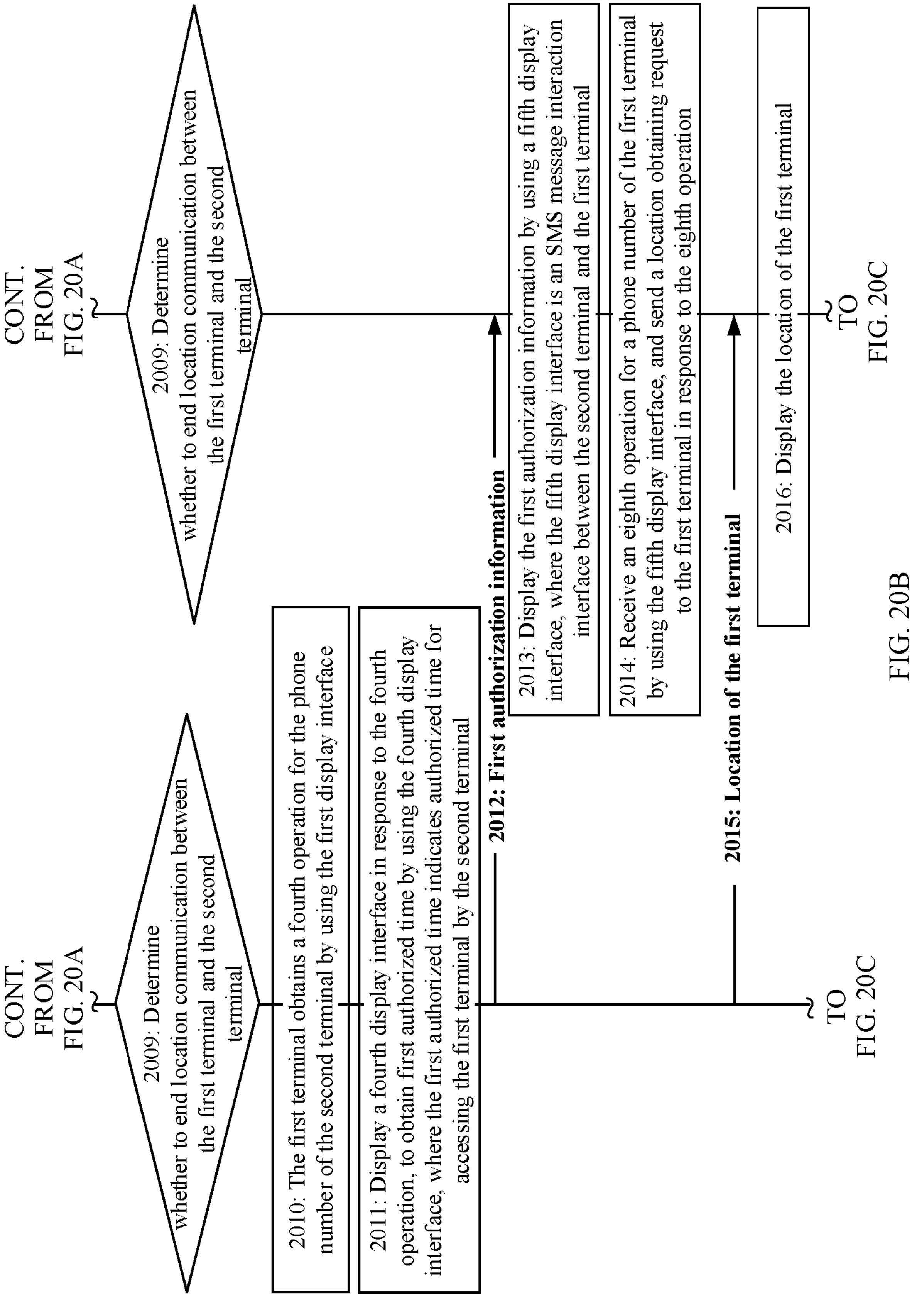
Figure 20C:
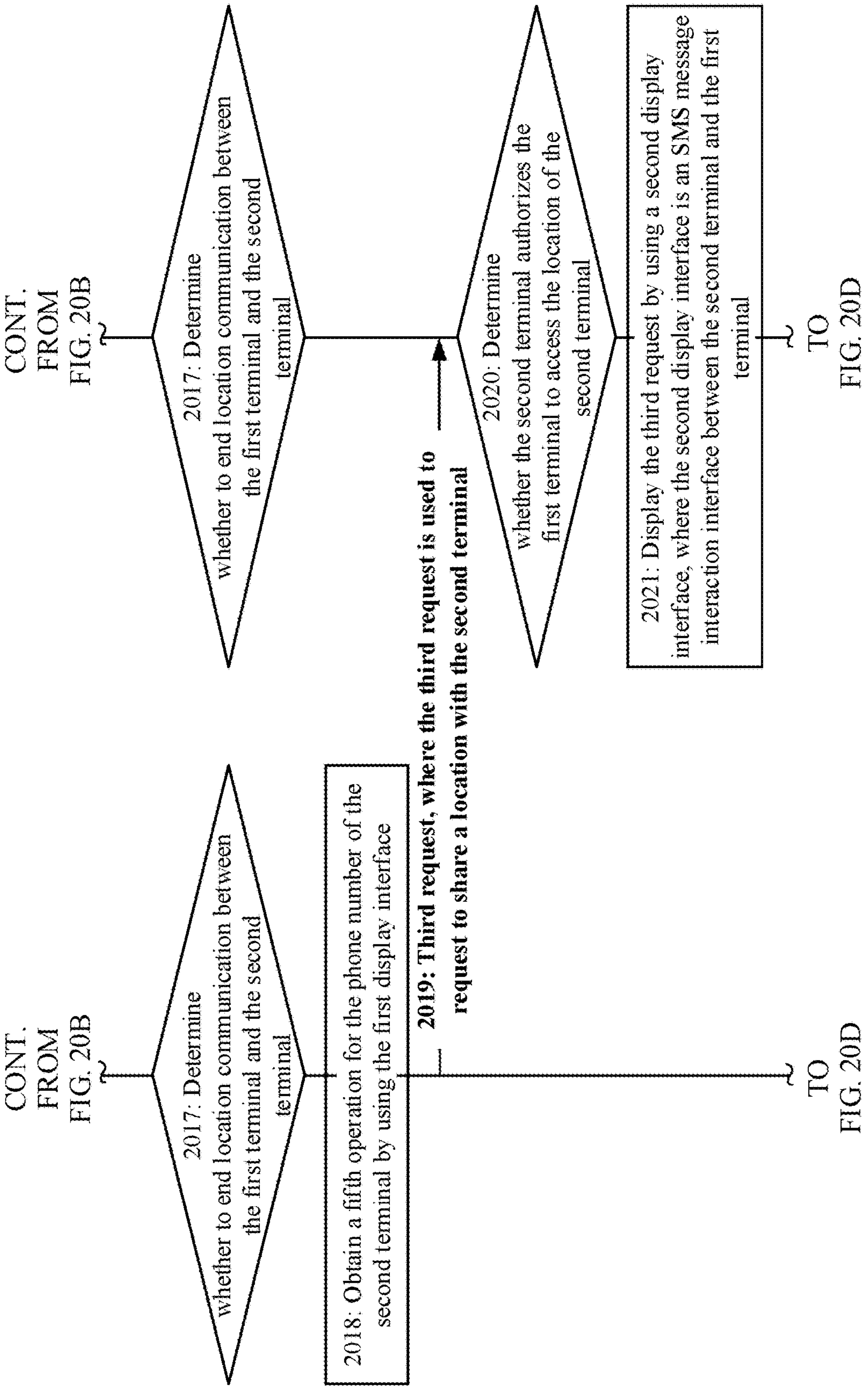
Figure 20D:
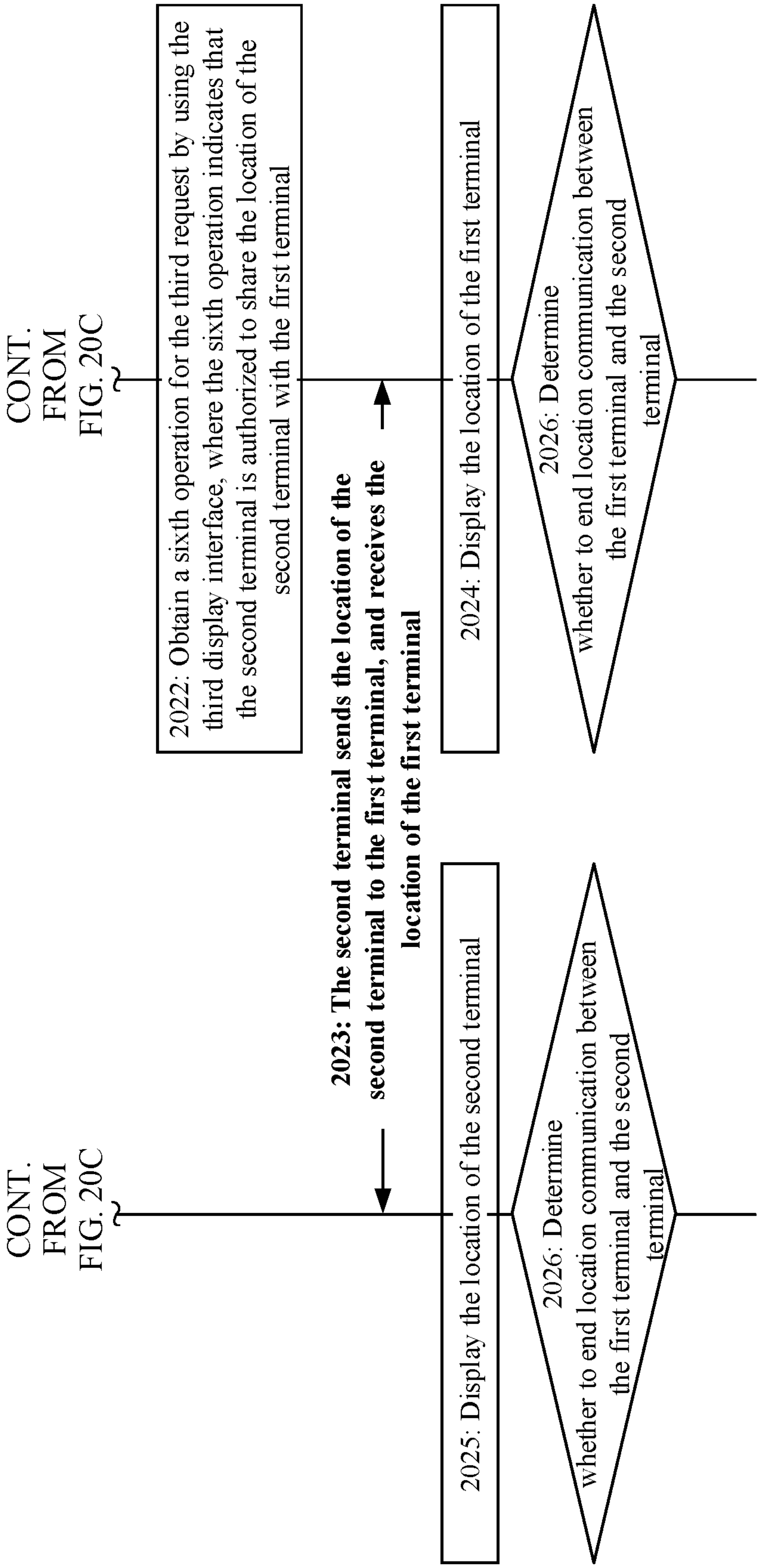

To further understand this solution, refer to FIG. 19. FIG. 19 is a schematic interface diagram of displaying a location of a terminal in a location processing method according to an embodiment of the present disclosure. In FIG. 19, for example, the first terminal simultaneously performs calls with Xiaoming, Xiaowang, Xiaohuang, and Xiaozhang. As shown in the figure, the first terminal displays a location of Xiaoming relative to the first terminal, and a location of Xiaowang relative to the first terminal, and Xiaohuang is accessing the location of the first terminal. It should be understood that the example in FIG. 19 is merely intended to facilitate understanding of this solution, and is not intended to limit this solution.

2. The first display interface is an SMS message interaction interface.

In this embodiment of the present disclosure, FIG. 20A, FIG. 20B, FIG. 20C, and FIG. 20D are a schematic flowchart of a location processing method according to an embodiment of the present disclosure. The location processing method provided in this embodiment of the present disclosure may include the following steps.

2001: A first terminal displays a first display interface, where the first display interface is an SMS message interaction interface between the first terminal and a second terminal.

2002: The first terminal obtains a first operation for a phone number of the second terminal by using the first display interface.

2003: The first terminal sends a first request to the second terminal in response to the first operation.

2004: The second terminal determines whether the second terminal authorizes the first terminal to access a location of the second terminal; and if the second terminal does not authorize the first terminal to access the location of the second terminal, enters step 2005; or if the second terminal authorizes the first terminal to access the location of the second terminal, enters step 2007.

2005: The second terminal displays the first request by using a third display interface.

2006: The second terminal obtains a third operation for the first request by using the third display interface, where the third operation indicates that the first terminal is authorized to access the location of the second terminal.

2007: The first terminal receives the location that is of the second terminal and that is sent by the second terminal.

2008: The first terminal displays the location of the second terminal on a second display interface.

2009: The first terminal or the second terminal determines whether to end location communication between the first terminal and the second terminal; and if a determining result is no, continues to perform step 2008; or if a determining result is yes, ends location communication between the first terminal and the second terminal.

In this embodiment of the present disclosure, specific implementations of steps 2001 to 2009 are similar to the specific implementations of steps 301 to 309. Reference may be made to the foregoing descriptions. A difference lies in that the call interface between the first terminal and the second terminal in steps 301 to 309 is replaced with the SMS message interaction interface between the first terminal and the second terminal.

Figure 21:
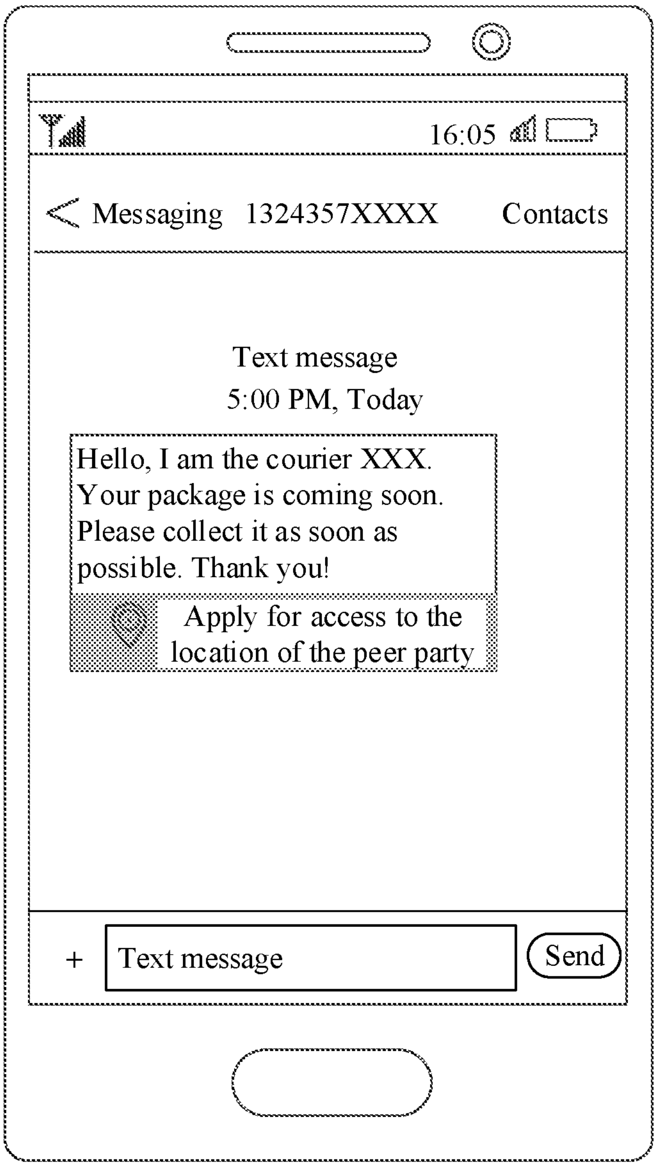
FIG. 21 is a schematic interface diagram of a first display interface in a location processing method according to an embodiment of the present disclosure.

To more intuitively understand this solution, refer to FIG. 21. FIG. 21 is a schematic interface diagram of a first display interface in a location processing method according to an embodiment of the present disclosure. In FIG. 21, for example, a first icon ("apply for access to the location of the peer party" shown in FIG. 21) that triggers the first operation is displayed on the SMS message interaction interface between the first terminal and the second terminal. When a user taps the first icon, the first terminal obtains the first operation for the phone number of the second terminal by using the first display interface. It should be understood that the example in FIG. 21 is merely intended to facilitate understanding of this solution, and is not intended to limit this solution.

2010: The first terminal obtains a fourth operation for the phone number of the second terminal by using the first display interface.

2011: The first terminal displays a fourth display interface in response to the fourth operation, to obtain first authorized time by using the fourth display interface, where the first authorized time indicates authorized time for accessing the first terminal by the second terminal.

2012: The first terminal sends first authorization information to the second terminal.

2013: The second terminal displays the first authorization information by using a fifth display interface, where the fifth display interface is an SMS message interaction interface between the second terminal and the first terminal.

2014: The second terminal receives an eighth operation for a phone number of the first terminal by using the fifth display interface, and sends a location obtaining request to the first terminal in response to the eighth operation.

2015: The second terminal receives a location that is of the first terminal and that is sent by the first terminal.

2016: The second terminal displays the location of the first terminal.

2017: The first terminal or the second terminal determines whether to end location communication between the first terminal and the second terminal; and if a determining result is no, continues to perform step 2015; or if a determining result is yes, ends location communication between the first terminal and the second terminal.

2018: The first terminal obtains a fifth operation for the phone number of the second terminal by using the first display interface.

2019: The first terminal sends a third request to the second terminal based on the fifth operation, where the third request is used to request to share a location with the second terminal.

2020: The second terminal determines whether the second terminal authorizes the first terminal to access the location of the second terminal; and if the second terminal does not authorize the first terminal to access the location of the second terminal, enters step 2021; or if the second terminal authorizes the first terminal to access the location of the second terminal, enters step 2023.

2021: The second terminal displays the third request by using a second display interface, where the second display interface is an SMS message interaction interface between the second terminal and the first terminal.

2022: The second terminal obtains a sixth operation for the third request by using the second display interface, where the sixth operation indicates that the second terminal is authorized to share the location of the second terminal with the first terminal.

2023: The second terminal sends the location of the second terminal to the first terminal, and receives the location that is of the first terminal and that is sent by the first terminal.

2024: The second terminal displays the location of the first terminal.

2025: The first terminal displays the location of the second terminal.

2026: The first terminal or the second terminal determines whether to end location communication between the first terminal and the second terminal; and if a determining result is no, continues to perform step 2023; or if a determining result is yes, ends location communication between the first terminal and the second terminal.

In this embodiment of the present disclosure, specific implementations of steps 2010 to 2026 are similar to the specific implementations of steps 310 to 326. Reference may be made to the foregoing descriptions. A difference lies in that the call interface between the first terminal and the second terminal in steps 301 to 326 is replaced with the SMS message interaction interface between the first terminal and the second terminal.

Figure 22:
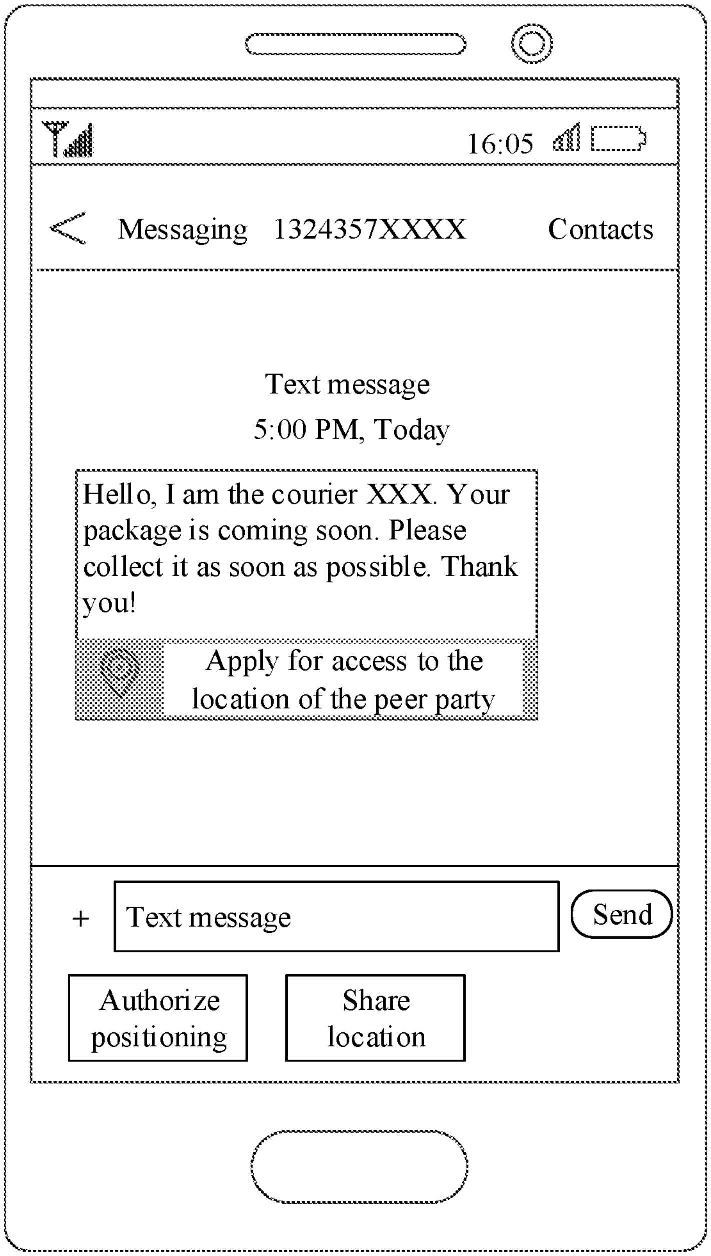
FIG. 22 is another schematic interface diagram of a first display interface in a location processing method according to an embodiment of the present disclosure.

To more intuitively understand this solution, refer to FIG. 22. FIG. 22 is a schematic interface diagram of a first display interface in a location processing method according to an embodiment of the present disclosure. FIG. 22 is described with reference to FIG. 21. When the user taps a "+" button in FIG. 21, the first terminal is triggered to enter FIG. 22, and then select a location communication mode. It should be understood that the example in FIG. 22 is merely intended to facilitate understanding of this solution, and is not intended to limit this solution.

In this embodiment of the present disclosure, the first operation, the fourth operation, or the fifth operation may be alternatively obtained through triggering by using an address book interface, a call record interface, or the like between the first terminal and the second terminal, that is, the first display interface may be replaced with the address book interface or the call record interface between the first terminal and the second terminal. Other steps are similar to those in the descriptions in the embodiment corresponding to FIG. 20A, FIG. 20B, FIG. 20C, and FIG. 20D. Details are not described herein.

In this embodiment of the present disclosure, location communication between terminals can be enabled by using a call interface, or can be enabled by using an SMS message interaction interface, thereby improving implementation flexibility of the solutions.

Figure 23:
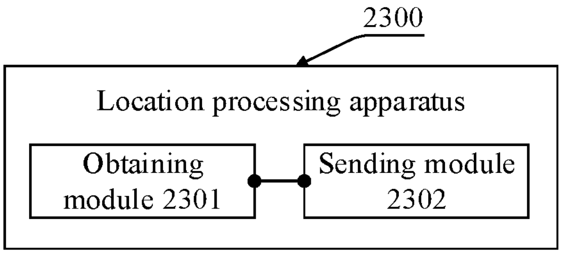
FIG. 23 is a schematic diagram of a structure of a location processing apparatus according to an embodiment of the present disclosure.

Based on the embodiments corresponding to FIG. 1 to FIG. 22, to better implement the foregoing solutions in embodiments of the present disclosure, the following further provides a related device configured to implement the foregoing solutions. For details, refer to FIG. 23. FIG. 23 is a schematic diagram of a structure of a location processing apparatus according to an embodiment of the present disclosure. A location processing apparatus 2300 is applied to a first terminal, and the apparatus 2300 includes: an obtaining module 2301 configured to obtain a first operation instruction corresponding to a first operation, where the first operation is an operation that is for a phone number of a second terminal and that is obtained by using a first display interface, and the first display interface is a communication interface between the first terminal and the second terminal; and a sending module 2302 configured to send a first request to the second terminal in response to the first operation instruction, where the first request is used to request to obtain a location of the second terminal. The obtaining module 2301 is further configured to: when the second terminal authorizes the first terminal to access the location of the second terminal, obtain the location of the second terminal, to display the location of the second terminal.

Figure 24:
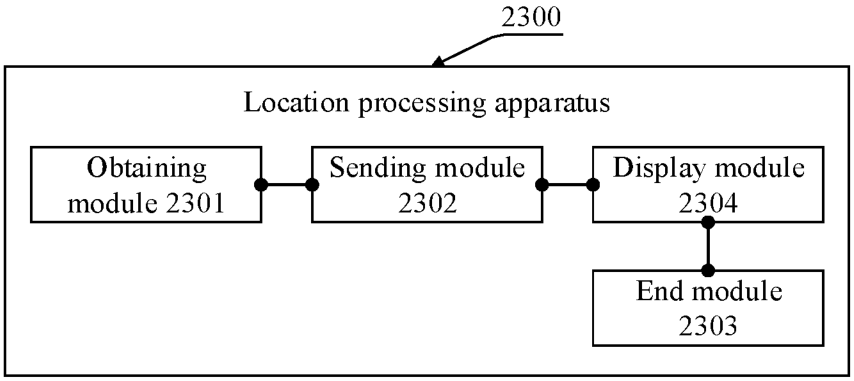
FIG. 24 is a schematic diagram of another structure of a location processing apparatus according to an embodiment of the present disclosure.

In a possible design, refer to FIG. 24. FIG. 24 is a schematic diagram of a structure of a location processing apparatus according to an embodiment of the present disclosure. The location processing apparatus 2300 further includes: an end module 2303 configured to: when a first preset condition is met, end location communication between the first terminal and the second terminal, where the first preset condition includes a first end condition and/or a second end condition. The first end condition includes any one or a combination of a plurality of the following four conditions: a relative distance between the first terminal and the second terminal is less than or equal to a preset distance threshold; a change rule of a relative location between the first terminal and the second terminal meets a first change rule; a location obtaining manner of the second terminal is changed from a short-distance wireless positioning technology to a long-distance wireless positioning technology, and the long-distance wireless positioning technology implements positioning by using a communication technology other than short-distance wireless communication; and an end operation for location communication between the first terminal and the second terminal is obtained. The second end condition is that duration during which the first terminal accesses the location of the second terminal reaches a duration threshold authorized by the second terminal.

In a possible design, the sending module 2302 is further configured to: when the first terminal determines that a second end condition is met and a first end condition is not met, send a second request to the second terminal, where the second request is used to request to prolong authorized duration for accessing the location of the second terminal by the first terminal. The first end condition includes any one or a combination of a plurality of the following four conditions: a relative distance between the first terminal and the second terminal is less than or equal to a preset distance threshold; a change rule of a relative location between the first terminal and the second terminal meets a first change rule; a location obtaining manner of the second terminal is changed from a short-distance wireless positioning technology to a long-distance wireless positioning technology, and the long-distance wireless positioning technology implements positioning by using a communication technology other than short-distance wireless communication; and an end operation for location communication between the first terminal and the second terminal is obtained. The second end condition is that duration during which the first terminal accesses the location of the second terminal reaches a duration threshold authorized by the second terminal.

In a possible design, a manner of displaying the location of the second terminal on a second display interface includes any one or more of the following: displaying the location of the second terminal on a call interface between the first terminal and the second terminal; displaying the location of the second terminal by using a floating window; displaying the location of the second terminal by using a card; and displaying the location of the second terminal on a display interface of a first intelligent wearable device, where the first intelligent wearable device is a device that has a connection relationship with the first terminal.

In a possible design, the location processing apparatus 2300 further includes: a display module 2304 configured to: when the location of the second terminal is obtained based on a long-distance wireless positioning technology, display absolute locations of the first terminal and the second terminal on a map, where the long-distance wireless positioning technology implements positioning by using a communication technology other than short-distance wireless communication; or when the location of the second terminal is obtained based on a short-distance wireless positioning technology, display a location of the second terminal relative to the first terminal.

In a possible design, the display module 2304 is further configured to display a surrounding real environment of the first terminal on a call interface between the first terminal and the second terminal, and display the location of the second terminal relative to the first terminal in the surrounding real environment of the first terminal.

In a possible design, a location of the floating window on the second display interface corresponds to a direction of the second terminal relative to the first terminal; or a style of the floating window corresponds to a distance of the second terminal relative to the first terminal, and the style of the floating window includes one or more of the following: a size, a color, a shape, and transparency of the floating window.

In a possible design, the display module 2304 is further configured to display navigation information on the second display interface, where the navigation information indicates a navigation path between the first terminal and the second terminal.

In a possible design, the obtaining module 2301 is further configured to: obtain, by using a call end interface between the first terminal and the second terminal, a second operation instruction corresponding to a second operation, where the second operation is an operation for the phone number of the second terminal; and obtain a current location of the first terminal in response to the second operation; and the sending module 2302 is further configured to transmit the current location of the first terminal to the second terminal.

In a possible design, the first display interface is a call interface between the first terminal and the second terminal, or the first display interface is an SMS message interaction interface between the first terminal and the second terminal.

It should be noted that content such as information exchange and execution processes between modules/units in the location processing apparatus 2300 is based on a same concept as the method embodiments corresponding to FIG. 3A, FIG. 3B, FIG. 3C, and FIG. 3D to FIG. 22 in the present disclosure. For specific content, refer to the foregoing descriptions in the method embodiments shown in the present disclosure.

Figure 25:
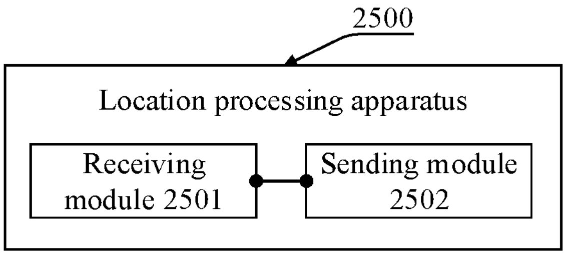
FIG. 25 is a schematic diagram of still another structure of a location processing apparatus according to an embodiment of the present disclosure.

An embodiment of the present disclosure further provides a location processing apparatus. FIG. 25 is a schematic diagram of a structure of a location processing apparatus according to an embodiment of the present disclosure. A location processing apparatus 2500 is applied to a first terminal, and the apparatus 2500 includes: a receiving module 2501 configured to receive a first request that is for a phone number of the second terminal and that is sent by a first terminal, where the first request is obtained by using a third display interface, the third display interface is a communication interface between the first terminal and the second terminal, and the first request indicates that the first terminal requests to access a location of the second terminal; and a sending module 2502 configured to send the location of the second terminal to the first terminal when the second terminal authorizes the first terminal to access the location of the second terminal.

Figure 26:
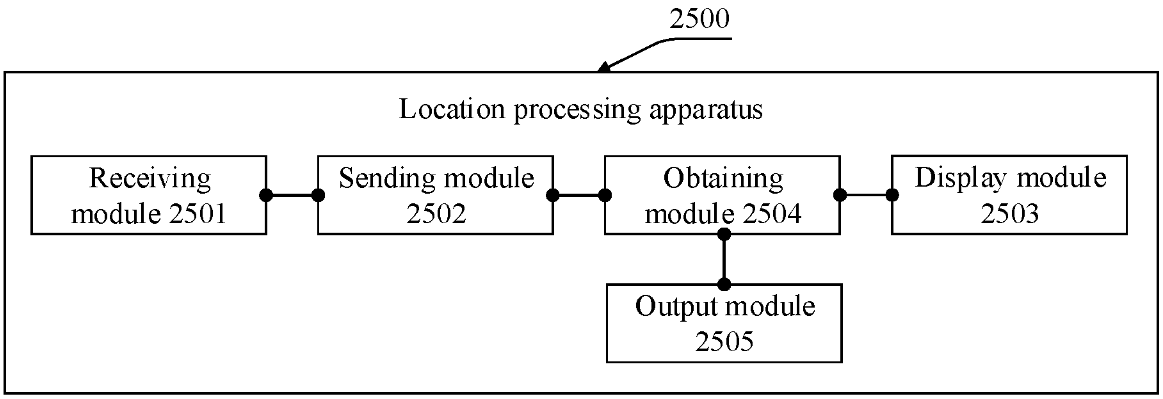
FIG. 26 is a schematic diagram of yet another structure of a location processing apparatus according to an embodiment of the present disclosure.

In a possible design, refer to FIG. 26. FIG. 26 is a schematic diagram of a structure of a location processing apparatus according to an embodiment of the present disclosure. The location processing apparatus 2500 further includes: a display module 2503 configured to display the first request by using the third display interface; and an obtaining module 2504 configured to obtain a third operation instruction corresponding to a third operation, where the third operation is an operation that is for the first request and that is obtained by using the third display interface, and the third operation indicates that the first terminal is authorized to access the location of the second terminal. The sending module 2502 is further configured to send the location of the second terminal to the first terminal in response to the third operation.

In a possible design, the location processing apparatus 2500 further includes: an obtaining module 2504 configured to obtain a fourth operation instruction corresponding to a fourth operation, where the fourth operation is an operation that is for a phone number of the first terminal and that is obtained by using the third display interface. The sending module 2502 is further configured to send first authorization information to the first terminal based on the fourth operation, where the first authorization information indicates that the first terminal is authorized to access the location of the second terminal.

In a possible design, the location processing apparatus 2500 further includes: a display module 2503 configured to: display a fourth display interface in response to the fourth operation, and obtain first authorized time by using the fourth display interface, where the first authorized time indicates authorized time for accessing the first terminal by the first terminal.

In a possible design, the third display interface is an interface displayed when the first terminal performs a call with the second terminal, and the location processing apparatus 2500 further includes: an output module configured to: when the call between the first terminal and the second terminal ends, output first query information, where the first query information is used to determine whether to continue to authorize, after the call ends, the first terminal to access the location of the second terminal.

In a possible design, the location processing apparatus 2500 further includes: an obtaining module 2504 configured to obtain any one or more of the following information by using a setting interface: whether the second terminal authorizes a terminal other than the second terminal to access the location of the second terminal based on the phone number of the second terminal; authorized time during which the second terminal authorizes a terminal other than the second terminal to access the location of the second terminal based on the phone number of the second terminal; a whitelist, where the whitelist corresponds to a phone number of at least one terminal, and each of the at least one terminal corresponding to the whitelist is authorized to access the location of the second terminal based on the phone number of the second terminal; whether to authorize, after a call between the second terminal and a terminal other than the second terminal ends if the second terminal forms location communication with the terminal other than the second terminal in a call process, the terminal other than the second terminal to continue to access the location of the second terminal; and authorized duration during which a terminal other than the second terminal is authorized, after a call between the second terminal and the terminal other than the second terminal ends if the second terminal forms location communication with the terminal other than the second terminal in a call process, to continue to access the location of the second terminal.

In a possible design, the location processing apparatus 2500 further includes: an output module 2505 configured to: when a change rule of an absolute location of the second terminal meets a second change rule, output second query information, where the second query information is used to indicate whether to send prompt information to the first terminal, and the prompt information is used to notify the first terminal that the location of the second terminal changes.

In a possible design, the location processing apparatus 2500 further includes: an obtaining module 2504 configured to: obtain, by using a call end interface between the first terminal and the second terminal, a second operation instruction corresponding to a second operation, where the second operation is an operation for a phone number of the first terminal; and obtain a current location of the second terminal in response to the second operation. The sending module 2502 is further configured to transmit the current location of the second terminal to the first terminal.

It should be noted that content such as information exchange and execution processes between modules/units in the location processing apparatus 2500 is based on a same concept as the method embodiments corresponding to FIG. 3A, FIG. 3B, FIG. 3C, and FIG. 3D to FIG. 22 in the present disclosure. For specific content, refer to the foregoing descriptions in the method embodiments shown in the present disclosure.

Figure 27:
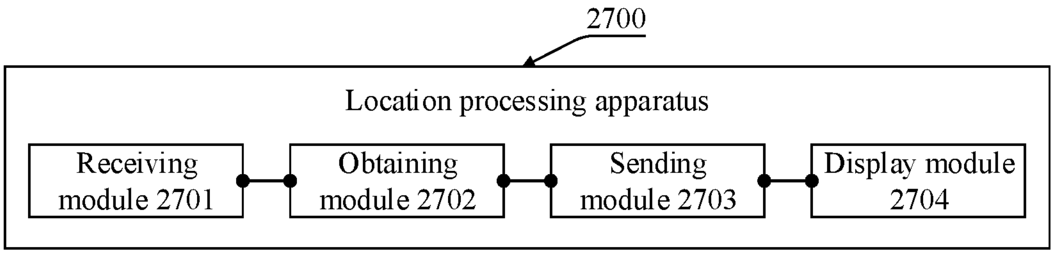
FIG. 27 is a schematic diagram of still yet another structure of a location processing apparatus according to an embodiment of the present disclosure.

An embodiment of the present disclosure further provides a location processing apparatus. FIG. 27 is a schematic diagram of a structure of a location processing apparatus according to an embodiment of the present disclosure. A location processing apparatus 2700 is applied to a first terminal, and the apparatus 2700 includes: a receiving module 2701 configured to: receive a third request that is for a phone number of the second terminal and that is sent by a first terminal, and display the third request by using a third display interface, where the third display interface displays a phone number of the first terminal, and the third request indicates that the first terminal requests to share a location with the second terminal; an obtaining module 2702 configured to obtain a sixth operation for the third request by using the third display interface, where the sixth operation indicates that the second terminal is authorized to share a location of the second terminal with the first terminal; a sending module 2703 configured to: send the location of the second terminal to the first terminal based on the sixth operation, and receive a location that is of the first terminal and that is sent by the first terminal; and a display module 2704 configured to display the location of the first terminal.

In a possible design, when a location distance between the first terminal and the second terminal is greater than or equal to a first distance value, the location of the second terminal is obtained based on a long-distance wireless positioning technology, where the long-distance wireless positioning technology implements positioning by using a communication technology other than short-distance wireless communication; or when a location distance between the first terminal and the second terminal is less than the first distance value, the location of the second terminal is obtained based on a short-distance wireless positioning technology.

It should be noted that content such as information exchange and execution processes between modules/units in the location processing apparatus 2700 is based on a same concept as the method embodiments corresponding to FIG. 3A, FIG. 3B, FIG. 3C, and FIG. 3D to FIG. 22 in the present disclosure. For specific content, refer to the foregoing descriptions in the method embodiments shown in the present disclosure.

Figure 28:
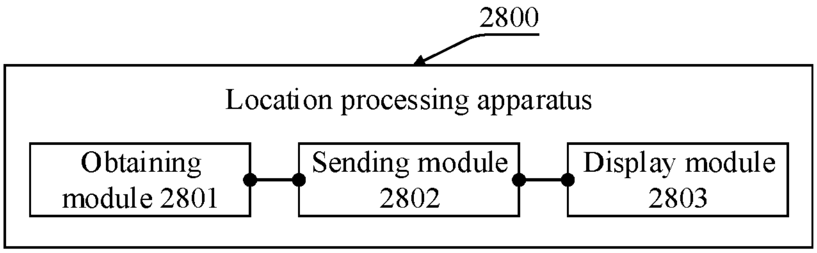
FIG. 28 is a schematic diagram of a further structure of a location processing apparatus according to an embodiment of the present disclosure.

An embodiment of the present disclosure further provides a location processing apparatus. FIG. 28 is a schematic diagram of a structure of a location processing apparatus according to an embodiment of the present disclosure. A location processing apparatus 2800 is applied to a first terminal, and the apparatus 2800 includes: an obtaining module 2801 configured to obtain a fifth operation instruction corresponding to a fifth operation, where the fifth operation is an operation that is for a phone number of a second terminal and that is obtained by using a first display interface, and the first display interface is a communication interface between the first terminal and the second terminal; a sending module 2802 configured to send a third request to the second terminal based on the fifth operation, where the third request is used to request to share a location with the second terminal, where the sending module is configured to: when the second terminal is allowed to share a location with the first terminal, send a location of the first terminal to the second terminal, and receive a location that is of the second terminal and that is sent by the second terminal; and a display module 2803 configured to display the location of the second terminal.

In a possible design, when a location distance between the first terminal and the second terminal is greater than or equal to a first distance value, the location of the second terminal is obtained based on a long-distance wireless positioning technology, where the long-distance wireless positioning technology implements positioning by using a communication technology other than short-distance wireless communication; or when a location distance between the first terminal and the second terminal is less than the first distance value, the location of the second terminal is obtained based on a short-distance wireless positioning technology.

It should be noted that content such as information exchange and execution processes between modules/units in the location processing apparatus 2800 is based on a same concept as the method embodiments corresponding to FIG. 3A, FIG. 3B, FIG. 3C, and FIG. 3D to FIG. 22 in the present disclosure. For specific content, refer to the foregoing descriptions in the method embodiments shown in the present disclosure.

Figure 29:
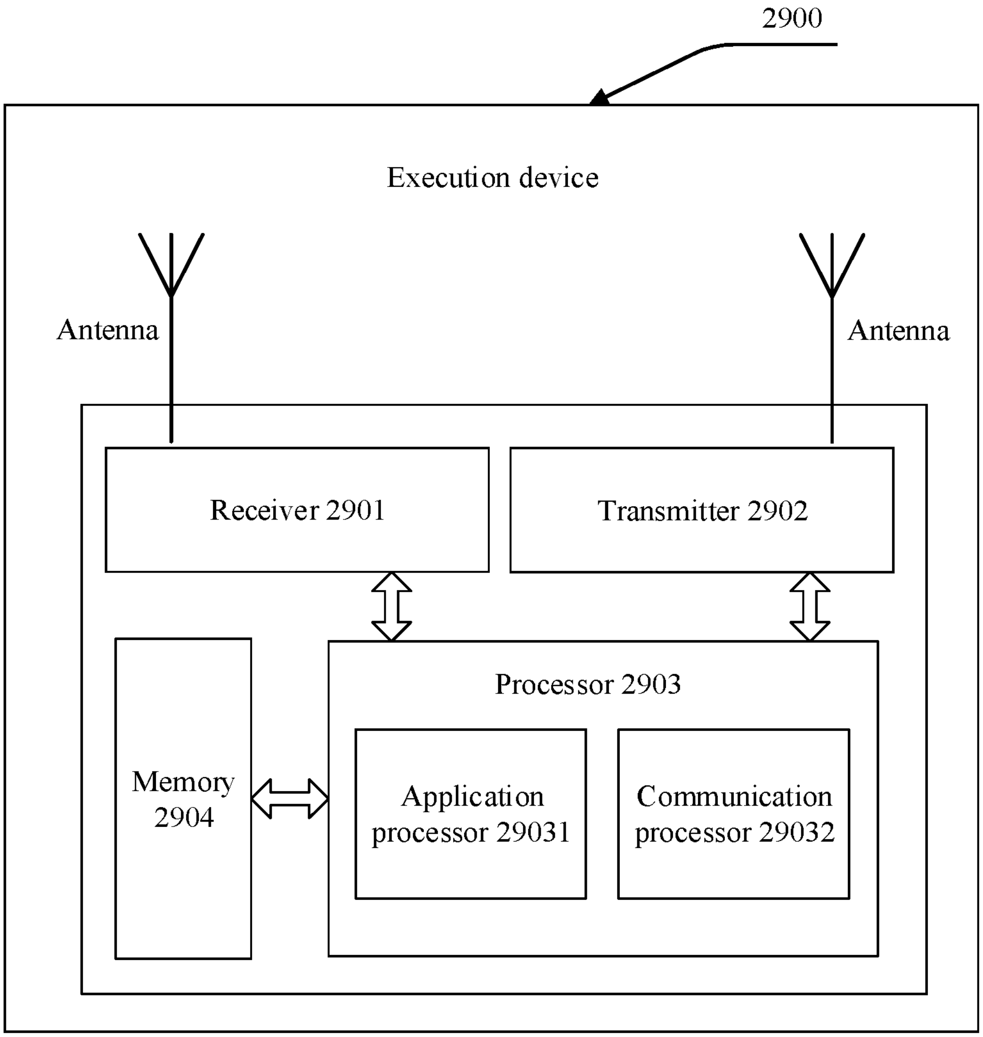
FIG. 29 is a schematic diagram of a structure of an execution device according to an embodiment of the present disclosure.

An embodiment of the present disclosure further provides an execution device. FIG. 29 is a schematic diagram of a structure of an execution device according to an embodiment of the present disclosure. An execution device 2900 may be specifically represented as a mobile terminal device such as a mobile phone, a tablet computer, a notebook computer, an intelligent wearable device, an intelligent vehicle, or a mobile robot. This is not limited herein. The first terminal described in the embodiments corresponding to FIG. 3A, FIG. 3B, FIG. 3C, and FIG. 3D to FIG. 22 may be deployed in the execution device 2900, to implement the function of the location processing apparatus 2300 in the embodiment corresponding to FIG. 23 or FIG. 24. Alternatively, the second terminal described in the embodiments corresponding to FIG. 3A, FIG. 3B, FIG. 3C, and FIG. 3D to FIG. 22 may be deployed in the execution device 2900, to implement the function of the location processing apparatus 2500 in the embodiment corresponding to FIG. 25 or FIG. 26. Alternatively, the execution device 2900 is configured to implement the function of the location processing apparatus 2700 in the embodiment corresponding to FIG. 27. Alternatively, the execution device 2900 is configured to implement the function of the location processing apparatus 2800 in the embodiment corresponding to FIG. 28.

Specifically, the execution device 2900 includes a receiver 2901, a transmitter 2902, a processor 2903, and a memory 2904 (there may be one or more processors 2903 in the execution device 2900, and one processor is used as an example in FIG. 29). The processor 2903 may include an application processor 29031 and a communication processor 29032. In some embodiments of the present disclosure, the receiver 2901, the transmitter 2902, the processor 2903, and the memory 2904 may be connected by using a bus or in another manner.

The memory 2904 may include a read-only memory (ROM) and a random-access memory (RAM), and provide instructions and data to the processor 2903. A part of the memory 2904 may further include a non-volatile RAM (NVRAM). The memory 2904 stores a processor and operation instructions, an executable module or a data structure, a subset thereof, or an extended set thereof. The operation instructions may include various operation instructions for implementing various operations.

The processor 2903 controls an operation of the data generation apparatus. In a specific application, components of the data generation apparatus are coupled together by using a bus system. In addition to a data bus, the bus system includes a power bus, a control bus, and a status signal bus. However, for clear description, various types of buses in the figure are marked as the bus system.

The foregoing method disclosed in embodiments of the present disclosure may be applied to the processor 2903, or implemented by the processor 2903. The processor 2903 may be an integrated circuit chip and has a signal processing capability. In an implementation process, the steps in the foregoing method may be implemented by using a hardware integrated logical circuit in the processor 2903, or by using instructions in a form of software. The processor 2903 may be a general-purpose processor, a digital signal processor (DSP), a microprocessor, or a microcontroller. The processor 2903 may further include an application-specific integrated circuit (ASIC), a field-programmable gate array (FPGA) or another programmable logic device, a discrete gate, or a transistor logic device, or a discrete hardware component. The processor 2903 may implement or execute methods, steps and logical block diagrams disclosed in embodiments of the present disclosure. The general-purpose processor may be a microprocessor, or the processor may be any conventional processor or the like. The steps in the methods disclosed with reference to embodiments of the present disclosure may be directly performed and completed by a hardware decoding processor, or may be performed and completed by using a combination of hardware in the decoding processor and a software module. The software module may be located in a mature storage medium in the art, such as a random access memory, a flash memory, a RAM, a programmable RAM (PROM), an electrically erasable PROM (EEPROM), or a register. The storage medium is located in the memory 2904, and a processor 2903 reads information in the memory 2904 and completes the steps in the foregoing methods in combination with hardware of the processor.

The receiver 2901 may be configured to: receive input numeric or character information, and generate signal input related to related settings and function control of the data generation apparatus. The transmitter 2902 may be configured to output numeric or character information by using a first interface. The transmitter 2902 may be further configured to send an instruction to a disk group by using the first interface, to modify data in the disk group. The transmitter 2902 may further include a display device such as a display screen.

In this embodiment of the present disclosure, in a case, the application processor 29031 is configured to implement the function of the first terminal in the embodiments corresponding to FIG. 3A, FIG. 3B, FIG. 3C, and FIG. 3D to FIG. 22. For specific implementations and brought beneficial effects of executing, by the application processor 29031, the function of the first terminal in the embodiments corresponding to FIG. 3A, FIG. 3B, FIG. 3C, and FIG. 3D to FIG. 22, refer to the descriptions in the method embodiments corresponding to FIG. 3A, FIG. 3B, FIG. 3C, and FIG. 3D to FIG. 22.

In this embodiment of the present disclosure, in another case, the application processor 29031 is configured to implement the function of the second terminal in the embodiments corresponding to FIG. 3A, FIG. 3B, FIG. 3C, and FIG. 3D to FIG. 22. For specific implementations and brought beneficial effects of executing, by the application processor 29031, the function of the second terminal in the embodiments corresponding to FIG. 3A, FIG. 3B, FIG. 3C, and FIG. 3D to FIG. 22, refer to the descriptions in the method embodiments corresponding to FIG. 3A, FIG. 3B, FIG. 3C, and FIG. 3D to FIG. 22.

An embodiment of the present disclosure further provides a computer readable storage medium. The computer readable storage medium stores a program. When the program runs on a computer, the computer is enabled to perform the steps performed by the first terminal in the methods described in the foregoing embodiments shown in FIG. 3A, FIG. 3B, FIG. 3C, and FIG. 3D to FIG. 22, or perform the steps performed by the second terminal in the methods described in the foregoing embodiments shown in FIG. 3A, FIG. 3B, FIG. 3C, and FIG. 3D to FIG. 22.

An embodiment of the present disclosure further provides a computer program. When the computer program runs on a computer, the computer is enabled to perform the steps performed by the first terminal in the methods described in the foregoing embodiments shown in FIG. 3A, FIG. 3B, FIG. 3C, and FIG. 3D to FIG. 22, or perform the steps performed by the second terminal in the methods described in the foregoing embodiments shown in FIG. 3A, FIG. 3B, FIG. 3C, and FIG. 3D to FIG. 22.

An embodiment of the present disclosure further provides a circuit system. The circuit system includes a processing circuit, and the processing circuit is configured to perform the steps performed by the first terminal in the methods described in the foregoing embodiments shown in FIG. 3A, FIG. 3B, FIG. 3C, and FIG. 3D to FIG. 22, or perform the steps performed by the second terminal in the methods described in the foregoing embodiments shown in FIG. 3A, FIG. 3B, FIG. 3C, and FIG. 3D to FIG. 22.

The location processing apparatus provided in the embodiments of the present disclosure may be specifically a chip. The chip includes a processing unit and a communication unit. The processing unit may be, for example, a processor, and the communication unit may be, for example, an input/output interface, a pin, or a circuit. The processing unit may execute computer executable instructions stored in a storage unit, to enable the chip to perform the steps performed by the first terminal in the methods described in the foregoing embodiments shown in FIG. 3A, FIG. 3B, FIG. 3C, and FIG. 3D to FIG. 22, or perform the steps performed by the second terminal in the methods described in the foregoing embodiments shown in FIG. 3A, FIG. 3B, FIG. 3C, and FIG. 3D to FIG. 22. Optionally, the storage unit is a storage unit in the chip, such as a register or a cache, or the storage unit may be a storage unit that is in the wireless access device and that is outside the chip, such as ROM or another type of static storage device that can store static information and instructions, or RAM.

The processor mentioned in any one of the foregoing aspects may be a general-purpose central processing unit, a microprocessor, an ASIC, or one or more integrated circuits for controlling program execution of the method in the first aspect.

In addition, it should be noted that the described apparatus embodiment is merely an example. The units described as separate parts may or may not be physically separate, and parts displayed as units may or may not be physical units, may be located in one location, or may be distributed on a plurality of network units. Some or all the modules may be selected based on an actual requirement to achieve the objectives of the solutions of the embodiments. In addition, in the accompanying drawings of the apparatus embodiments provided in the present disclosure, connection relationships between modules indicate that the modules have communication connections with each other, which may be specifically implemented as one or more communication buses or signal cables.

Based on the description of the foregoing implementations, a person skilled in the art may clearly understand that the present disclosure may be implemented by software in addition to hardware, or certainly may be implemented by dedicated hardware, including a dedicated integrated circuit, a dedicated CLU, a dedicated memory, a dedicated component, and the like. Generally, any functions that can be performed by a computer program can be easily implemented by using corresponding hardware. Moreover, a specific hardware structure used to achieve a same function may be in various forms, for example, in a form of an analog circuit, a digital circuit, or a dedicated circuit. However, as for the present disclosure, software program implementation is a better implementation in most cases. Based on such an understanding, the technical solutions of the present disclosure essentially or the part contributing to the conventional technology may be implemented in a form of a software product. The computer software product is stored in a readable storage medium, such as a floppy disk, a universal serial bus (USB) flash drive, a removable hard disk, a ROM, a RAM, a magnetic disk, or an optical disc of a computer, and includes several instructions for instructing a computer device (which may be a personal computer, a server, a network device, or the like) to perform the methods described in embodiments of the present disclosure.

All or some of the foregoing embodiments may be implemented by using software, hardware, firmware, or any combination thereof. When software is used to implement the embodiments, all or a part of the embodiments may be implemented in a form of a computer program product.

The computer program product includes one or more computer instructions. When the computer program instructions are loaded and executed on a computer, the procedures or functions according to embodiments of the present disclosure are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state disk (SSD)), or the like.

What is claimed is:

1. A method implemented by a first terminal, the method comprising:

obtaining, using a first display interface, a first operation for a phone number of a second terminal, wherein the first display interface is a communication interface between the first terminal and the second terminal;

obtaining a first operation instruction corresponding to the first operation;

sending, to the second terminal in response to the first operation instruction, a first request to obtain a location of the second terminal;

obtaining the location of the second terminal in response to the first request, wherein the location of the second terminal is based on a long-distance wireless positioning technology when a distance between the first terminal and the second terminal is greater than a distance threshold, wherein the location of the second terminal is based on a short-distance wireless communication technology relative to the first terminal when the distance between the first terminal and the second terminal is less than the distance threshold, and wherein the distance threshold is a communication range of the short-distance wireless communication technology; and displaying the location of the second terminal, wherein displaying the location of the second terminal comprises:

displaying absolute locations of the first terminal and the second terminal on a map when the location of the second terminal is obtained based on the long-distance wireless positioning technology; and displaying the location of the second terminal relative to the first terminal when the location of the second terminal is obtained based on the short-distance wireless communication technology.

2. The method of claim 1, further comprising ending location communication between the first terminal and the second terminal when a first preset condition is met, wherein the first preset condition comprises a first end condition or a second end condition, wherein the second end condition is that a duration during which the first terminal accesses the location of the second terminal reaches a duration threshold authorized by the second terminal, and wherein the first end condition comprises a relative distance between the first terminal and the second terminal is less than or equal to a preset distance threshold.

3. The method of claim 1, further comprising sending a second request to the second terminal to prolong an authorized duration for accessing the location of the second terminal by the first terminal when the first terminal determines that a second end condition is met and a first end condition is not met, wherein the second end condition is that a duration during which the first terminal accesses the location of the second terminal reaches a duration threshold authorized by the second terminal, and wherein the first end condition comprises a change rule of a relative location between the first terminal and the second terminal meets a first change rule.

4. The method of claim 1, wherein displaying the location of the second terminal comprises any one or more of the following:

displaying the location of the second terminal on a call interface between the first terminal and the second terminal;

displaying the location of the second terminal using a floating window;

displaying the location of the second terminal using a card; or causing an intelligent wearable device to display the location of the second terminal on a second display interface.

5. The method of claim 4, wherein a location of the floating window on the second display interface corresponds to a direction of the second terminal relative to the first terminal, or wherein a style of the floating window corresponds to a distance of the second terminal relative to the first terminal, and the style of the floating window comprises one or more of the following: a size, a color, a shape, and transparency of the floating window.

6. The method of claim 1, wherein displaying the location of the second terminal comprises:

displaying the location of the second terminal using a floating window on the first terminal, and wherein a location of the floating window on the first terminal corresponds to a direction of the second terminal relative to the first terminal.

7. The method of claim 6, wherein displaying the location of the second terminal relative to the first terminal comprises:

displaying a surrounding real environment of the first terminal on a call interface between the first terminal and the second terminal; and displaying the location of the second terminal relative to the first terminal in the surrounding real environment of the first terminal.

8. The method of claim 1, further comprising displaying, on a second display interface, navigation information indicating a navigation path between the first terminal and the second terminal.

9. A method implemented by a second terminal, the method comprising:

receiving, using a first display interface, a first request from a first terminal, wherein the first request is associated with a first phone number of the second terminal, wherein the first display interface is a communication interface between the first terminal and the second terminal, and wherein the first request requests a location of the second terminal; and obtaining the location of the second terminal in response to the first request, wherein obtaining the location of the second terminal comprises:

obtaining the location of the second terminal based on a long-distance wireless positioning technology when a distance between the first terminal and the second terminal is greater than a distance threshold;

obtaining the location of the second terminal relative to the first terminal based on a short-distance wireless communication technology by establishing a direct short-distance wireless communication connection with the first terminal when the distance between the first terminal and the second terminal is less than the distance threshold, wherein the distance threshold is a communication range of the short-distance wireless communication technology; and sending the location of the second terminal to the first terminal when authorizing the first terminal to access the location of the second terminal.

10. The method of claim 9, further comprising:

displaying the first request using the first display interface;

obtaining, using the first display interface, a first operation for the first request, wherein the first operation indicates that the first terminal is authorized to access the location of the second terminal; and obtaining a first operation instruction corresponding to the first operation, wherein sending the location of the second terminal to the first terminal when the second terminal authorizes the first terminal to access the location of the second terminal comprises sending the location of the second terminal to the first terminal in response to the first operation instruction.

11. The method of claim 9, wherein prior to receiving the first request, the method further comprises:

obtaining, using the first display interface, a second operation for a second phone number of the first terminal;

obtaining a second operation instruction corresponding to the second operation; and sending first authorization information to the first terminal based on the second operation instruction, wherein the first authorization information indicates that the first terminal is authorized to access the location of the second terminal.

12. The method of claim 11, wherein prior to sending the first authorization information to the first terminal, the method further comprises:

displaying a second display interface in response to the second operation; and obtaining, using the second display interface, a first authorized time period for accessing the location of the second terminal by the first terminal.

13. The method of claim 9, further comprising outputting, when a call ends between the first terminal and the second terminal, first query information for determining whether to continue to authorize, after the call ends, the first terminal to access the location of the second terminal.

14. The method of claim 9, further comprising obtaining, using a setting interface, any one or more of the following information:

whether the second terminal authorizes a third terminal to access the location of the second terminal based on the first phone number;

an authorized time during which the second terminal authorizes the third terminal to access the location of the second terminal based on the first phone number;

a whitelist corresponding to a phone number of at least one terminal, wherein each of the at least one terminal is authorized to access the location of the second terminal based on the phone number of the second terminal;

whether to authorize, after a call ends between the second terminal and the third terminal when the second terminal forms location communication with the third terminal in a call process, the third terminal to continue to access the location of the second terminal; or an authorized duration during which the third terminal is authorized, after the call ends between the second terminal and the terminal when the second terminal forms location communication with the third terminal in the call process, to continue to access the location of the second terminal.

15. A first terminal comprising memory configured to store instructions;

and a processor coupled to the memory and configured to execute the instructions to cause the first terminal to:

obtain, using a first display interface, a first operation for a phone number of a second terminal, wherein the first display interface is a communication interface between the first terminal and the second terminal;

obtain a first operation instruction corresponding to the first operation;

send, to the second terminal based on the first operation instruction, a first request requesting location sharing with the second terminal;

receive, from the second terminal, a location of the second terminal in response to the first request, wherein the location of the second terminal is based on a long-distance wireless positioning technology when a distance between the first terminal and the second terminal is greater than a distance threshold, wherein the location of the second terminal is based on a short-distance wireless communication technology relative to the first terminal when the distance between the first terminal and the second terminal is less than the distance threshold, and wherein the distance threshold is a communication range of the short-distance wireless communication technology; and display the location of the second terminal, wherein displaying the location of the second terminal comprises:

displaying absolute locations of the first terminal and the second terminal on a map when the location of the second terminal is obtained based on the long-distance wireless positioning technology; and displaying the location of the second terminal relative to the first terminal when the location of the second terminal is obtained based on the short-distance wireless communication technology.

16. The first terminal of claim 15, wherein the processor is further configured to execute the instructions to cause the first terminal to terminate location communication between the first terminal and the second terminal when a first preset condition is met, wherein the first preset condition comprises a first end condition or a second end condition, wherein the second end condition is that a duration during which the first terminal accesses the location of the second terminal reaches a duration threshold authorized by the second terminal, and wherein the first end condition comprises a location obtaining manner of the second terminal is changed from the short-distance wireless communication technology to the long-distance wireless positioning technology.

17. The first terminal of claim 15, wherein the processor is further configured to execute the instructions to cause the first terminal to:

obtain, using a call end interface between the first terminal and the second terminal, a second operation instruction corresponding to a second operation for the phone number of the second terminal;

obtain a current location of the first terminal in response to the second operation instruction; and transmit the current location of the first terminal to the second terminal.

18. The first terminal of claim 15, wherein the instructions to display the location of the second terminal comprises instructions to:

display a surrounding real environment of the first terminal on a call interface between the first terminal and the second terminal; and display the location of the second terminal relative to the first terminal in the surrounding real environment of the first terminal.

19. The first terminal of claim 15, wherein the instructions to display the location of the second terminal comprises instructions to display the location of the second terminal on a second display interface of a first intelligent wearable device.

20. The first terminal of claim 15, wherein the instructions to display the location of the second terminal comprises instructions to display, on a second display interface, navigation information indicating a navigation path between the first terminal and the second terminal.

* * * * *